United States Patent [19]

Tajiri et al.

[11] Patent Number: 6,038,203
[45] Date of Patent: Mar. 14, 2000

[54] OPTICAL HEAD WITH A PHOTO-DETECTOR MOUNTED ON A FLEXIBLE CIRCUIT BOARD

[75] Inventors: Atsushi Tajiri, Mishima-gun; Kazushi Mori, Hirakata; Yasuaki Inoue, Nagaokakyo; Takenori Goto, Moriguchi, all of Japan

[73] Assignee: Sanyo Electric Co., Ltd., Moriguchi, Japan

[21] Appl. No.: 08/946,591

[22] Filed: Oct. 7, 1997

[30] Foreign Application Priority Data

Oct. 9, 1996 [JP] Japan .................................. 8-268578
Sep. 8, 1997 [JP] Japan .................................. 9-243069

[51] Int. Cl.[7] .................................................. G11B 7/125
[52] U.S. Cl. ...................... 369/112; 369/44.14; 369/103; 369/122; 369/44.23
[58] Field of Search ............................. 369/44.15, 44.23, 369/44.14, 103, 216, 112, 116, 122; 372/50, 97

[56] References Cited

U.S. PATENT DOCUMENTS

| | | | |
|---|---|---|---|
| 4,458,980 | 7/1984 | Ohki et al. | 369/44.14 |
| 4,757,197 | 7/1988 | Lee | 357/19 |
| 4,829,506 | 5/1989 | Bressers et al. | 369/112 |
| 4,847,848 | 7/1989 | Inoue et al. | 372/50 |
| 4,907,847 | 3/1990 | Onayama et al. | 359/19 |
| 5,241,528 | 8/1993 | Mohri et al. | 369/219 |
| 5,285,062 | 2/1994 | Lee | 250/216 |
| 5,293,038 | 3/1994 | Kadowaki et al. | 250/216 |
| 5,446,719 | 8/1995 | Yoshida et al. | 369/116 |
| 5,481,524 | 1/1996 | Ueno et al. | 369/112 |
| 5,727,009 | 3/1998 | Tajiri et al. | 372/43 |

FOREIGN PATENT DOCUMENTS

| | | |
|---|---|---|
| 1-313987 | 12/1989 | Japan . |
| 2-010964 | 1/1990 | Japan . |
| 3-76035 | 4/1991 | Japan . |
| 8-96393 | 4/1996 | Japan . |

*Primary Examiner*—Tan Dinh
*Assistant Examiner*—Kim-Kwok Chu
*Attorney, Agent, or Firm*—Armstrong, Westerman, Hattori, McLeland & Naughton

[57] ABSTRACT

A semiconductor laser device is mounted on the side of one end surface on lead frame in a recess of an insulating molding member, a three-beam generating diffraction grating is disposed in the center, and a transmission type holographic optical element is disposed on the side of the other end surface. After a flexible circuit board is fixed to the lower surfaces of leads and the lead frame, a photodiode for a signal detection is mounted on the surface of the flexible circuit board, and is so folded upward as to be perpendicular to the upper surface of the lead frame. The insulating molding member is mounted on the one end surface of the insulating molding member through a circular screw through a hole and an elliptic screw through a hole by screws.

46 Claims, 47 Drawing Sheets

1

OPTICAL HEAD WITH A PHOTO-DETECTOR MOUNTED ON A FLEXIBLE CIRCUIT BOARD

BACKGROUND OF THE INVENTION

1. Field of the Invention

The present invention relates to an optical pickup device and a method of fabricating the same.

2. Description of the Background Art

An optical pickup device used for an optical disk device or the like records information on and reads out the information from an optical recording medium such as an optical disk using laser light, or detects a servo signal. In recent years, an optical pickup device using a transmission type holographic optical element which is one type of diffraction element has been studied and developed with demands for miniaturization, light weight, and low cost thereof.

FIG. 45 is a schematic view showing an optical pickup device having a transmission type holographic optical element disclosed in Japanese Patent Laid-Open No.76035/1991. The optical pickup device performs tracking servo using a three-beam method.

In FIG. 45, a semiconductor laser chip 202 is mounted on a side surface of a stem 201, and a photodetector for signal detection 206 is mounted on the upper surface of the stem 201. A first holographic functional plate 203 and a second holographic functional plate 204 are disposed above the semiconductor laser chip 202.

The semiconductor laser chip 202 emits laser light upward. The laser light emitted from the semiconductor laser chip 202 is divided into three diffracted light beams by the first holographic functional plate 203, to pass through the second holographic functional plate 204. The three diffracted light beams passing through the second holographic functional plate 204 are gathered on a disk 200 by a lens 205, to form three spots. The laser light reflected by the disk 200 (returned light) is diffracted by the second holographic functional plate 204, and is received by the photodetector for signal detection 206.

Since in the optical pickup device shown in FIG. 45, the semiconductor laser chip 202 and the photodetector for signal detection 206 are arranged at right angles on the stem 201, the stem 201 must be rotated through 90° in mounting the semiconductor laser chip 202 and the photodetector for signal detection 206 and performing wire bonding. Therefore, the fabrication steps become complicated.

The stem 201 having a three-dimensional shape is used, whereby it is difficult to thin the optical pickup device. Further, the semiconductor laser chip 202 and the photodetector for signal detection 206 must be arranged in such a manner that a focusing spot of the returned light from the disk 200 is incident on the photodetector for signal detection 206, whereby high precision is required in mounting the semiconductor laser chip 202 and the photodetector for signal detection 206. Since the semiconductor laser chip 202 and the photodetector for signal detection 206 are arranged in three dimensions, however, it is difficult to realize high mounting precision.

FIG. 46 is a cross-sectional view of an optical pickup device disclosed in Japanese Patent Laid-Open No. 313987/1989.

In FIG. 46, a laser chip 42, a light detecting element for monitoring 43, and a light detecting element for signal reading 44 are contained in a cap 45, and a holographic optical element 46 is mounted on the cap 45. Laser light emitted from the laser chip 42 is gathered on a disk 49 by a collimator lens 47 and an objective lens 48 upon passing through the holographic optical element 46, and returned light from the disk 49 is received by the light detecting element for signal reading 44 upon being diffracted by the holographic optical element 46.

In the optical pickup device, the holographic optical element 46 is so moved on the cap 45 that a focusing spot of the returned light is incident on the light detecting element for signal reading 44 before being fixed, so that the position of the holographic optical element 46 can be adjusted.

Since it is difficult to adjust the position in the height direction of the holographic optical element 46, however, it is not easy to gather the returned light on a light detecting surface of the light detecting element for signal reading 44 most suitably. Further, the cap 45 having a three-dimensional shape is used, whereby it is difficult to thin the optical pickup device.

Therefore, an optical pickup device in which a holographic optical element can be adjusted in a three-dimensional manner has been proposed in Japanese Patent Laid-Open No. 96393/1996. FIG. 47 is a cross-sectional view of a conventional optical pickup device disclosed in Japanese Patent Laid-Open No. 96393/1996.

In FIG. 47, a mount member 51 is constructed upon integrating a lead frame 52 and a plurality of leads (not shown) by an insulating molding member 54. The insulating molding member 54 is so provided with a recess 55 that the surfaces of the lead frame 52 and the leads are exposed, and an electrically conducting sub-mount (a heat sink) 56 is mounted on the lead frame 52 in the recess 55. A photodiode for monitoring 57 is formed on a part of the upper surface of the sub-mount 56.

Furthermore, a semiconductor laser device 58 is mounted on the sub-mount 56. Laser light is respectively emitted from a front facet and a rear facet of the semiconductor laser device 58, and the laser light emitted from the rear facet is received as monitoring light by the photodiode 57.

A reflection type three-beam generating diffraction grating 59 is arranged ahead of the semiconductor laser device 58. A diffraction grating surface 59a of the three-beam generating diffraction grating 59 divides the laser light emitted from the front facet of the semiconductor laser device 58 into 0th-order, +1st and −1st diffracted light beams, and reflects the diffracted light beams upward at right angles. A light detecting element for signal detection 60 is mounted on the lead frame 52 behind the three-beam generating diffraction grating 59.

A first member 63 having a cylindrical cavity, a cylindrical second member 64 having a cavity in its inner part, and a cylindrical third member 65 having a cavity in its inner part are combined with each other on the recess 55 of the insulating molding member 54. The second member 64 is slidably inserted in the circumferential direction and the vertical direction with respect to the first member 63. The third member 65 is fitted in the second member 64 slidably in the horizontal direction. A transmission type holographic optical element 62 is fixed to an upper end of the third member 65. The first member 63 is fixed on the mount member 51 with adhesives 70a, while the second member 64 and the third member 65 are fixed to the first member 63 with adhesives 70b after adjustment.

The laser light emitted from the front facet of the semiconductor laser device 58 is divided into 0th-order, +1st and −1st diffracted light beams by the three-beam generating diffraction grating 59, and the diffracted light beams are reflected toward the transmission type holographic optical element 62. The diffracted light beams are then reflected at approximately right angles by a mirror (not shown) after passing through the transmission type holographic optical element 62, and are further gathered on an optical recording medium by a condenser lens. Therefore, a main spot and two sub-spots are formed on the optical recording medium.

Returned light from the optical recording medium is incident on the transmission type holographic optical element 62 upon following the condenser lens and the mirror in this order. The returned light is received by the light detecting element for signal detection 60 upon passing through the transmission type holographic optical element 62 while being diffracted into 1st (or −1st) order light beams.

In the optical pickup device shown in FIG. 47, the second member 64 is slidable and rotatable in the vertical direction, and the third member 65 is slidable in the horizontal direction before the second member 64 and the third member 65 are fixed, whereby the transmission type holographic optical element 62 can be easily moved in a three-dimensional manner.

In the conventional optical pickup device shown in FIG. 47, however, laser light is emitted perpendicularly to the surface of the lead frame 52, and approximately ten leads which are required to take out electric wiring are arranged along the width of the lead frame 52, whereby it is difficult to thin the optical pickup device in a direction perpendicular to the direction in which the laser light is emitted.

Furthermore, a plurality of members are used for moving the transmission type holographic optical element 62 in a three-dimensional manner, whereby the construction of an adjusting system becomes complicated. Further, the transmission type holographic optical element 62 is arranged above the mount member 51 by the plurality of members, whereby it is unstable in terms of construction.

SUMMARY OF THE INVENTION

An object of the present invention is to provide an optical pickup device which can be thinned in a direction perpendicular to the direction in which laser light is emitted and a method of fabricating the same.

Another object of the present invention is to provide an optical pickup device which can stably and easily adjust the relative position between a holographic optical element and a light detecting element in a three-dimensional manner, can be thinned in a direction perpendicular to the direction in which laser light is emitted, and is easy to fabricate, and a method of fabricating the same.

An optical pickup device according to the present invention comprises a supporting member having a main surface and both end surfaces, a semiconductor laser device, a holographic optical element, and a light detecting element. The semiconductor laser device is disposed on the main surface of the supporting member, and emits laser light from one end surface side towards the other end surface side of the supporting member in a direction nearly parallel to the main surface. The holographic optical element is disposed on the other side of the end surface of the supporting member, and transmits the laser light emitted from the semiconductor laser device and diffracts returned light based on the laser light. The light detecting element receives the returned light diffracted by the holographic optical element. The light detecting element is mounted on the flexible circuit board. The flexible circuit board is so mounted along the lower surface of the supporting member that the light detecting element is positioned apart from the one end surface of the supporting member, and is so folded almost perpendicularly to the main surface of the supporting member that the light detecting element receives the returned light diffracted by the holographic optical element.

In the optical pickup device according to the present invention, the laser light is emitted in a direction nearly parallel to the main surface of the supporting member from the semiconductor laser device on the main surface, and passes through the holographic optical element on the supporting member. The returned light based on the laser light is diffracted by the holographic optical element, and is received by the light detecting element mounted along the one end surface of the supporting member.

Since the semiconductor laser device and the holographic optical element are disposed along the main surface of the supporting member, and the light detecting element is disposed on the flexible circuit board along the end surface of the supporting member, a light projecting and receiving unit in the optical pickup device can be thinned in a direction perpendicular to the main surface of the supporting member. The light projecting and receiving unit is a portion formed as a unit by the semiconductor laser device, the holographic optical element and the light detecting element in the optical pickup device and excluding a mirror and an objective lens.

Furthermore, the main surface of the supporting member and the flexible circuit board are nearly flush with each other before the flexible circuit board is folded, whereby it is easy to mount the semiconductor laser device on the main surface of the supporting member and mount the light detecting element on the flexible circuit board, and it is easy to wire-bond the semiconductor laser device and the light detecting element Further, the semiconductor laser device and the light detecting element can be connected to a predetermined circuit through a wiring pattern on the flexible circuit board, whereby the number of wires is reduced. Consequently, the optical pickup device is easy to fabricate, the fabrication cost thereof is reduced, and the miniaturization thereof is achieved.

Particularly, the holographic optical element is disposed on the supporting member movably in at least one of a plurality of directions at the time of assembling, and the flexible circuit board is disposed along the one end surface of the supporting member so that a folded portion of the flexible circuit board on which the light detecting element is mounted can be movably in a direction different from the direction in which the holographic optical element is movable at the time of assembling.

In this case, the relative position between the holographic optical element and the light detecting element can be easily adjusted in a three-dimensional manner by respectively moving the holographic optical element and the light detecting element in predetermined directions at the time of assembling. Consequently, high mounting precision is not required at the time of mounting the holographic optical element and the light detecting element. Further, the semiconductor laser device and the holographic optical element are disposed along the main surface of the supporting member, and the light detecting element is disposed along the one end surface of the supporting member, whereby the construction of an adjusting system is simple, and the construction of the optical pickup device is stable.

Particularly, it is preferable that the plurality of directions include a first direction nearly parallel to the laser light emitted from the semiconductor laser device, a second direction nearly perpendicular to the first direction on the main surface of the supporting member, a third direction nearly perpendicular to the main surface of the supporting member, and a fourth direction rotated around an axis nearly parallel to the first direction.

Particularly, the supporting member may comprise a molding member in a flat shape, and a lead member electrically connected to the semiconductor laser device and projected from both side surfaces of the molding member.

In this case, the molding member in the supporting member is formed in a flat shape, so that the light projecting and receiving unit in the optical pickup device can be thinned in a direction perpendicular to the main surface of the supporting member. Further, the lead member is arranged upon being distributed between both side surfaces of the supporting member, whereby the width of the supporting member can be decreased, as compared with that in a structure in which the lead member is projected in one direction.

Particularly, it is preferable that the molding member has a recess so formed that the surface of the lead member is exposed, and the semiconductor laser device is disposed on the lead member exposed in the recess. Further, it is preferable that the molding member further has a recess formed on the other end surface side, and the holographic optical element is arranged in the recess formed on the other end surface side of the molding member. In addition, it is preferable that there is further provided a diffraction element for dividing the laser light emitted from the semiconductor laser device into a plurality of light beams on the main surface between the semiconductor laser device and the holographic optical element.

Consequently, it is possible to obtain a light projecting and receiving unit in a thin-shaped optical pickup device in which the semiconductor laser device, the diffraction element and the holographic optical element are arranged in the recess of the molding member in a flat shape.

Particularly, the holographic optical element may be disposed on the main surface of the supporting member movably in the first direction and the second direction at the time of assembling, and a portion of the flexible circuit board on which the light detecting element is mounted may be disposed along the one end surface of the supporting member movably in the third direction or rotatably in the fourth direction at the time of assembling.

In this case, the relative position between the holographic optical element and the light detecting element can be easily adjusted in a three-dimensional manner by moving the holographic optical element in a first direction nearly parallel to the direction in which the laser light is emitted and a second direction nearly perpendicular to the direction in which the laser light is emitted on the main surface of the supporting member, and moving the light detecting element in a third direction nearly perpendicular to the main surface or rotating the light detecting element in a fourth direction around an axis nearly parallel to the first direction at the time of assembling. Consequently, high mounting precision is not required for the holographic optical element and the light detecting element.

Furthermore, the semiconductor laser device and the holographic optical element are disposed on the main surface of the supporting member, and the light detecting element is disposed along the one end surface of the supporting member, so that the construction of an adjusting system is simple, and the construction of the optical pickup device is stable.

Particularly, the flexible circuit board may have a pair of holes, at least one of which extends in the third direction, and there may be further provided a pair of screws inserted into the pair of holes of the flexible circuit board for mounting the flexible circuit board on the one end surface of the supporting member.

Consequently, the flexible circuit board is movable in the third direction or is rotatable in the fourth direction at the time of mounting.

Furthermore, a diffraction element for dividing the laser light emitted from the semiconductor laser device into a plurality of light beams may be further provided on the main surface between the semiconductor laser device and the holographic optical element.

Particularly, the holographic optical element may be disposed on the main surface of the supporting member movably in the second direction at the time of assembling, and a folded portion of the flexible circuit board on which the light detecting element is mounted may be mounted on the one end surface of the supporting member movably in the first direction and rotatably in the fourth direction at the time of assembling.

Also in this case, the relative position between the holographic optical element and the light detecting element can be easily adjusted in a three-dimensional manner at the time of assembling.

Particularly, the flexible circuit board may have a pair of holes extending in the third direction, and there may be further provided a pair of screws inserted into the pair of holes of the flexible circuit board for mounting the flexible circuit board on the one end surface of the supporting member, and a spring inserted between the flexible circuit board and the one end surface of the supporting member on the side of one of the pair of screws.

Consequently, the flexible circuit board can be moved along the holes extending in the third direction, and the flexible circuit board can be moved in the first direction by adjusting the amount of tightening of one of the pair of screws.

Furthermore, the supporting member may have a wall surface abutted against the holographic optical element for guiding the holographic optical element in the second direction at the time of assembling.

In this case, the position of the holographic optical element can be easily adjusted by moving the holographic optical element in the second direction along the wall surface of the supporting member at the time of assembling.

There may be further provided a diffraction element for dividing the laser light emitted from the semiconductor laser device into a plurality of light beams on the main surface between semiconductor laser device and the holographic optical element.

Particularly, the holographic optical element may be disposed on the main surface of the supporting member movably in the second direction and the third direction at the time of assembling, and a folded portion of the flexible circuit board on which the light detecting element is mounted may be mounted along the one end surface of the supporting member movably in the first direction at the time of assembling.

Also in this case, the relative position between the holographic optical element and the light detecting element can be easily adjusted in a three-dimensional manner at the time of assembling.

The flexible circuit board may have a pair of holes, and there may be further provided a pair of screws inserted into the pair of holes of the flexible circuit board for mounting the flexible circuit board on the one end surface of the supporting member, and a spring inserted between the flexible circuit board and the one end surface of the supporting member on the side of one of the pair of screws.

Consequently, the flexible circuit board can be moved in the first direction by adjusting the amount of tightening of one of the pair of screws.

Particularly, the supporting member may have wall surfaces abutted against the holographic optical element for guiding the holographic optical element in the second direction and the third direction at the time of assembling.

In this case, the position of the holographic optical element can be easily adjusted by moving the holographic optical element in the second direction and the third direction along the wall surface of the supporting member at the time of assembling.

There may be further provided a diffraction element for dividing the laser light emitted from the semiconductor laser device into a plurality of light beams on the main surface between semiconductor laser device and the holographic optical element.

Particularly, the holographic optical element may be disposed on the supporting member movably in the third direction at the time of assembling, and a portion of the flexible circuit board on which the light detecting element is mounted may be disposed along the one end surface of the supporting member movably in the first direction and the second direction at the time of assembling.

Also in this case, the relative position between the holographic optical element and the light detecting element can be easily adjusted in a three-dimensional manner.

The flexible circuit board may have a pair of holes extending in the second direction, and there may be further provided a pair of screws inserted into the pair of holes of the flexible circuit board for mounting the flexible circuit board on the one end surface of the supporting member, and a spring inserted between the flexible circuit board and the one end surface of the supporting member on the side of one of the pair of screws.

Consequently, the flexible circuit board can be moved in the first direction by moving the flexible circuit board in the second direction along the holes extending in the second direction and adjusting the amount of tightening of one of the pair of screws.

Particularly, the supporting member may have a wall surface abutted against the holographic optical element for guiding the holographic optical element in the third direction at the time of assembling.

In this case, the position of the holographic optical element can be easily adjusted by moving the holographic optical element in the third direction along the wall surface of the supporting member at the time of assembling.

There may be further provided a diffraction element for dividing the laser light emitted from the semiconductor laser device into a plurality of light beams on the main surface between the semiconductor laser device and the holographic optical element.

Particularly, the holographic optical element may be disposed on the main surface of the supporting member movably in the first direction and the third direction at the time of assembling, and a portion of the flexible circuit board on which the light detecting element is mounted may be disposed along the one end surface of the supporting member movably in the second direction at the time of assembling.

Also in this case, the relative position between the holographic optical element and the light detecting element can be easily adjusted in a three-dimensional manner.

The flexible circuit board may have a pair of holes extending in the second direction, and there may be further provided a pair of screws inserted into the pair of holes of the flexible circuit board for mounting the flexible circuit board on the one end surface of the supporting member.

Consequently, the flexible circuit board can be moved in the second direction along the holes extending in the second direction.

Particularly, the supporting member may have a wall surface abutted against the holographic optical element for guiding the holographic optical element in the first direction and the third direction at the time of assembling.

In this case, the position of the holographic optical element can be easily adjusted by moving the holographic optical element along the wall surface of the supporting member in the first direction and the third direction.

There may be further provided a diffraction element for dividing the laser light emitted from the semiconductor laser device into a plurality of light beams on the main surface between the semiconductor laser device and the holographic optical element.

Particularly, the holographic optical element may be disposed on the main surface of the supporting member movably in the first direction at the time of assembling, and a portion of the flexible circuit board on which the light detecting element is mounted may be disposed along the one end surface of the supporting member movably in the second direction and the third direction at the time of assembling.

Also in this case, the relative position between the holographic optical element and the light detecting element can be easily adjusted in a three-dimensional manner.

The flexible circuit board may have a pair of holes having such dimensions as to allow the flexible circuit board to be moved in the second direction and the third direction, and there may be further provided a pair of screws inserted into the pair of holes of the flexible circuit board for mounting the flexible circuit board on the one end surface of the supporting member.

Consequently, the flexible circuit board can be moved in the second direction and the third direction.

Particularly, the supporting member may have wall surfaces abutted against the holographic optical element for guiding the holographic optical element in the first direction at the time of assembling.

In this case, the position of the holographic optical element can be easily adjusted by moving the holographic optical element in the first direction along the wall surface of the supporting member at the time of assembling.

There may be further provided a diffraction element for dividing the laser light emitted from the semiconductor laser device into a plurality of light beams on the main surface between the semiconductor laser device and the holographic optical element.

Particularly, it is preferable that the holographic optical element diffracts the returned light based on the laser light on a plane nearly parallel to the main surface of the supporting member. Consequently, the emitted light from the semiconductor laser device, the transmitted light by the holographic optical element, the returned light, and the diffracted light by the holographic optical element pass on a surface nearly parallel to the main surface of the supporting member, whereby the light projecting and receiving unit in the optical pickup device can be further thinned in a direction perpendicular to the main surface of the supporting member.

Particularly, the flexible circuit board comprises an insulating substrate having flexibility, and a circuit layer formed on the surface of the insulating substrate.

Consequently, the flexible circuit board can be mounted on the one end surface of the supporting member by mounting the light detecting element in a state where the flexible circuit board is flat and then folding the flexible circuit board. Consequently, work for mounting the light detecting element becomes easy. Further, it is preferable that the insulating substrate is formed of polyimide resin.

A method of fabricating an optical pickup device according to the present invention comprises the steps of mounting a flexible circuit board along the lower surface of a supporting member so as to be projected from one end surface of the supporting member, mounting a semiconductor laser device on a main surface of the supporting member so as to emit laser light in a direction nearly parallel to the main surface from the one end surface side of the supporting member to the other end surface side, mounting a light detecting element on the flexible circuit board projected from the one end surface of the supporting member, folding the flexible circuit board projected from the one end surface of the supporting member almost perpendicularly to the main surface of the supporting member, mounting a holographic optical element so as to transmit the laser light emitted from the semiconductor laser device and diffract returned light based on the laser light, and mounting the flexible circuit board folded almost perpendicularly to the main surface on the one end surface of the supporting member.

According to the method of fabricating the optical pickup device according to the present invention, the semiconductor laser device and the holographic optical element are mounted along the main surface of the supporting member, and the light detecting element is mounted on the flexible circuit board folded almost perpendicularly to the main surface on the side of the end surface of the supporting member, so that a light projecting and receiving unit in the optical pickup device can be thinned in a direction perpendicular to the main surface of the supporting member.

Furthermore, the main surface of the supporting member and the flexible circuit board are nearly flush with each other before the flexible circuit board is folded, whereby it is easy to mount the semiconductor laser device on the main surface of the supporting member and mount the light detecting element on the flexible circuit board, and it is easy to wire-bond the semiconductor laser device and the light detecting element. Further, the semiconductor laser device and the light detecting element can be connected to a predetermined circuit through a wiring pattern on the flexible circuit board, whereby the number of wires is reduced. Consequently, the optical pickup device is easy to fabricate, the fabrication cost thereof is reduced, and the miniaturization thereof is achieved.

Particularly, the step of mounting the holographic optical element may comprise the steps of moving the holographic optical element in at least one of a plurality of directions on the main surface of the supporting member, and fixing the holographic optical element on the main surface of the supporting member, and the step of mounting a folded portion of the flexible circuit board on which the light detecting element is mounted may comprise the steps of moving the flexible circuit board in a direction different from the direction in which the holographic optical element is moved to adjust the position of the light detecting element, and fixing the flexible circuit board folded almost perpendicularly to the main surface to the one end surface of the supporting member after adjusting the position of the light detecting element.

In this case, the relative position between the holographic optical element and the light detecting element can be easily adjusted in a three-dimensional manner by moving the holographic optical element in a predetermined direction in a state where the flexible circuit board is folded almost perpendicularly to the main surface of the supporting member and moving the light detecting element in a direction different from the direction in which the holographic optical element is moved. Consequently, high mounting precision is not required for the holographic optical element and the light detecting element.

Particularly, it is preferable that the plurality of directions include a first direction nearly parallel to the laser light emitted from the semiconductor laser device, a second direction nearly perpendicular to the first direction on the main surface of the supporting member, a third direction nearly perpendicular to the main surface of the supporting member, and a fourth direction rotated around an axis nearly parallel to the first direction.

Particularly, the step of mounting the holographic optical element may comprise the steps of moving the holographic optical element in the first direction or the second direction on the main surface of the supporting member, and fixing the holographic optical element on the main surface of the supporting member, and the step of mounting the flexible circuit board may comprise the steps of moving the flexible circuit board folded almost perpendicularly to the main surface in the third direction or rotating the flexible circuit board in the fourth direction to adjust the position of the light detecting element, and fixing the flexible circuit board folded almost perpendicularly to the main surface to the one end surface of the supporting member after adjusting the position of the light detecting element.

In this case, the relative position between the holographic optical element and the light detecting element can be easily adjusted in a three-dimensional manner.

Particularly, it is preferable that the step of mounting the holographic optical element comprises the steps of moving the holographic optical element in the second direction on the main surface of the supporting member, and fixing the holographic optical element on the main surface of the supporting member, and the step of mounting the flexible circuit board comprises the steps of moving the flexible circuit board folded almost perpendicularly to the main surface in the first direction or rotating the flexible circuit board in the fourth direction to adjust the position of the light detecting element, and fixing the flexible circuit board folded almost perpendicularly to the main surface to the one end surface of the supporting member after adjusting the position of the light detecting element.

Consequently, the relative position between the holographic optical element and the light detecting element can be easily adjusted in a three-dimensional manner.

Particularly, the step of mounting the holographic optical element may comprise the steps of moving the holographic optical element in the second direction or the third direction on the supporting member, and fixing the holographic optical element on the supporting member, and the step of mounting the flexible circuit board may comprise the steps of mounting the flexible circuit board on the one end surface of the supporting member and moving the flexible circuit board in the first direction to adjust the position of the light detecting element, and fixing the flexible circuit board folded almost perpendicularly to the main surface to the one end surface of the supporting member after adjusting the position of the light detecting element.

Consequently, the relative position between the holographic optical element and the light detecting element can be easily adjusted in a three-dimensional manner.

Particularly, the step of mounting the holographic optical element may comprise the steps of moving the holographic optical element in the third direction on the supporting member, and fixing the holographic optical element on the supporting member, and the step of mounting the flexible circuit board may comprise the steps of mounting the flexible circuit board folded almost perpendicularly to the main surface of the supporting member on the one end surface of the supporting member and moving the flexible circuit board in the first direction or the second direction to adjust the position of the light detecting element, and fixing the flexible circuit board to the one end surface of the supporting member after adjusting the position of the light detecting element.

Consequently, the relative position between the holographic optical element and the light detecting element can be easily adjusted in a three-dimensional manner.

Particularly, the step of mounting the holographic optical element may comprise the steps of moving the holographic optical element in the first direction or the third direction on the supporting member, and fixing the holographic optical element on the supporting member, and the step of mounting the flexible circuit board may comprise the steps of mounting the flexible circuit board on the one end surface of the supporting member and moving the flexible circuit board in the second direction to adjust the position of the light detecting element, and fixing the flexible circuit board folded almost perpendicularly to the main surface to the one end surface of the supporting member after adjusting the position of the light detecting element.

Consequently, the relative position between the holographic optical element and the light detecting element can be easily adjusted in a three-dimensional manner.

Particularly, the step of mounting the holographic optical element may comprise the steps of moving the holographic optical element in the first direction on the main surface of the supporting member, and fixing the holographic optical element on the main surface of the supporting member, and the step of mounting the flexible circuit board may comprise the steps of mounting the flexible circuit board on the one end surface of the supporting member and moving the flexible circuit board in the second direction or the third direction to adjust the position of the light detecting element, and fixing the flexible circuit board folded almost perpendicularly to the main surface to the one end surface of the supporting member.

Consequently, the relative position between the holographic optical element and the light detecting element can be easily adjusted in a three-dimensional manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
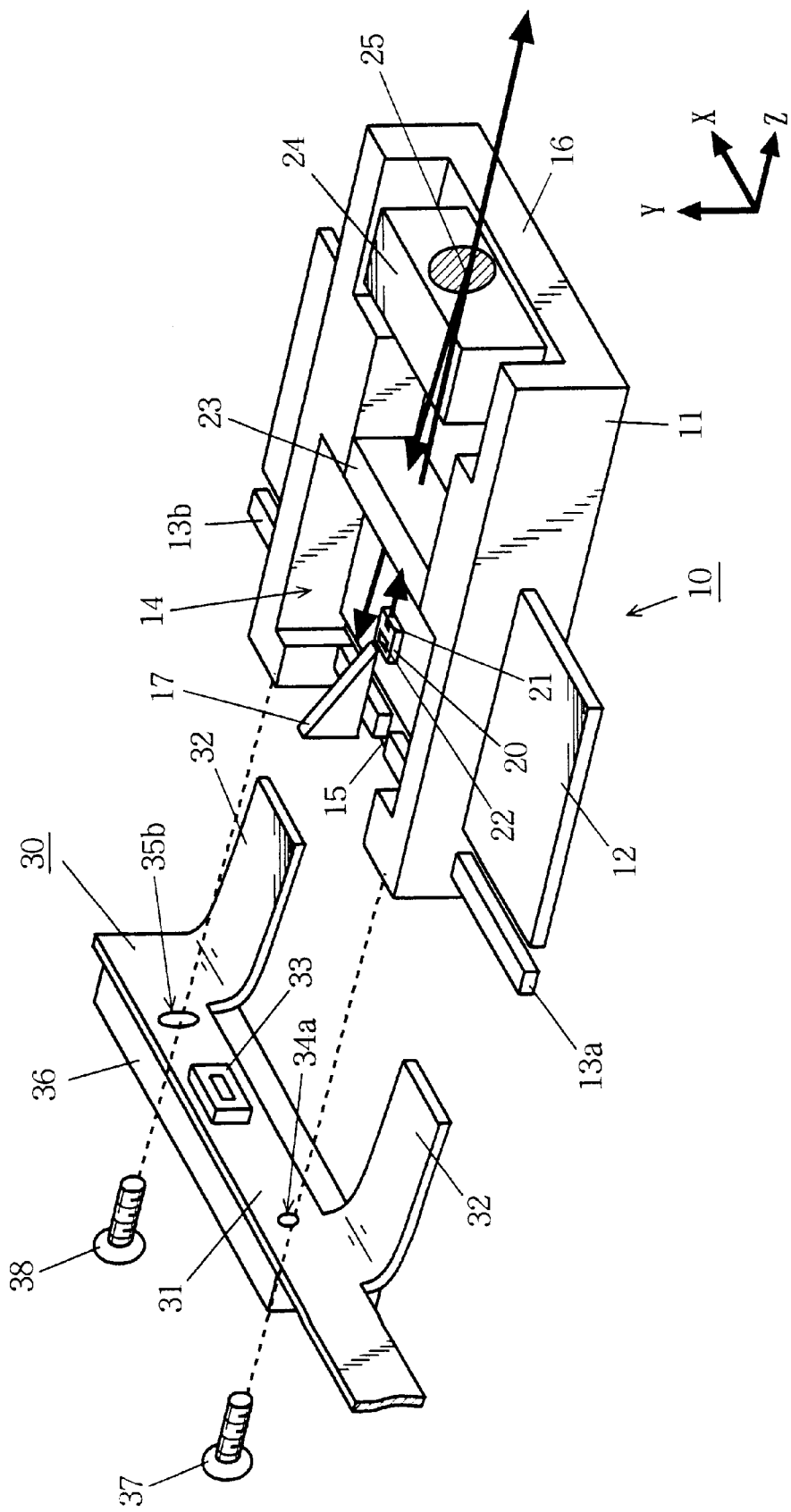
FIG. 1 is an exploded perspective view of an optical pickup device according to a first embodiment of the present invention.
Figure 2:
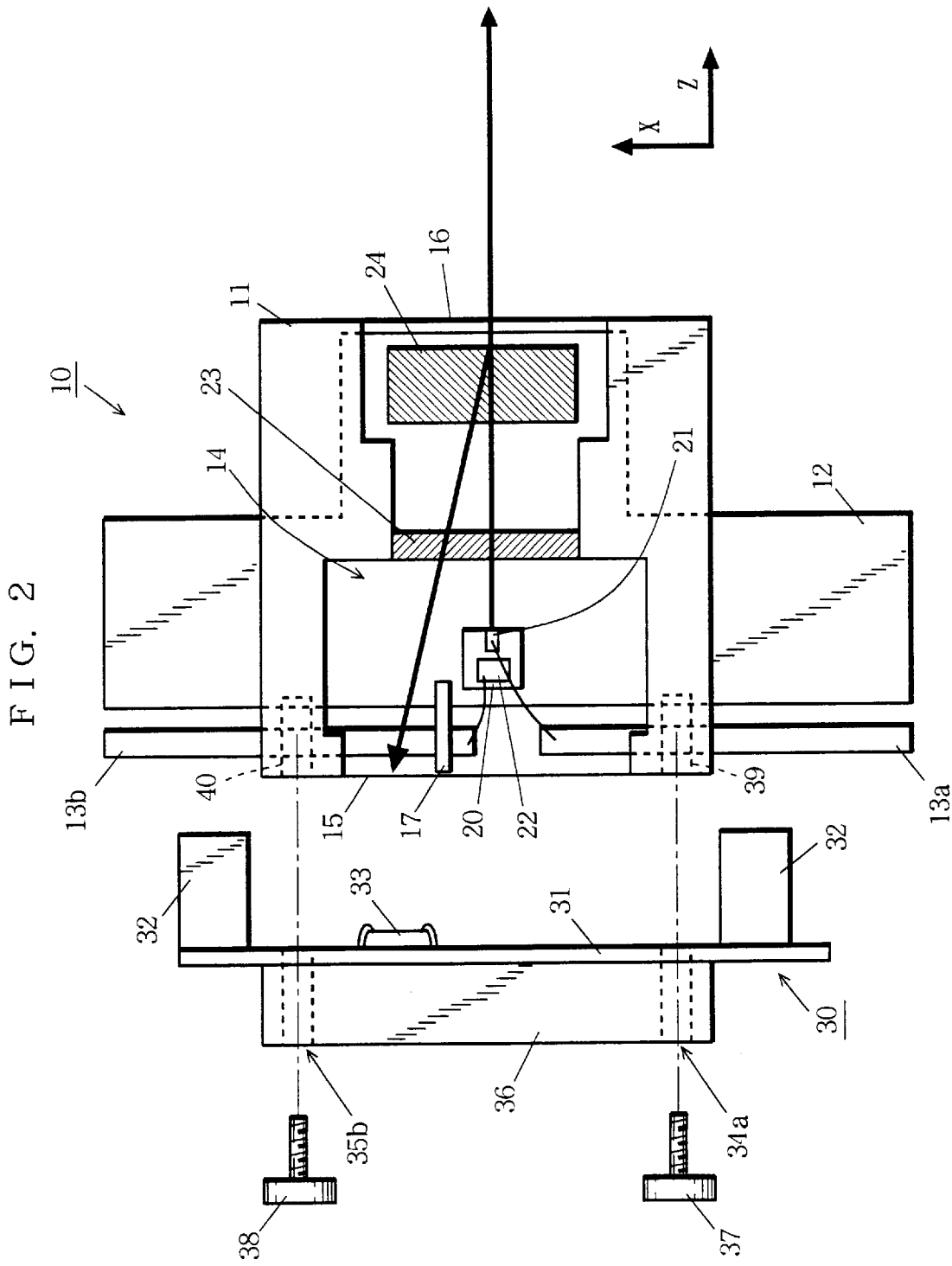
FIG. 2 is an exploded plan view of the optical pickup device shown in FIG. 1.
Figure 3:
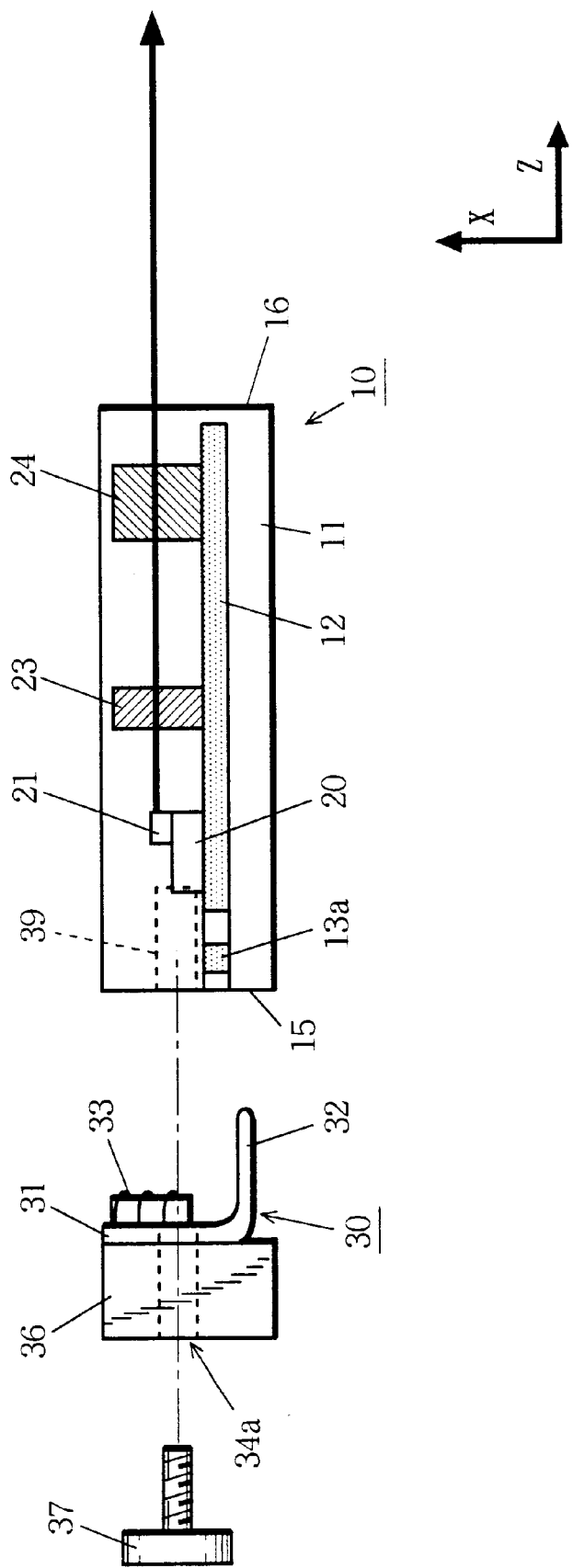
FIG. 3 is an exploded sectional view of the optical pickup device shown in FIG. 1.

FIG. 1 is an exploded perspective view of an optical pickup device according to a first embodiment of the present invention, FIG. 2 is an exploded plan view of the optical pickup device shown in FIG. 1, and FIG. 3 is an exploded sectional view of the optical pickup device shown in FIG. 1. FIGS. 1 to 3 illustrate a light projecting and receiving unit in the optical pickup device.

In FIGS. 1 to 3, a supporting member 10 is constructed upon integrating a lead frame 12 and a pair of leads 13a and 13b by an insulating molding member 11 composed of resin. The lead frame 12 is formed of an electrically conducting metal, and also functions as a heat radiating fin. A pair of leads 13a and 13b is also formed of an electrically conducting metal.

A recess 14 opened from one end surface 15 to the other end surface 16 is so provided that the surfaces of the lead frame 12 and the leads 13a and 13b are exposed on the upper surface of the insulating molding member 11.

An electrically conducting sub-mount (a heat sink) 20 is mounted on the side of the one end surface 15 on the lead frame 12 exposed in the recess 14 of the insulating molding member 11, and is electrically connected to the lead frame 12. A photodiode for monitoring 22 is formed on a part of the upper surface of the sub-mount 20. A semiconductor laser device (a laser chip) 21 is mounted ahead of the photodiode for monitoring 22 on the upper surface of the sub-mount 20. Laser light is respectively emitted from a front facet and a rear facet of the semiconductor laser device 21, and the laser light emitted from the rear facet is received as monitoring light by the photodiode for monitoring 22.

A three-beam generating diffraction grating 23 is disposed in the center of the lead frame 12 inside the recess 14 of the insulating molding member 11. A diffraction grating surface of the three-beam generating diffraction grating 23 divides the laser light emitted from the front facet of the semiconductor laser device 21 into zero-order, +1st and −1st diffracted light beams.

Furthermore, a transmission type holographic optical element 24 is disposed on the side of the other end surface 16 on the lead frame 12 inside the recess 14 of the insulating molding member 11. A holographic functional surface 25 of the transmission type holographic optical element 24 transmits the 0th-order, +1st and −1st diffracted light beams from the three-beam generating diffraction grating 23, and diffracts returned light from an optical recording medium such as an optical disk (not shown). Further, astray light shielding plate 17 for shielding the emitted light from the semiconductor laser device 21 and the returned light from the three-beam generating diffraction grating 23 from each other is arranged on the lead frame 12 inside the recess 14 of the insulating molding member 11.

On the other hand, a flexible circuit board 30 is constructed by forming an electrically conducting circuit pattern on the surface of a polyimide resin plate as described later, and has a lead portion 31 and a fixed portion 32. A photodiode for signal detection 33 is mounted on the surface of the lead portion 31 (a circuit pattern forming surface) of the flexible circuit board 30. Further, a circular screw through hole 34a and an elliptic threaded hole 35b are formed on both sides of the photodiode 33 on the lead portion 31 of the flexible circuit board 30. A holding plate 36 is mounted on the reverse surface of the flexible circuit board 30, and the screw through holes 34a and 35b penetrate the holding plate 36.

The surface of the fixed portion 32 of the flexible circuit board 30 is fixed by soldering or the like on the lower surfaces of the pair of leads 13a and 13b and the lead frame 12. The lead portion 31 of the flexible circuit board 30 is so folded upward that it is perpendicular to the upper surface of the lead frame 12. In this state, screws 37 and 38 are respectively inserted into threaded holes 39 and 40 formed on the one end surface 15 of the insulating molding member 11 through the screw through holes 34a and 35b of the lead portion 31, so that the lead portion 31 is mounted on the one end surface 15.

A direction parallel to the upper surface of the lead frame 12 and both the end surfaces 15 and 16 of the insulating molding member 11 is referred to as an X-axis direction. A direction perpendicular to the upper surface of the lead frame 12 is referred to as a Y-axis direction. Further, a direction parallel to the upper surface of the lead frame 12 and perpendicular to both the end surfaces 15 and 16 of the insulating molding member 11 is referred to as a Z-axis direction.

In the present embodiment, the upper surface of the lead frame 12 corresponds to a main surface of the supporting member, and the end surfaces 15 and 16 of the insulating molding member 11 correspond to end surfaces of the supporting member. Further, the X-axis direction corresponds to a second direction, the Y-axis direction corresponds to a third direction, and the Z-axis direction corresponds to a first direction. The same is true for the following embodiments.

In the optical pickup device according to the present embodiment, the laser light emitted from the front facet of the semiconductor laser device 21 is divided into 0th-order, +1st and −1st diffracted light beams by the three-beam generating diffraction grating 23, and the diffracted light beams are reflected in a direction at right angles to the upper surface of the lead frame 12 by a reflecting member such as a mirror (not shown) after passing through the transmission type holographic optical element 24, and are gathered on an optical recording medium such as an optical disk (not shown) by a condenser lens (not shown). Therefore, a main spot and two sub-spots are formed on the optical recording medium.

The returned light from the optical recording medium is incident on the transmission type holographic optical element 24 through the condenser lens and the reflecting member, is diffracted by the transmission type holographic optical element 24, and is received by the photodiode for signal detection 33 through the three-beam generating diffraction grating 23.

Figure 4:
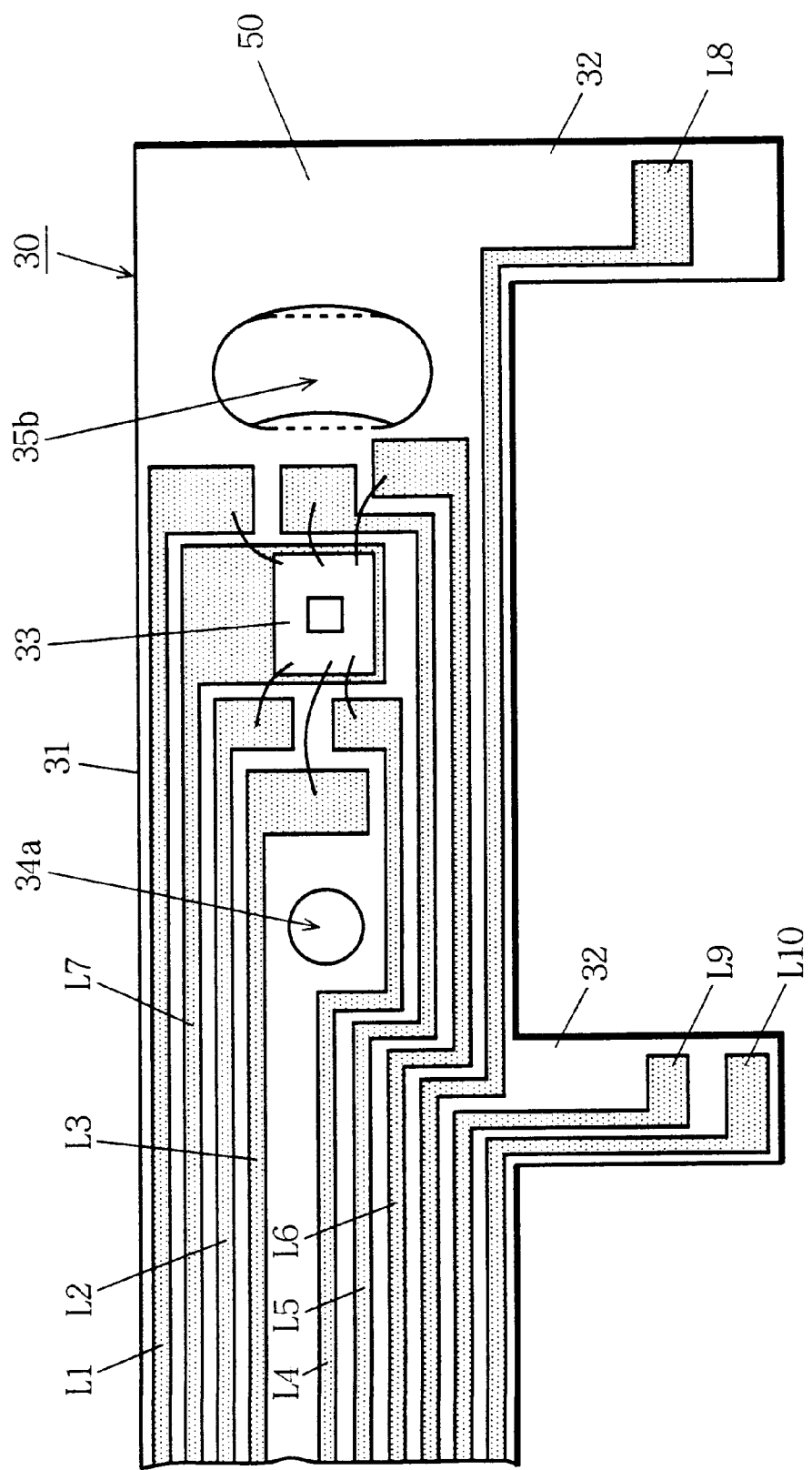
FIG. 4 is a plan view of a flexible circuit board used in the optical pickup device shown in FIG. 1.
Figure 5:
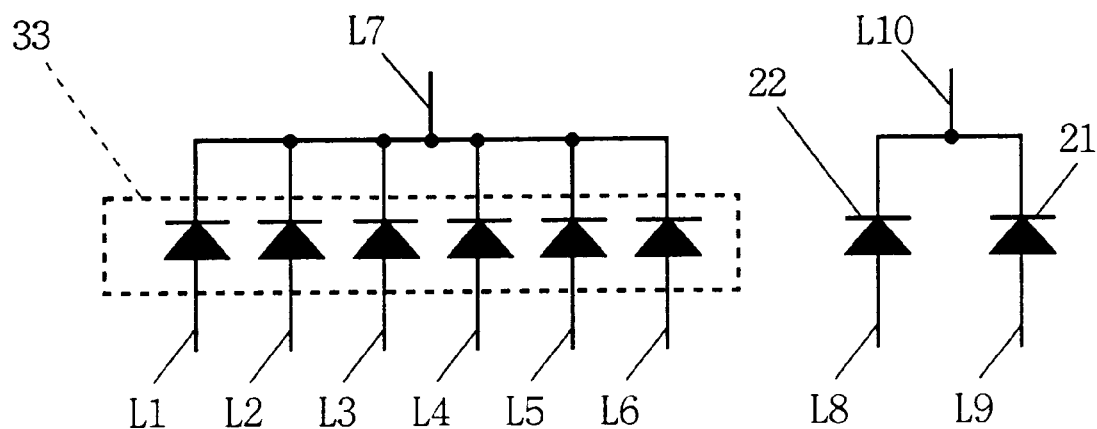
FIG. 5 is a circuit diagram showing an example of circuit of the flexible circuit board shown in FIG. 4.

FIG. 4 is a plan view of a flexible circuit board used in the optical pickup device shown in FIG. 1. FIG. 5 is a circuit diagram showing an example of a circuit of the flexible circuit board shown in FIG. 4.

As shown in FIG. 4, a flexible circuit board 30 is constructed by forming a plurality of electrically conducting lead layers L1 to L10 on a polyimide resin plate 50. As shown in FIGS. 4 and 5, the lead layers L1 to L6 are connected to the anode of the photodiode for signal detection 33 through a bonding wire, and the lead layer L7 is connected to the cathode of the photodiode for signal detection 33. The lead layer L8 is connected to the anode of the photodiode for monitoring 22 through the lead 13b and a bonding wire, the lead layer L9 is connected to the anode of the semiconductor laser device 21 through the lead 13a and a bonding wire, and the lead layer L10 is together connected to the cathodes of the semiconductor laser device 21 and the photodiode for monitoring 22 through the lead frame 12.

Furthermore, the circular screw through hole 34a and the elliptic screw through hole 35b are formed on both sides of the photodiode for signal detection 33. The elliptic screw through hole 35b may be formed in the shape of a circular arc centered around the circular screw through hole 34a, as indicated by a dotted line.

Figure 6:
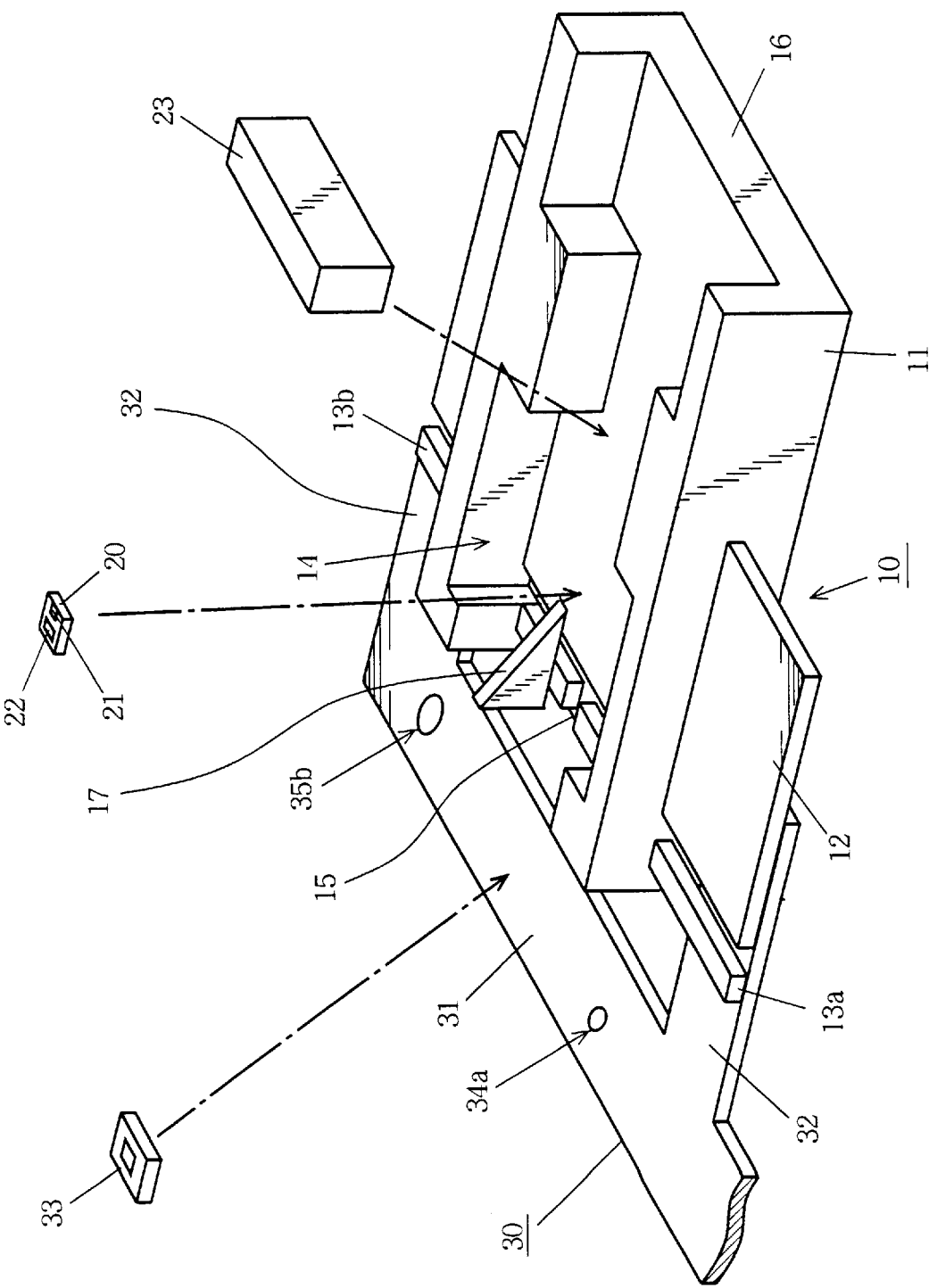
FIG. 6 is a perspective view showing the first step of fabricating the optical pickup device shown in FIG. 1.
Figure 7:
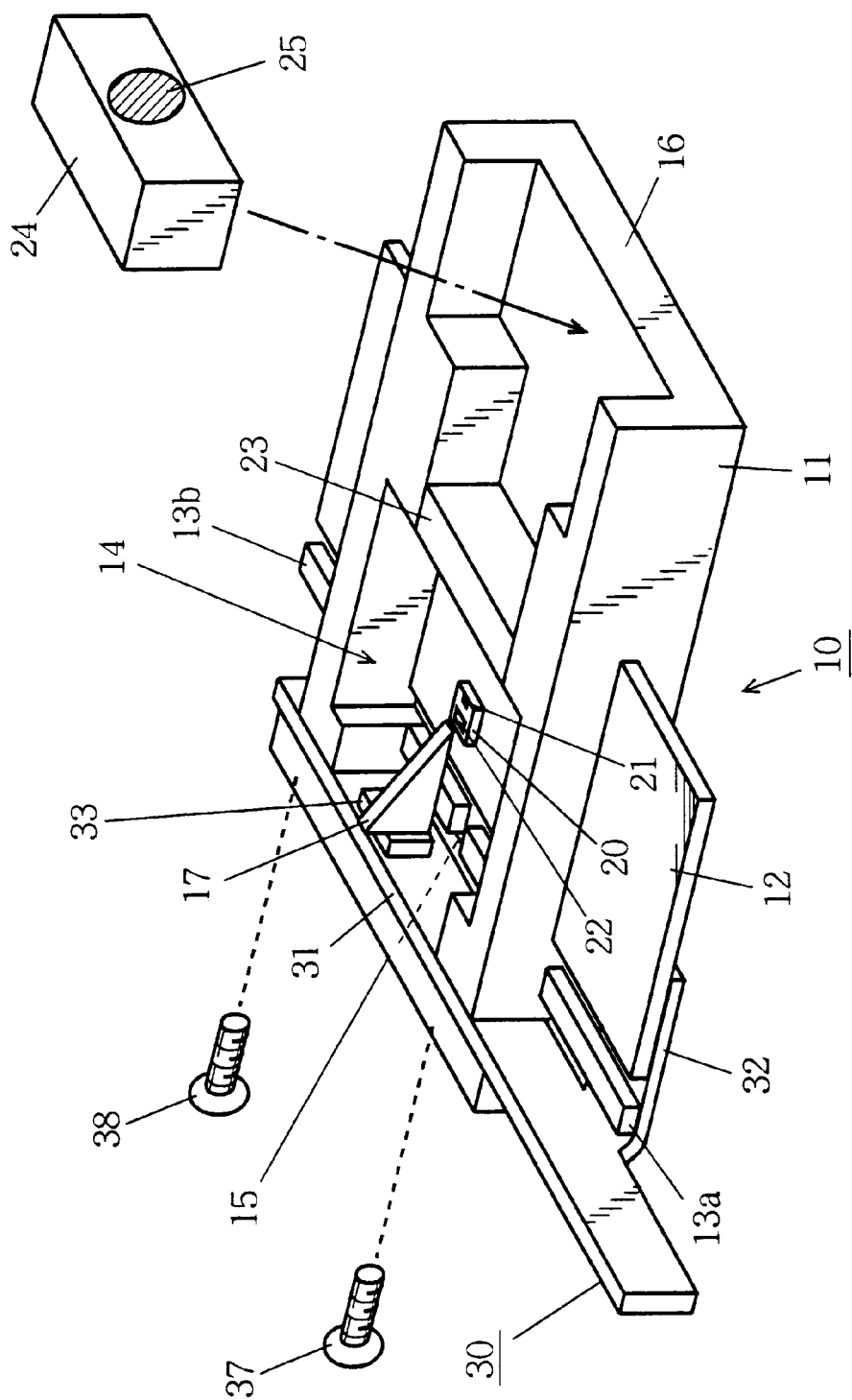
FIG. 7 is a perspective view showing the second step of fabricating the optical pickup device shown in FIG. 1.
Figure 8:
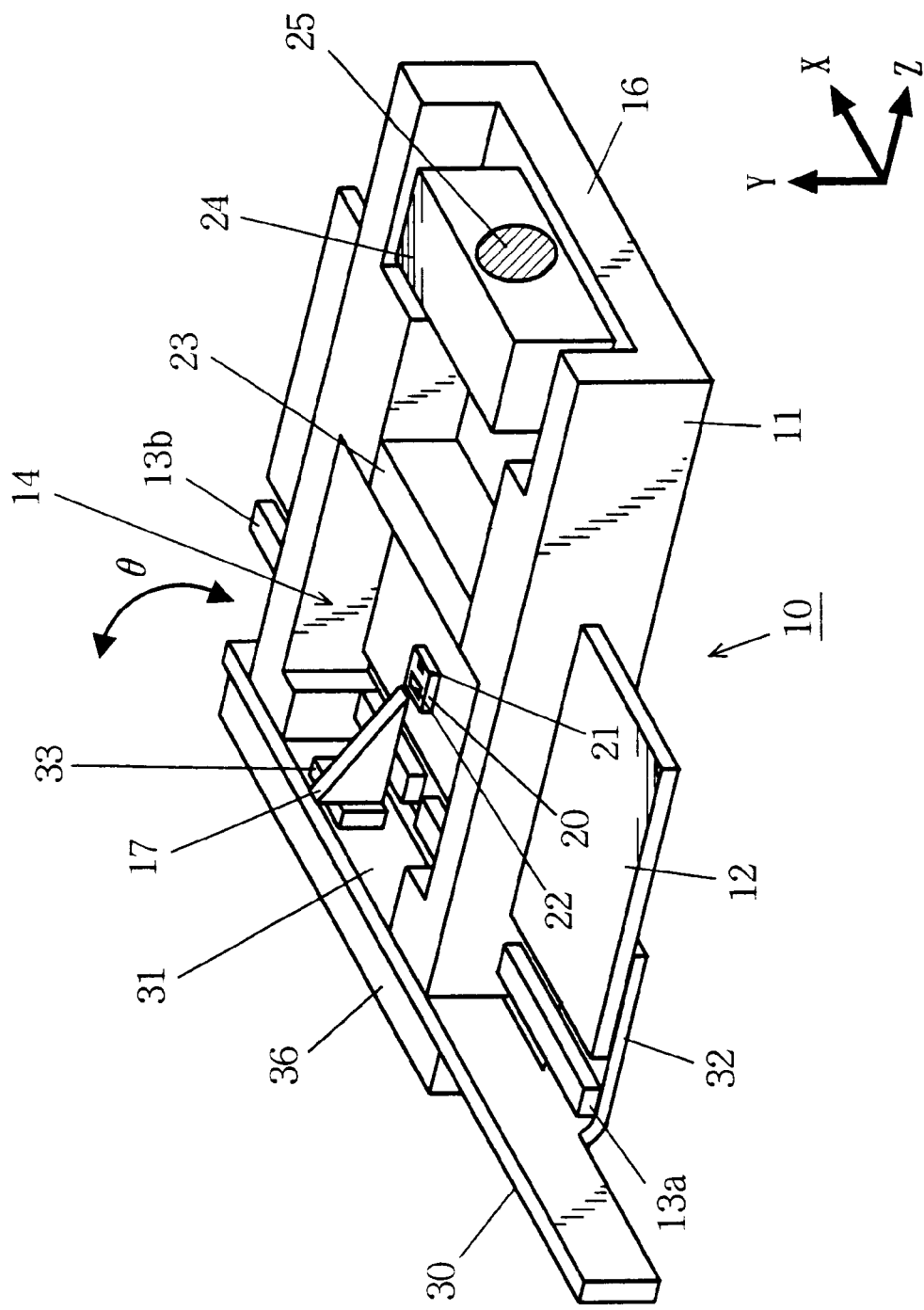
FIG. 8 is a perspective view showing the third step of fabricating the optical pickup device shown in FIG. 1.

Description is now made of a method of fabricating the optical pickup device according to the present invention. FIGS. 6, 7 and 8 are perspective views showing the steps of fabricating the optical pickup device shown in FIG. 1.

As shown in FIG. 6, the surface of the fixed portion 32 of the flexible circuit board 30 is first fixed to the lower surfaces of the lead frame 12 and the leads 13a and 13b by soldering or the like. In this state, the sub-mount 20 on which the semiconductor laser device 21 is mounted and the three-beam generating diffraction grating 23 are fixed on the lead frame 12 inside the recess 14 of the insulating molding member 11. Further, the photodiode for signal detection 33 is mounted on the surface of the lead portion 31 of the flexible circuit board 30. Thereafter, the semiconductor laser device 21, the photodiode for monitoring 22 and the photodiode for signal detection 33 are wire-bonded.

As shown in FIG. 7, the transmission type holographic optical element 24 is put on the side of the end surface 16 on the lead frame 12 inside the recess 14 of the insulating molding member 11. Further, the lead portion 31 of the flexible circuit board 30 is folded almost perpendicularly to the fixed portion 32, and the lead portion 31 is mounted on the one end surface 15 of the insulating molding member 11 by the screws 37 and 38 through the screw through holes 34a and 35b of the flexible circuit board 30.

As shown in FIG. 8, the transmission type holographic optical element 24 is movable in the X-axis direction and the Z-axis direction on the lead frame 12 in this state. Further, the screw through hole 35b of the flexible circuit board 30 is in the shape of an ellipse extending in the Y-axis direction, whereby the photodiode for signal detection 33 mounted on the flexible circuit board 30 is rotatable in a direction θ around the screw through hole 34a.

Consequently, the relative position between the transmission type holographic optical element 24 and the photodiode for signal detection 33 can be adjusted in a three-dimensional manner by moving the transmission type holographic optical element 24 in the X-axis direction and the Z-axis direction and moving the photodiode for signal detection 33 in the direction θ.

After the positions of the transmission type holographic optical element 24 and the photodiode for signal detection 33 are adjusted, the transmission type holographic optical element 24 is fixed to the lead frame 12 with adhesives or the like, and the flexible circuit board 30 is fixed to the one end surface 15 of the insulating molding member 11 by tightening the screws 37 and 38.

In the optical pickup device according to the present embodiment, the semiconductor laser device 21, the three-beam generating diffraction grating 23, the transmission type holographic optical element 24, and the photodiode for signal detection 33 are arranged in two dimensions. Moreover, the returned light from the optical recording medium is diffracted within a plane parallel to the lead frame 12 by the transmission type holographic optical element 24, whereby the projecting and receiving unit can be made smaller in the Y-axis direction perpendicular to the direction in which the laser light is emitted.

The upper surface of the lead frame 12 and the surface of the flexible circuit board 30 are approximately flush with each other before the flexible circuit board 30 is folded. Therefore, it is easy to mount the semiconductor laser device 21 and the three-beam generating diffraction grating 23 on the lead frame 12 and mount the photodiode for signal detection 33 on the flexible circuit board 30, and it is easy to wire-bond the semiconductor laser device 21, the photodiode for monitoring 22 and the photodiode for signal detection 33.

Furthermore, the semiconductor laser device 21, the photodiode for monitoring 22 and the photodiode for signal detection 33 can be connected to a predetermined circuit through a circuit pattern on the flexible circuit board 30, whereby the number of leads, the number of wires, and the number of soldered portions are reduced.

Additionally, the semiconductor laser device 21, the three-beam generating diffraction grating 23 and the transmission type holographic optical element 24 are disposed on the lead frame 12, and the photodiode for signal detection 33 is mounted on the flexible circuit board 30 on the one end surface 15 of the insulating molding member 11, whereby the construction of an adjusting system is simple, and the construction of the optical pickup device is stable.

Consequently, the optical pickup device is easy to fabricate, the fabrication cost thereof is reduced, and the miniaturization thereof is achieved.

Figure 9:
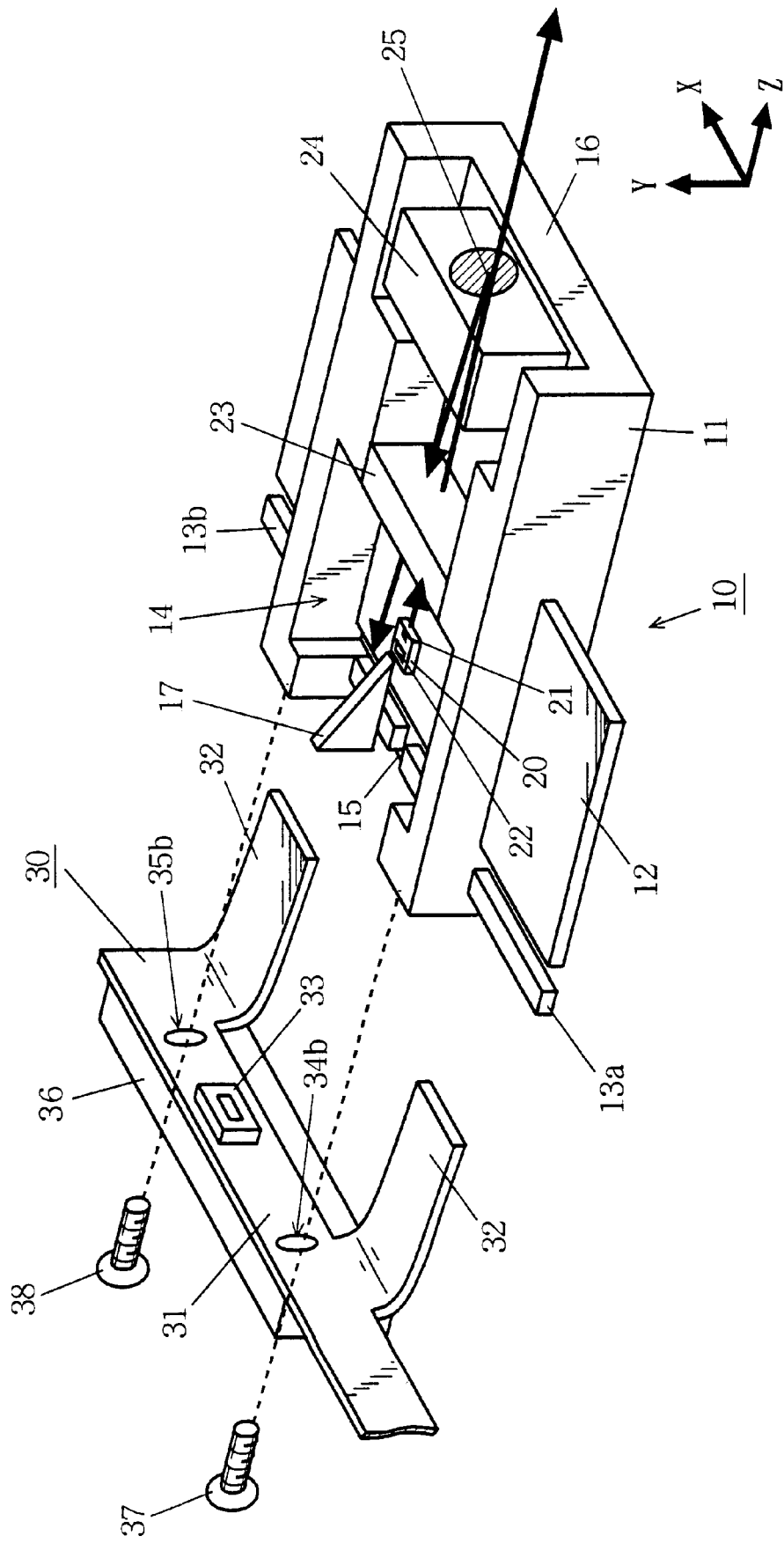
FIG. 9 is an exploded perspective view of an optical pickup device according to a second embodiment of the present invention.

FIG. 9 is an exploded perspective view of an optical pickup device according to a second embodiment of the present invention. The optical pickup device shown in FIG. 9 differs from the optical pickup device shown in FIG. 1 in that a flexible circuit board 30 is provided with an elliptic screw through hole 34b in place of the circular screw through hole 34a. Specifically, in the optical pickup device shown in FIG. 9, a lead portion 31 of the flexible circuit board 30 is provided with two elliptic screw through holes 34b and 35b extending in a Y-axis direction.

Consequently, a photodiode for signal detection 33 mounted on the lead portion 31 of the flexible circuit board 30, together with the flexible circuit board 30, is movable in the Y-axis direction. Consequently, the relative position between a transmission type holographic optical element 24 and the photodiode for signal detection 33 can be adjusted in a three-dimensional manner by moving the transmission type holographic optical element 24 in an X-axis direction and a Z-axis direction and moving the photodiode for signal detection 33 in the Y-axis direction at the time of assembling.

Figure 10:
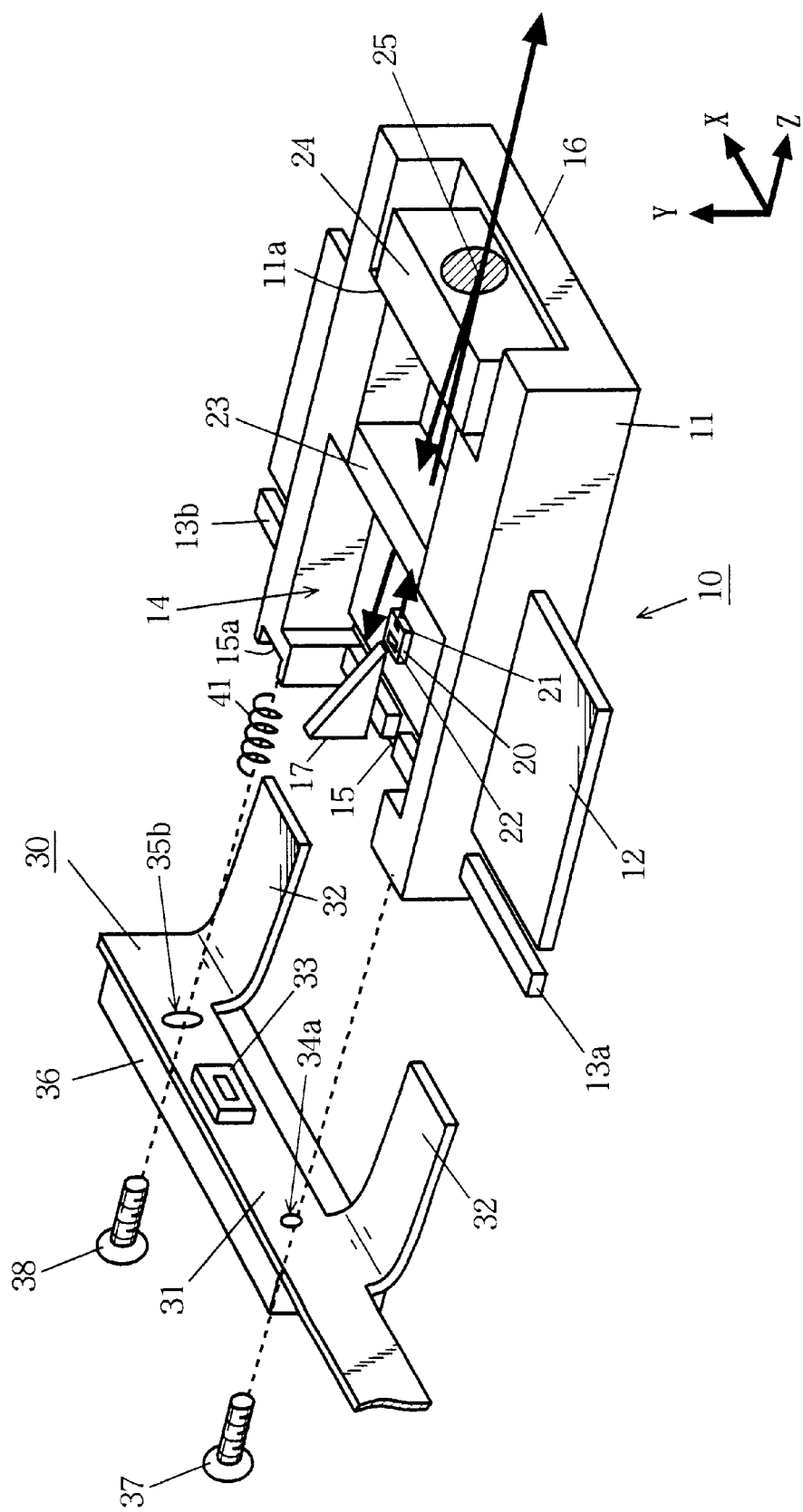
FIG. 10 is an exploded perspective view of an optical pickup device according to a third embodiment of the present invention.
Figure 11:
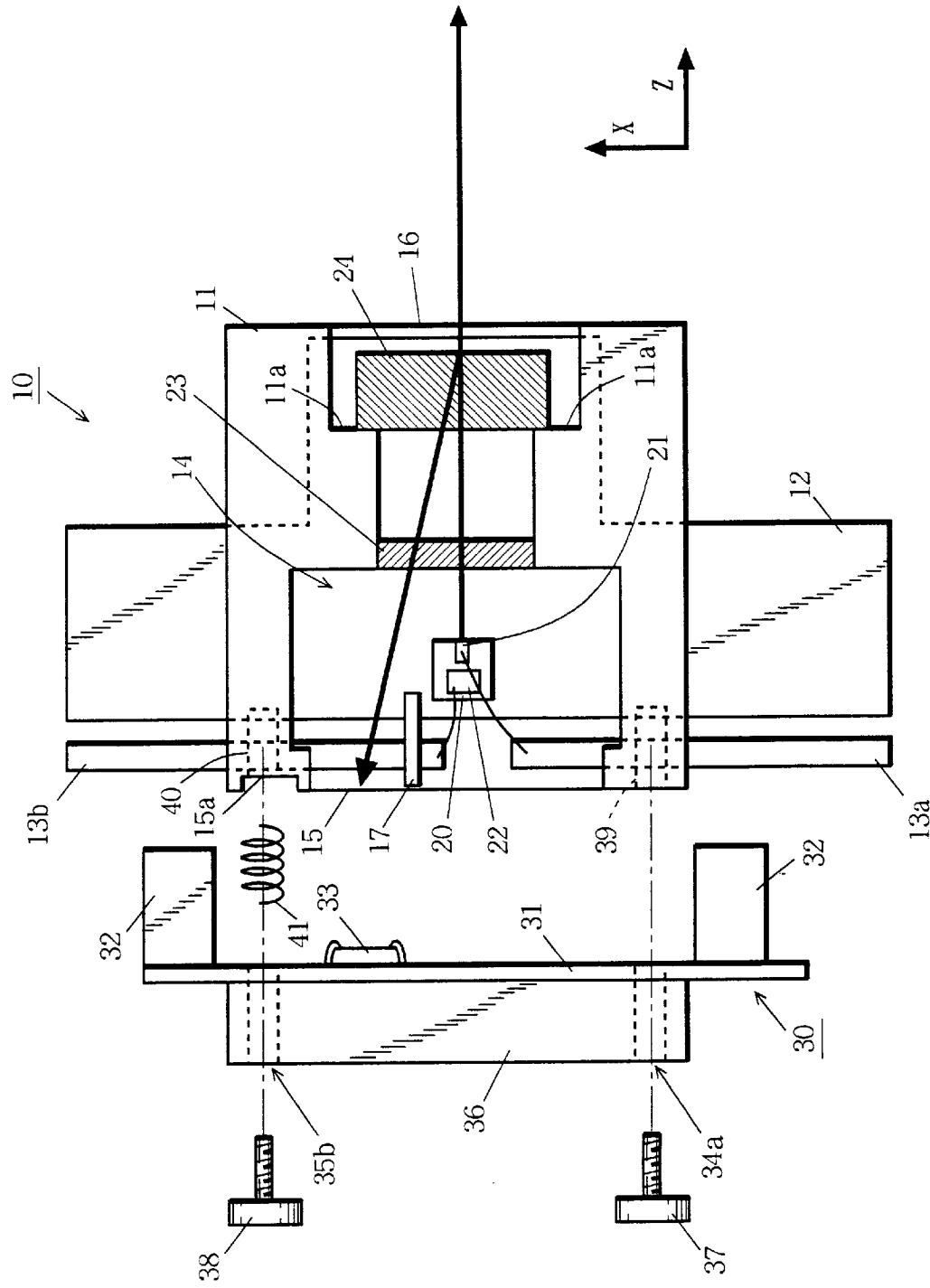
FIG. 11 is an exploded plan view of the optical pickup device shown in FIG. 10.
Figure 12:
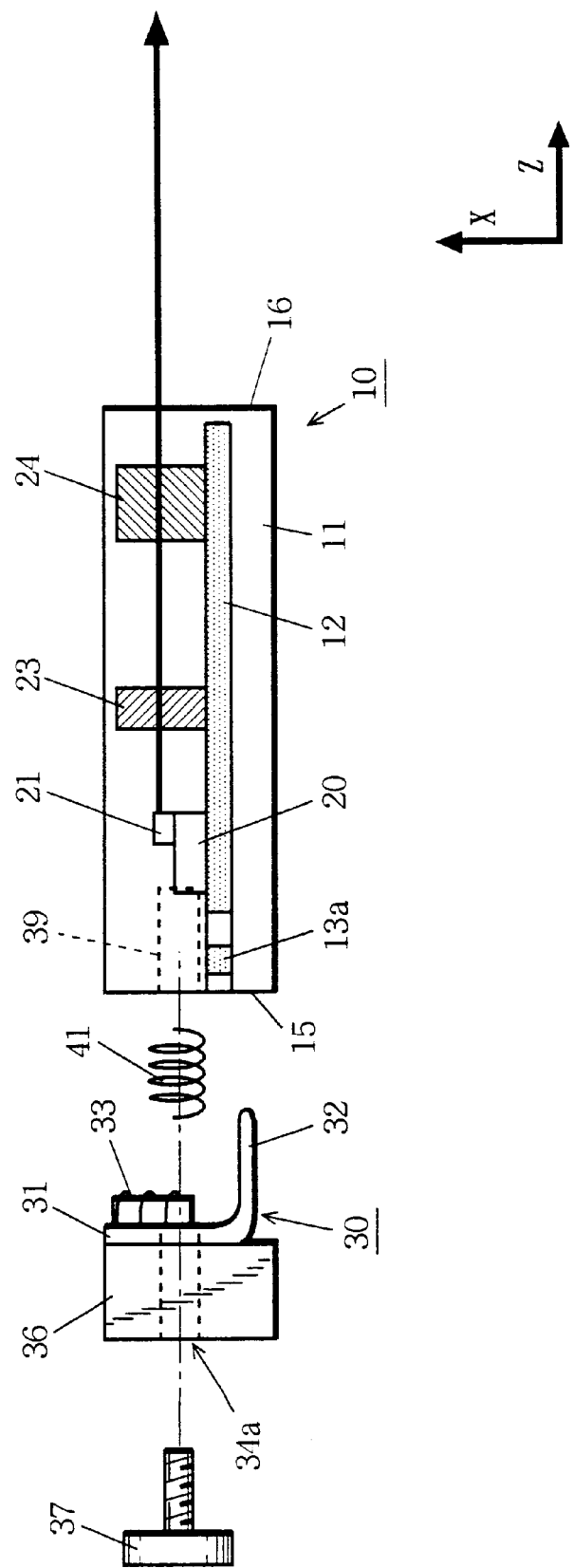
FIG. 12 is an exploded sectional view of the optical pickup device shown in FIG. 10.
Figure 13:
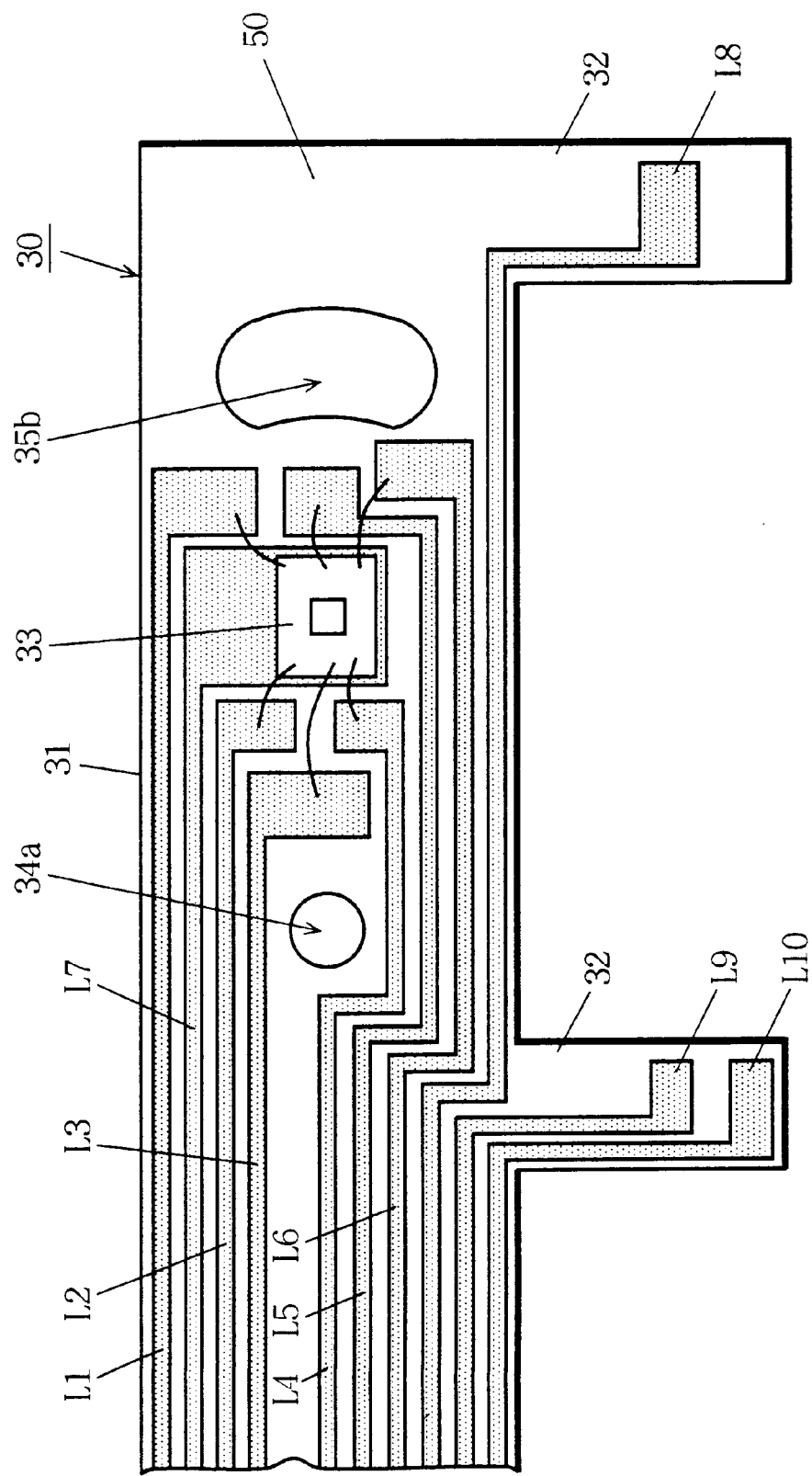
FIG. 13 is a plan view of a flexible circuit board used in the optical pickup device shown in FIG. 10.

FIG. 10 is an exploded perspective view of an optical pickup device according to a third embodiment of the present invention, FIG. 11 is an exploded plan view of the optical pickup device shown in FIG. 10, and FIG. 12 is an exploded sectional view of the optical pickup device shown in FIG. 10. FIG. 13 is a plan view of a flexible circuit board used in the optical pickup device shown in FIG. 10.

The optical pickup device shown in FIG. 10 differs from the optical pickup device shown in FIG. 1 in a position adjusting structure of a transmission type holographic optical element 24 and a position adjusting structure of a flexible circuit board 30.

Specifically, in FIGS. 10 to 13, the transmission type holographic optical element 24 is disposed movably in an X-axis direction along an inner side surface 11a of an insulating molding member 11 on a lead frame 12 at the time of assembling.

Furthermore, the flexible circuit board 30 is provided with a circular screw through hole 34a and an elliptic screw through hole 35b. Screws 37 and 38 are respectively inserted into threaded holes 39 and 40 formed on one end surface 15 of the insulating molding member 11 through the circular screw through hole 34a and the elliptic screw through hole 35b of the flexible circuit board 30. A coil spring 41 is inserted between a lead portion 31 of the flexible circuit board 30 and the one end surface 15 of the insulating molding member 11 on the side of the one screw 38. Further, a recess 15a detecting the coil spring 41 is formed on the one end surface 15 of the insulating molding member 11. Consequently, a photodiode for signal detection 33 mounted on the lead portion 31 of the flexible circuit board 30 is movable in a Z-axis direction depending on the amount of tightening of the screw 38.

Furthermore, the flexible circuit board 30 is rotatable along the length of the elliptic screw through hole 35b around the circular screw through hole 34a. Consequently, the photodiode for signal detection 33 is rotatable in a direction θ around the circular screw through hole 34a.

Figure 14:
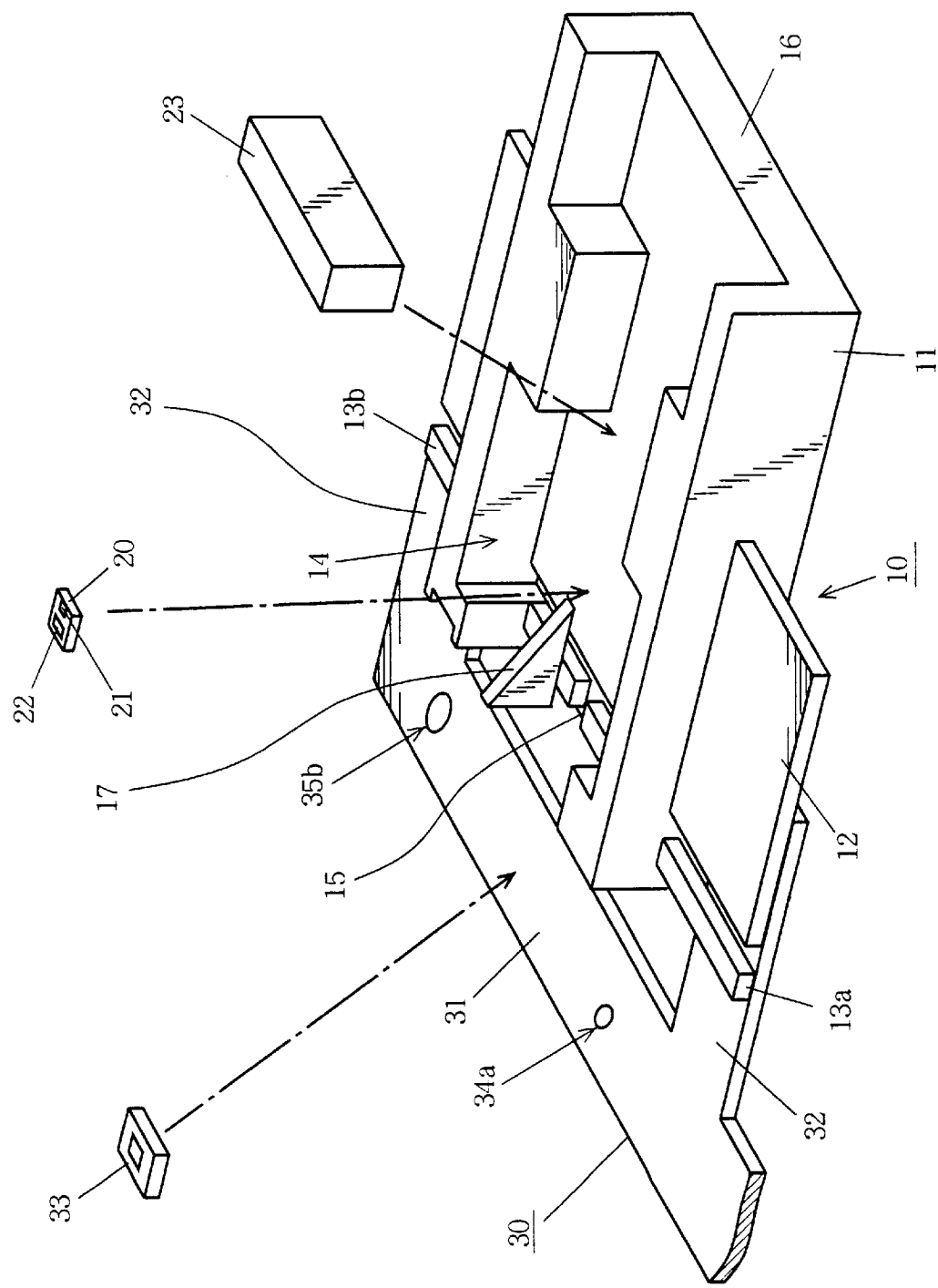
FIG. 14 is a perspective view showing the first step of fabricating the optical pickup device shown in FIG. 10.
Figure 15:
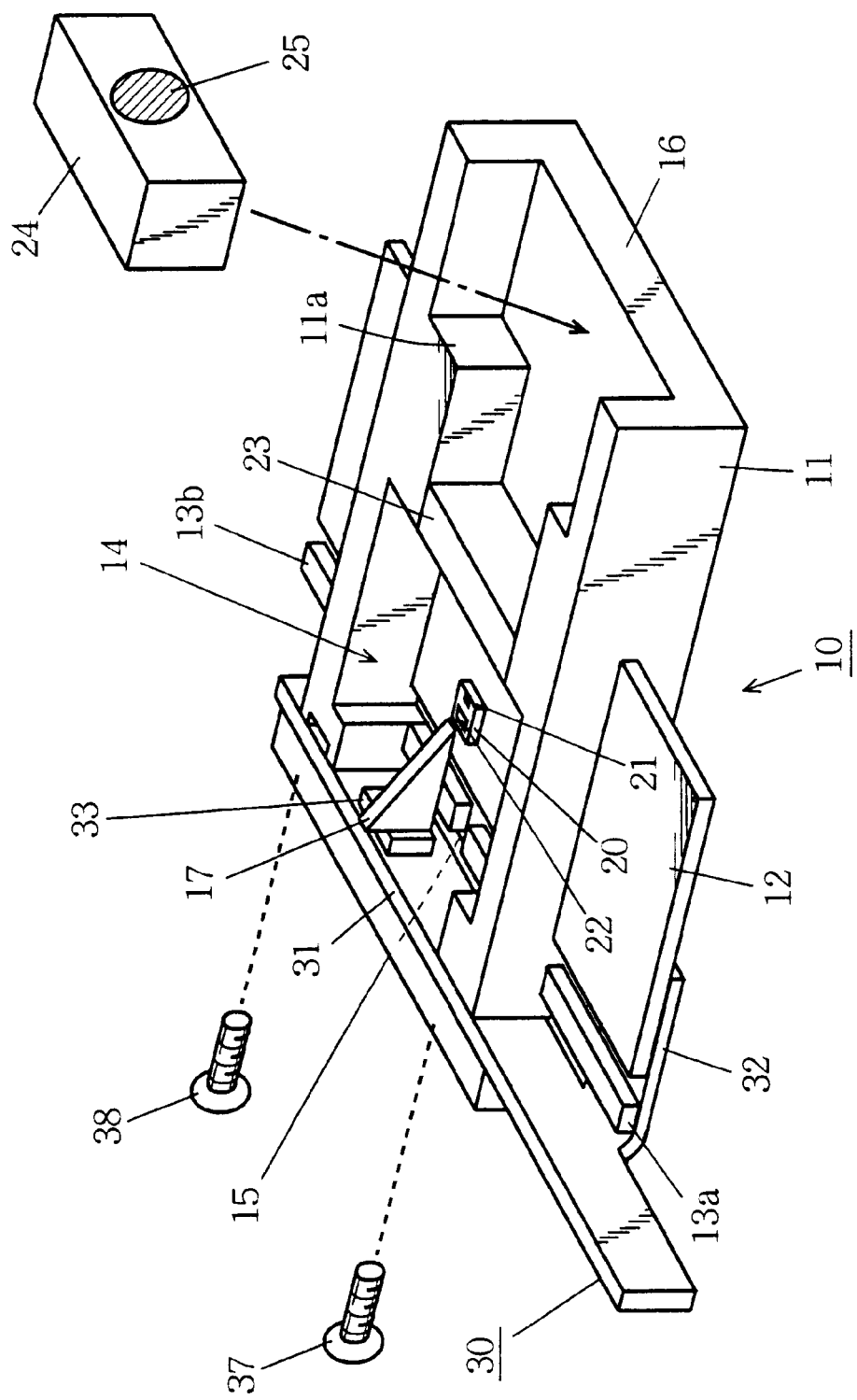
FIG. 15 is a perspective view showing the second step of fabricating the optical pickup device shown in FIG. 10.
Figure 16:
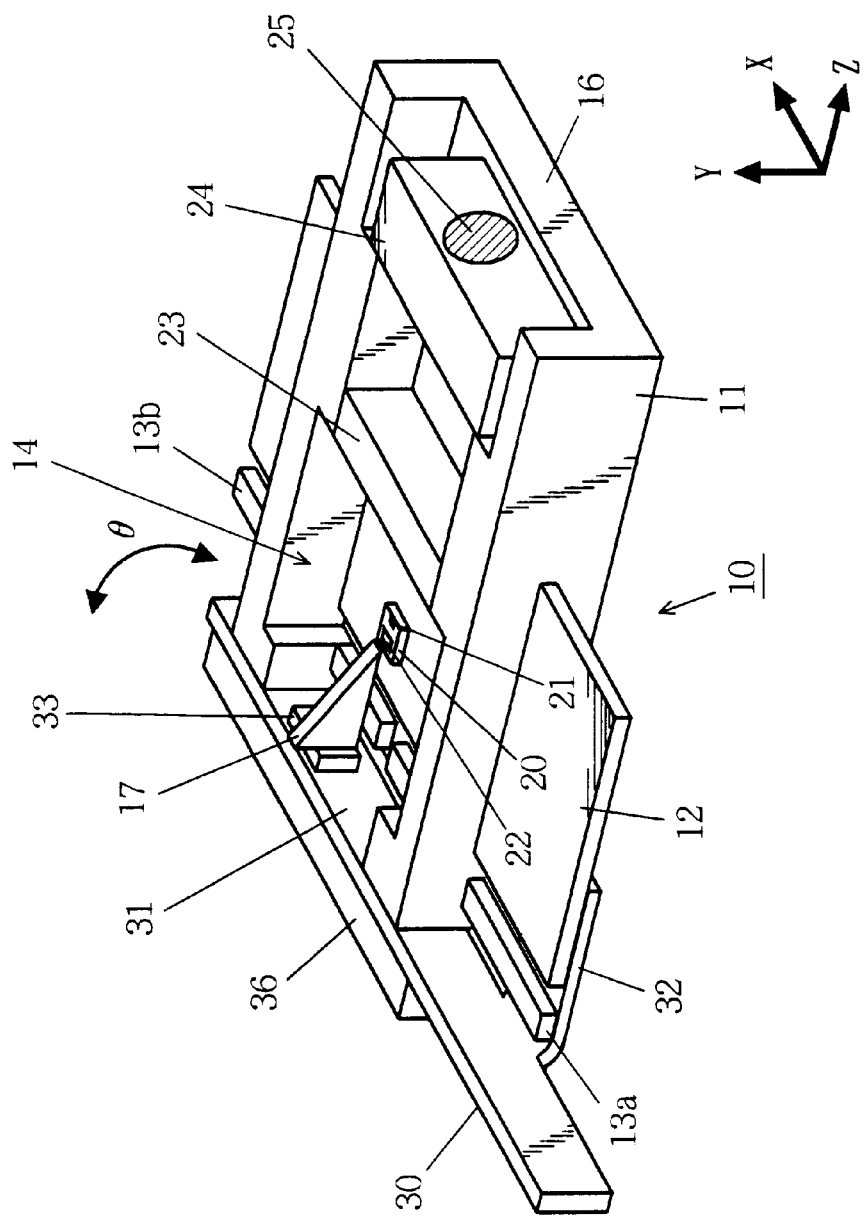
FIG. 16 is a perspective view showing the third step of fabricating the optical pickup device shown in FIG. 10.

Description is now made of a method of fabricating the optical pickup device according to the present invention. FIGS. 14, 15 and 16 are perspective views showing the steps of fabricating the optical pickup device shown in FIG. 10.

In the step shown in FIG. 14, the surface of a fixed porton 32 of the flexible circuit board 30 is fixed to the lead frame 12 and leads 13a and 13b by soldering or the like, as in the step shown in FIG. 6. In this state, a sub-mount 20 and a three-beam generating diffraction grating 23 are fixed on the lead frame 12 inside a recess 14 of the insulating molding member 11. Further, the photodiode for signal detection 33 is mounted on the surface of the lead portion 31 of the flexible circuit board 30. Thereafter, a semiconductor laser device 21, a photodiode for monitoring 22 and a photodiode for signal detection 33 are wire-bonded.

As shown in FIG. 15, the transmission type holographic optical element 24 is then put on the side of an end surface 16 on the lead frame 12 inside the recess 14 of the insulating molding member 11. Further, the lead portion 31 of the flexible circuit board 30 is folded almost perpendicularly to the fixed portion 32, and the screws 37 and 38 are respectively inserted into the threaded holes 39 and 40 on the one end surface 15 of the insulating molding member 11 through the screw through holes 34a and 35a of the flexible circuit board 30, to mount the lead portion 31 on the one end surface 15 of the insulating molding member 11.

Furthermore, as shown in FIG. 16, the transmission type holographic optical element 24 is movable in the X-axis direction on the lead frame 12 in this state. Further, the flexible circuit board 30 is movable in the direction θ along the elliptic screw through hole 35b around the circular screw through hole 34a. Further, the photodiode for signal detection 33 mounted on the flexible circuit board 30 is movable in the Z-axis direction by adjusting the amount of tightening of the screw 38 to move the lead portion 31 of the flexible circuit board 30 opposite to the one end surface 15 of the insulating molding member 11 through the coil spring 41 with respect to the one end surface of the insulating molding member 11.

Consequently, the relative position between the transmission type holographic optical element 24 and the photodiode for signal detection 33 can be adjusted in a three-dimensional manner by moving the transmission type holographic optical element 24 in the X-axis direction and moving the photodiode for signal detection 33 in the direction θ and the Z-axis direction.

After the positions of the transmission type holographic optical element 24 and the photodiode for signal detection 33 are adjusted, the transmission type holographic optical element 24 is fixed to the lead frame 12 using adhesives or the like, and the screws 37 and 38 are fixed to a holding plate 36, to fix the relative position between the flexible circuit board 30 and the one end surface 15 of the insulating molding member 11.

By the foregoing steps, an optical pickup device in which the relative position between the transmission type holographic optical element 24 and the photodiode for signal detection 33 is adjusted in a three-dimensional manner is obtained.

Figure 17:
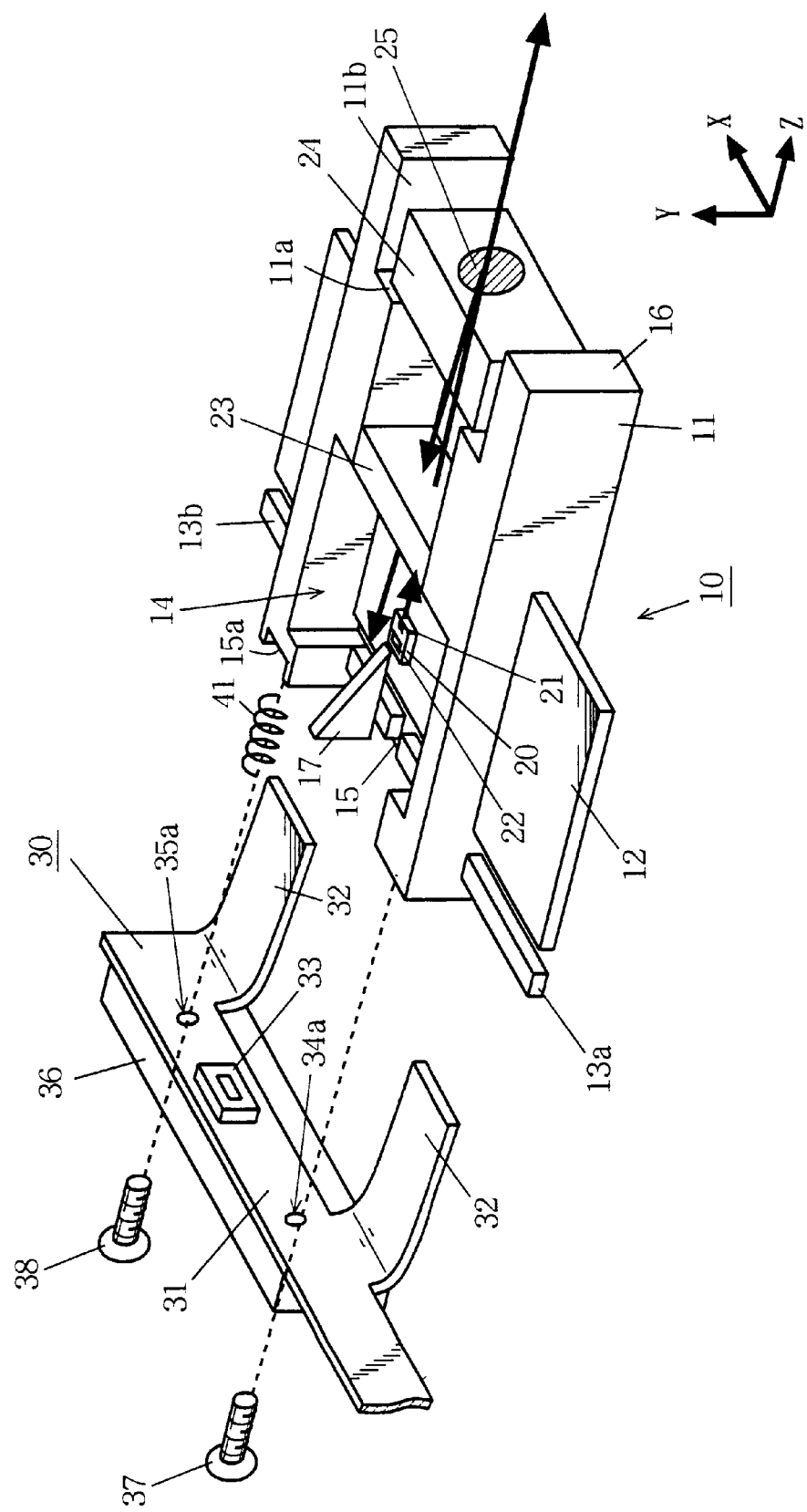
FIG. 17 is an exploded perspective view of an optical pickup device according to a fourth embodiment of the present invention.
Figure 18:
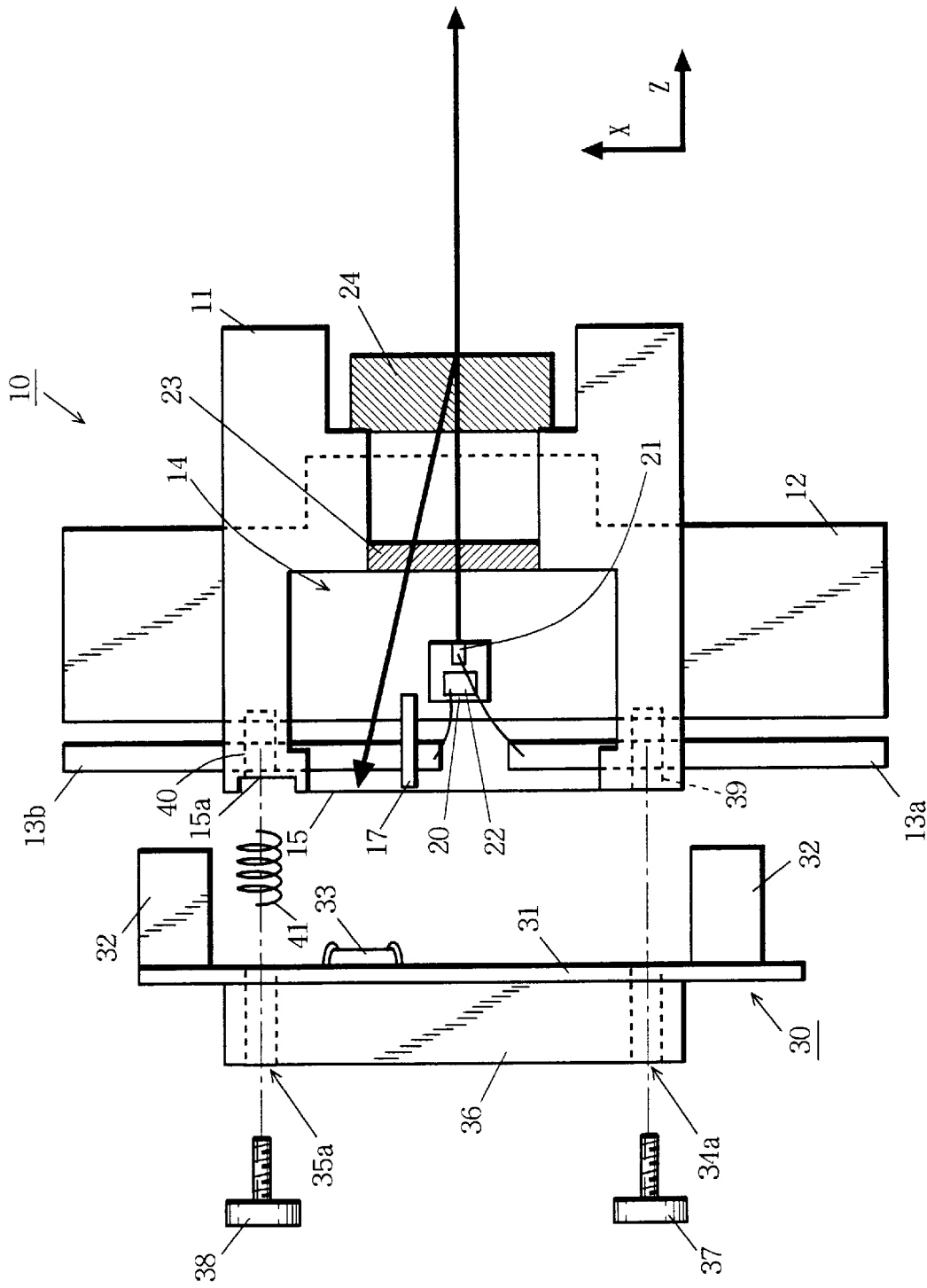
FIG. 18 is an exploded plan view of the optical pickup device shown in FIG. 17.
Figure 19:
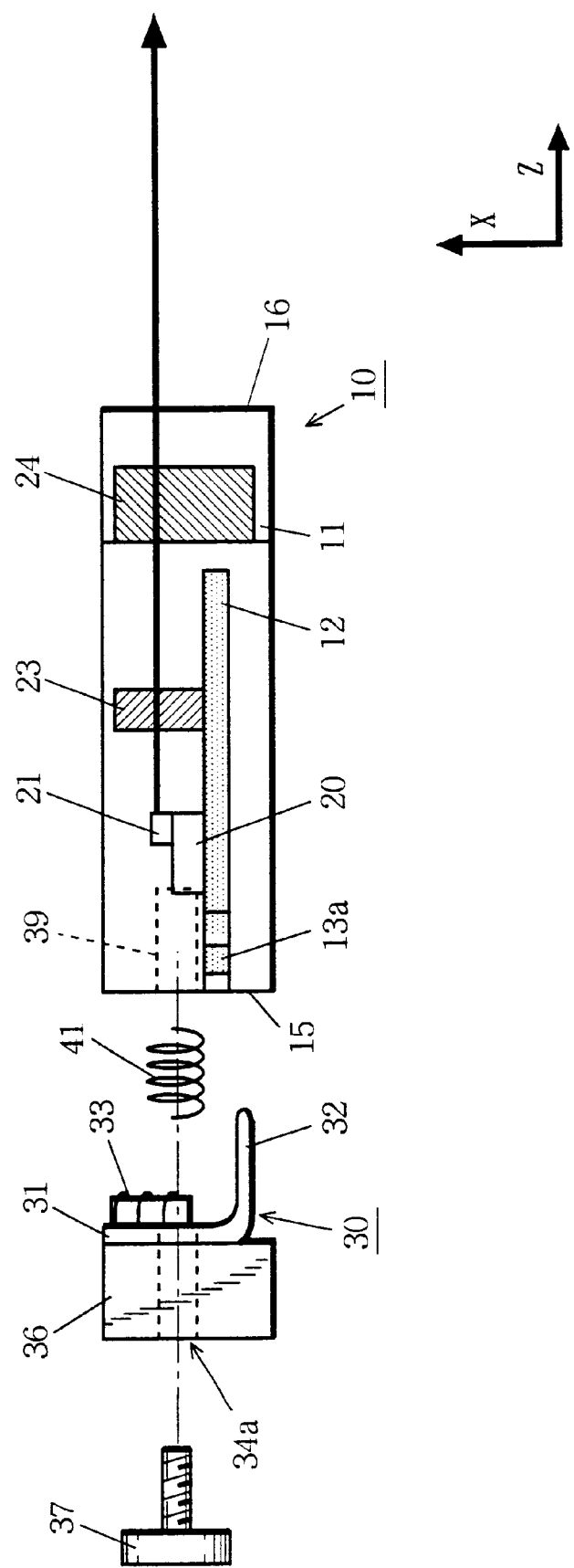
FIG. 19 is an exploded sectional view of the optical pickup device shown in FIG. 17.
Figure 20:
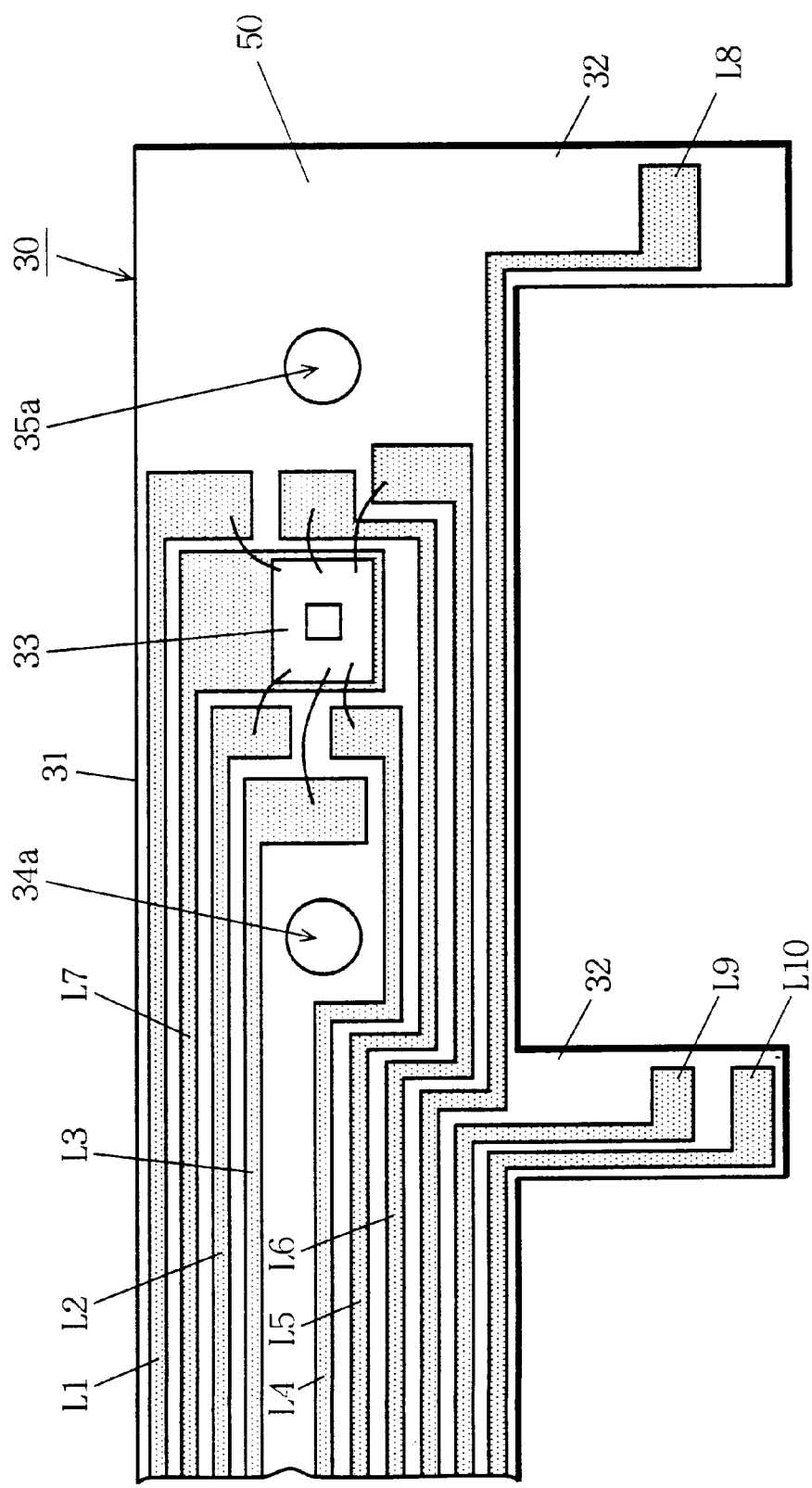
FIG. 20 is a plan view of a flexible circuit board used in the optical pickup device shown in FIG. 17.

FIG. 17 is an exploded perspective view of an optical pickup device according to a fourth embodiment of the present invention, FIG. 18 is an exploded plan view of the optical pickup device shown in FIG. 17, and FIG. 19 is an exploded sectional view of the optical pickup device shown in FIG. 17. FIG. 20 is a plan view of a flexible circuit board used in the optical pickup device shown in FIG. 17.

The optical pickup device shown in FIG. 17 differs from the optical pickup device shown in FIG. 1 in a position adjusting structure of a transmission type holographic optical element 24 and a position adjusting structure of a flexible circuit board 30.

Specifically, in FIGS. 17 to 20, the transmission type holographic optical element 24 is disposed movably in an X-axis direction and a Y-axis direction by inner side surfaces 11a and 11b of an insulating molding member 11 at the time of assembling.

Furthermore, the flexible circuit board 30 is provided with a pair of circular screw through holes 34a and 35a. Screws 37 and 38 are respectively inserted into threaded holes 39 and 40 formed on one end surface 15 of the insulating molding member 11 through the circular screw through holes 34a and 35a. A coil spring 41 is inserted between a lead portion 31 of the flexible circuit board 30 and the one end surface 15 of the insulating molding member 11 on the side of the one screw 38. Further, a recess 15a detecting the coil spring 41 is formed on the one end surface 15 of the insulating molding member 11. The amount of tightening of the screw 38 into the threaded hole 40 is adjusted, so that the flexible circuit board 30 is movable in a Z-axis direction. Consequently, a photodiode for signal detection 33 mounted on the lead portion 31 of the flexible circuit board 30 is movable in the Z-axis direction.

Figure 21:
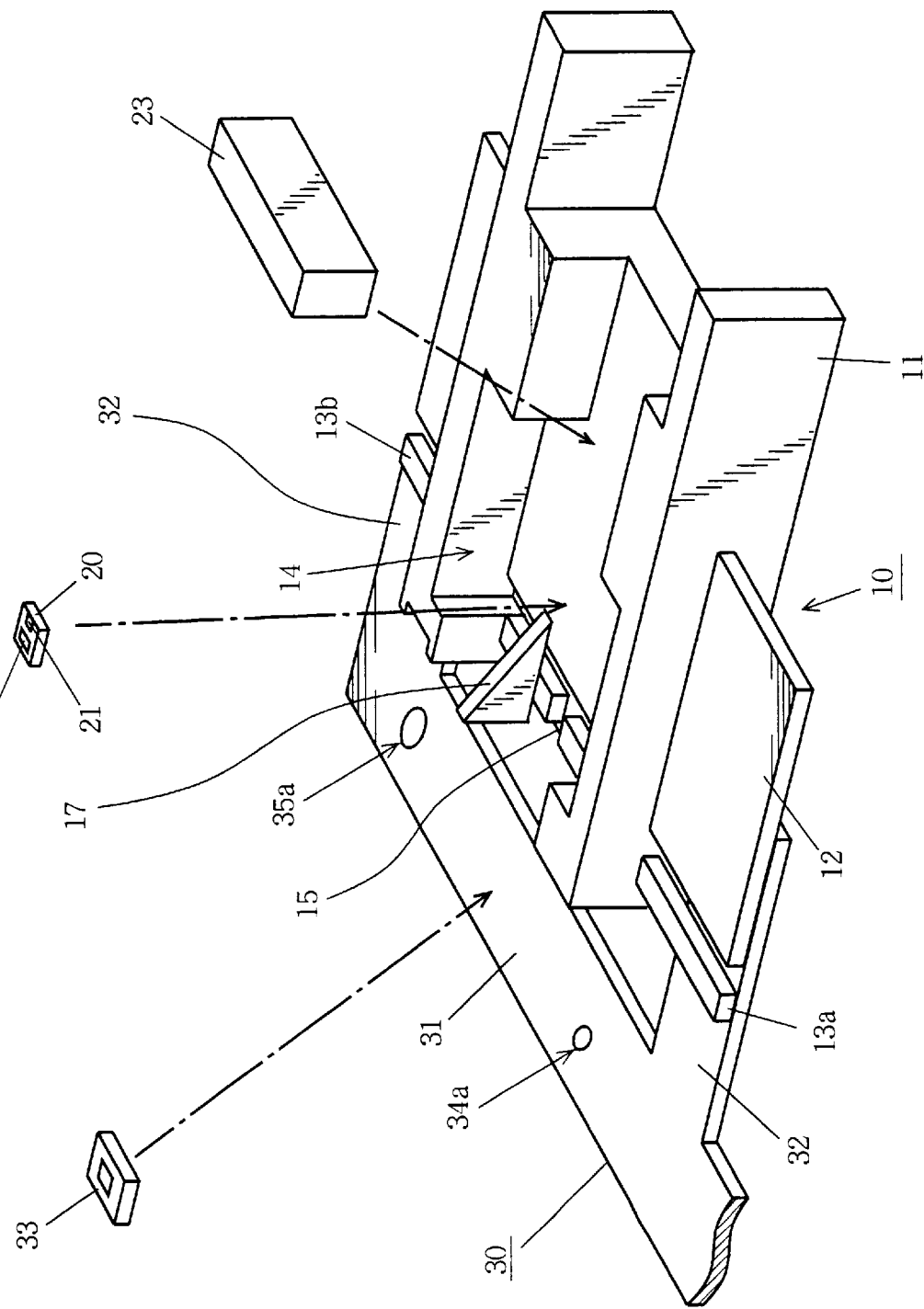
FIG. 21 is a perspective view showing the first step of fabricating the optical pickup device shown in FIG. 17.
Figure 22:
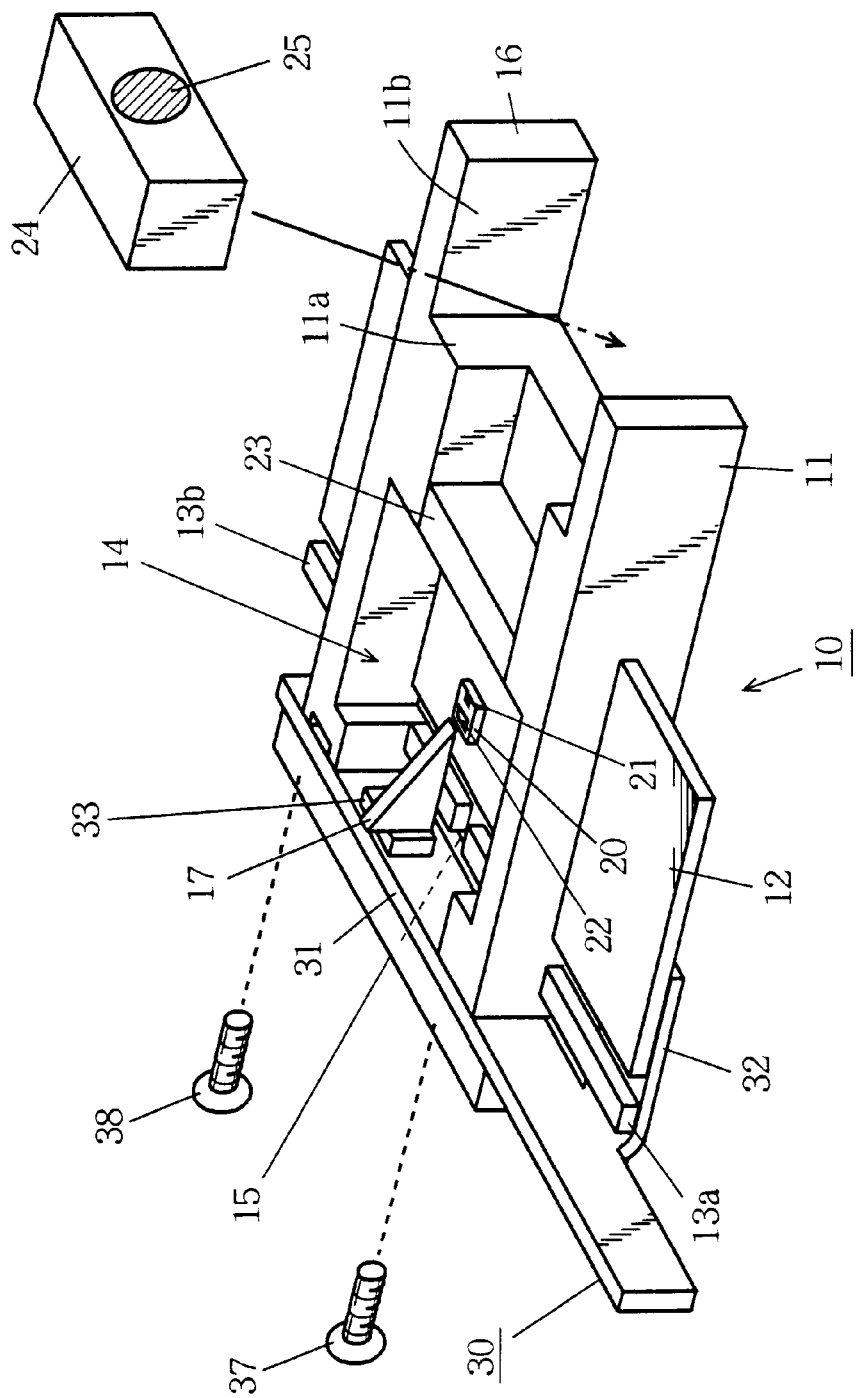
FIG. 22 is a perspective view showing the second step of fabricating the optical pickup device shown in FIG. 17.
Figure 23:
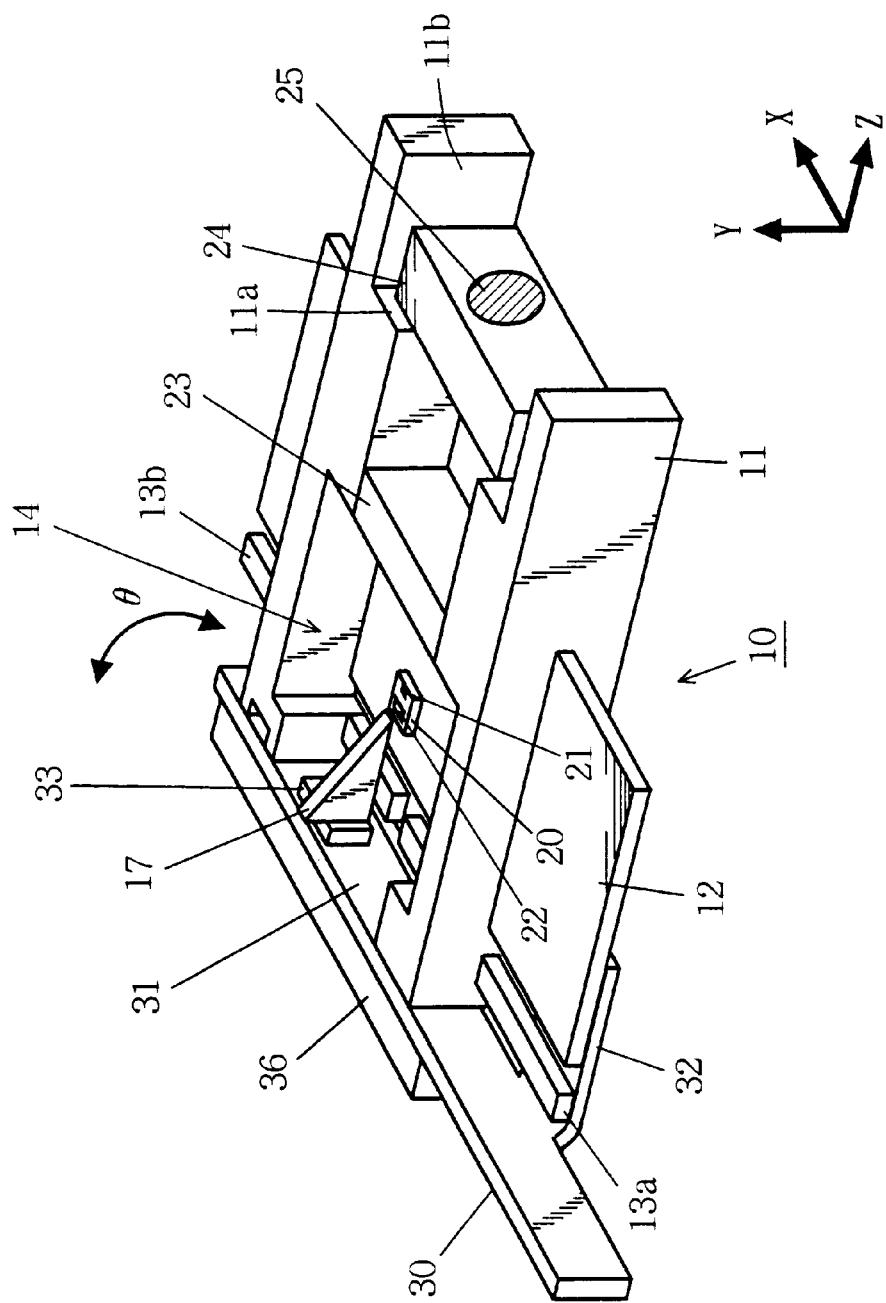
FIG. 23 is a perspective view showing the third step of fabricating the optical pickup device shown in FIG. 17.

Description is now made of a method of fabricating the optical pickup device according to the present invention. FIGS. 21, 22 and 23 are perspective views showing the steps of fabricating the optical pickup device shown in FIG. 17.

In the step shown in FIG. 21, the surface of a fixed portion 32 of the flexible circuit board 30 is first fixed to a lead frame 12 and leads 13a and 13b by soldering or the like. In this state, a sub-mount 20 on which a semiconductor laser device 21 is put and a three-beam generating diffraction grating 23 are fixed on the lead frame 12 inside a recess 14 of the insulating molding member 11. Further, the photodiode for signal detection 33 is mounted on the surface of the lead portion 31 of the flexible circuit board 30. Thereafter, the semiconductor laser device 21, a photodiode for monitoring 22 and the photodiode for signal detection 33 are wire-bonded.

As shown in FIG. 22, the transmission type holographic optical element 24 is then put on the side of an end surface 16 inside the recess 14 of the insulating molding member 11. Further, the lead portion 31 of the flexible circuit board 30 is folded almost perpendicularly to the fixed portion 32, and the screws 37 and 38 are respectively inserted into the threaded holes 39 and 40 on the one end surface 15 of the insulating molding member 11 through the screw through holes 34a and 35a of the flexible circuit board 30, to mount the lead portion 31 on the one end surface 15 of the insulating molding member 11.

Furthermore, as shown in FIG. 23, the transmission type holographic optical element 24 is movable in the X-axis direction and the Y-axis direction upon being guided by the inner side surfaces 11a and 11b of the insulating molding member 11 in this state. Further, the flexible circuit board 30 is movable in the Z-axis direction by adjusting the amount of tightening of the screw 38 (see FIG. 17) to move the lead portion 31 of the flexible circuit board 30 opposite to the one end surface 15 of the insulating molding member 11 through the coil spring 41 with respect to the one end surface 15 of the insulating molding member 11.

Consequently, the relative position between the transmission type holographic optical element 24 and the photodiode for signal detection 33 can be adjusted in a three-dimensional manner by moving the transmission type holographic optical element 24 in the X-axis direction and the Y-axis direction and moving the photodiode for signal detection 33 in the Z-axis direction.

After the positions of the transmission type holographic optical element 24 and the photodiode for signal detection 33 are adjusted, the transmission type holographic optical element 24 is fixed to the insulating molding member 11 using adhesives or the like, and the screws 37 and 38 are fixed to a holding plate 36, to fix the relative position between the flexible circuit board 30 and the one end surface 15 of the insulating molding member 11.

By the foregoing steps, an optical pickup device in which the relative position between the transmission type holographic optical element 24 and the photodiode for signal detection 33 is adjusted in a three-dimensional manner is obtained.

Figure 24:
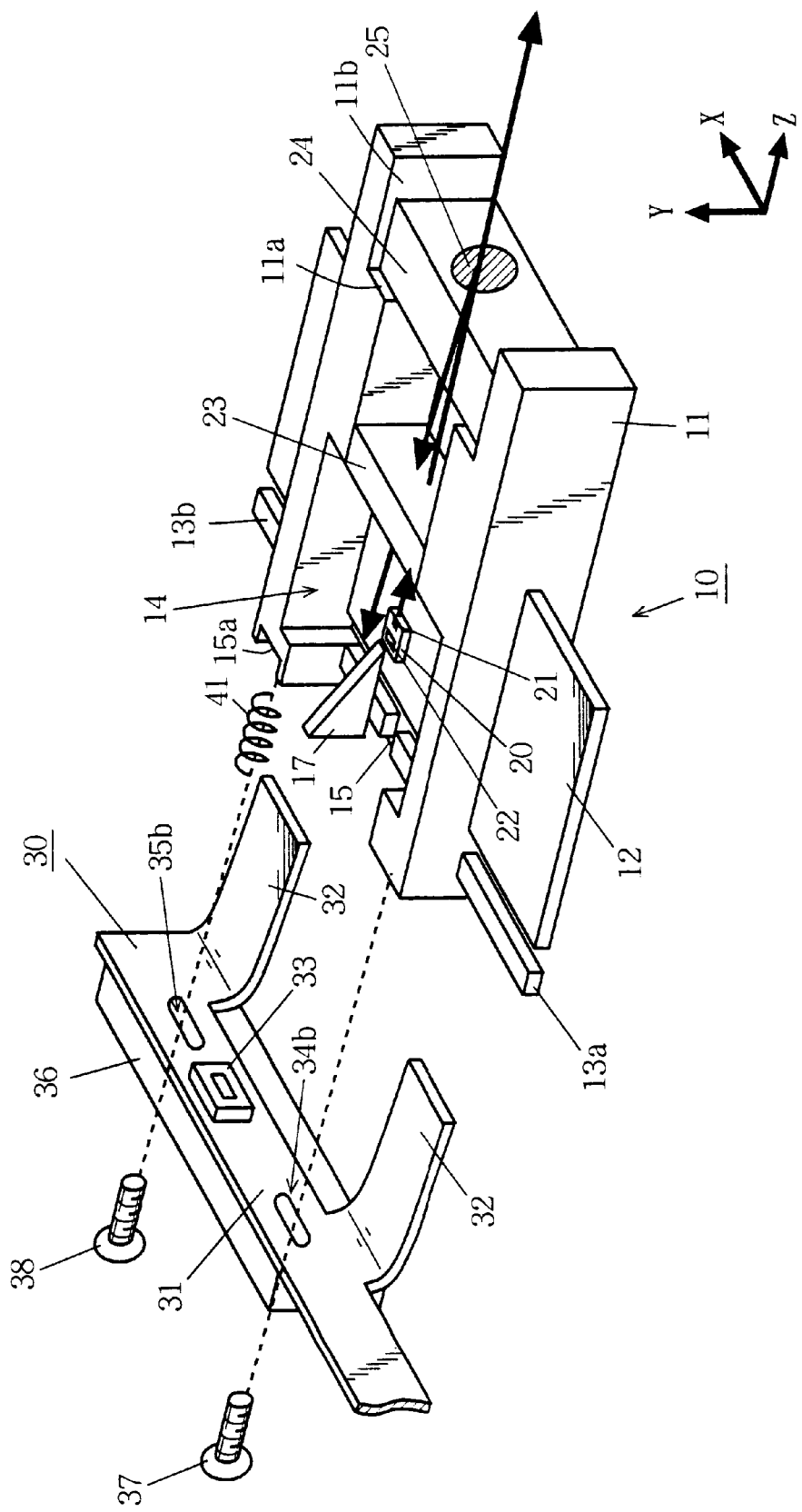
FIG. 24 is an exploded perspective view showing an optical pickup device according to a fifth embodiment of the present invention.
Figure 25:
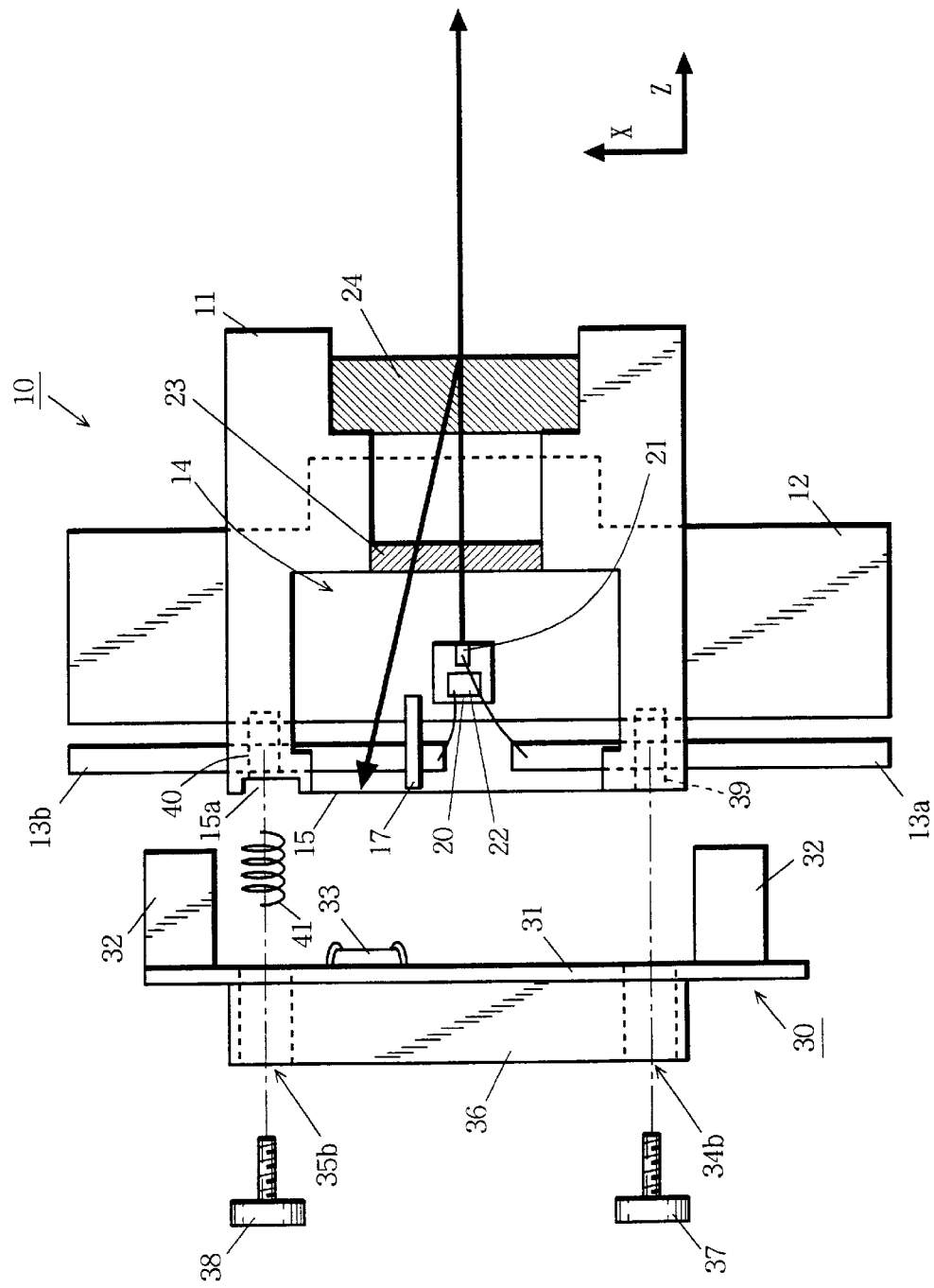
FIG. 25 is an exploded plan view of the optical pickup device shown in FIG. 24.
Figure 26:
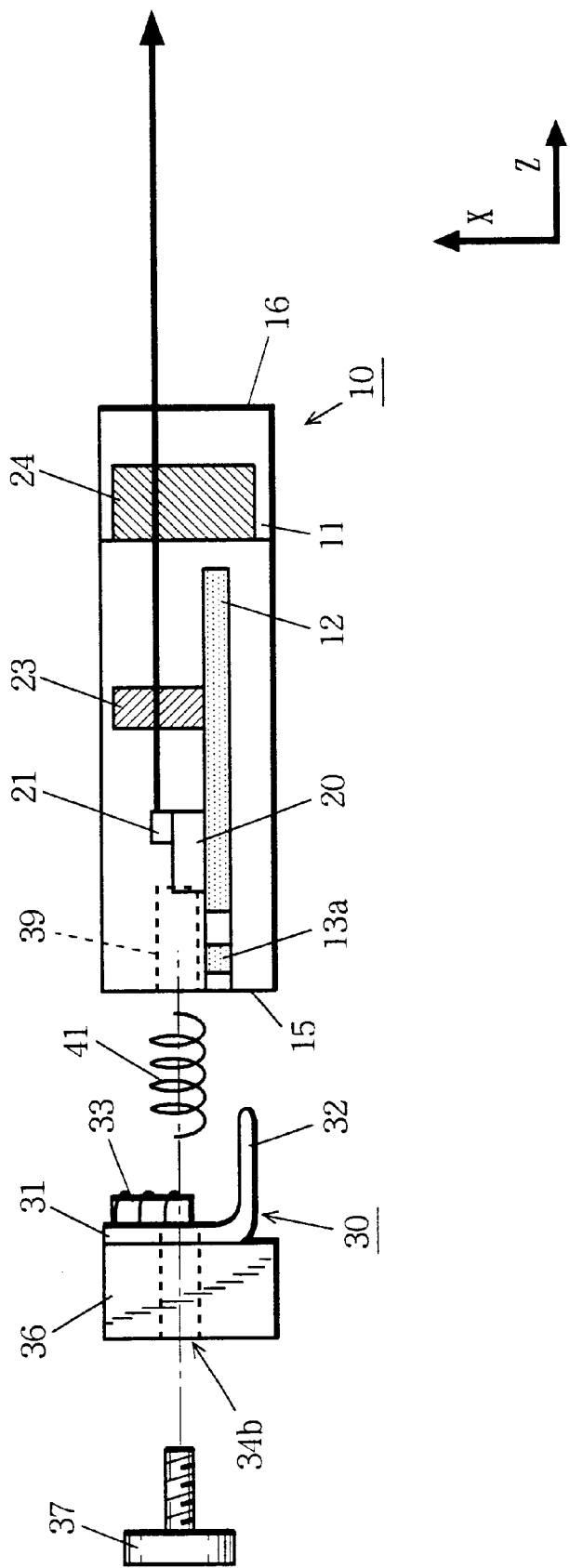
FIG. 26 is an exploded sectional view of the optical pickup device shown in FIG. 24.
Figure 27:
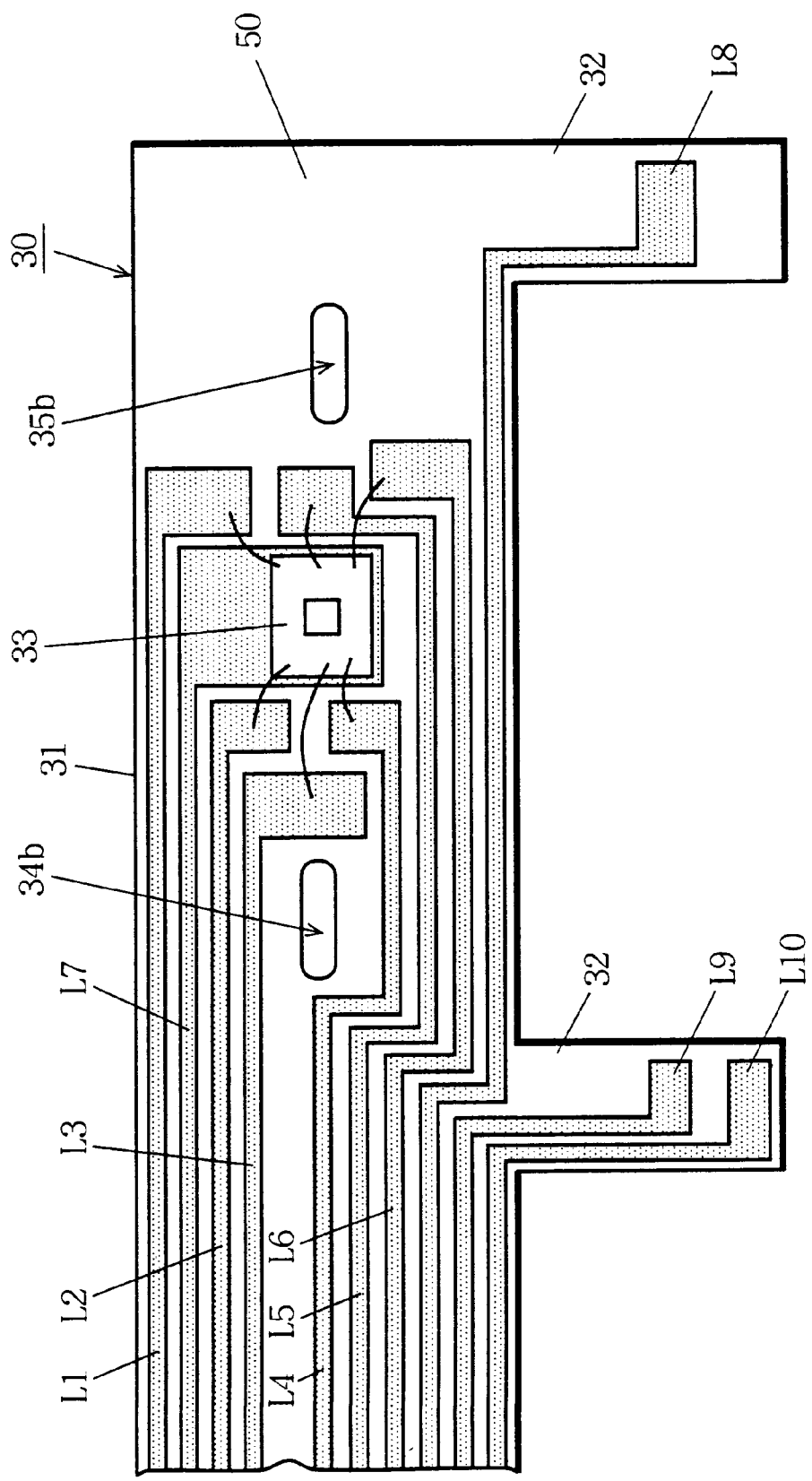
FIG. 27 is a plan view of a flexible circuit board used in the optical pickup device shown in FIG. 24.

FIG. 24 is an exploded perspective view of an optical pickup device according to a fifth embodiment of the present invention, FIG. 25 is an exploded plan view of the optical pickup device shown in FIG. 24, and FIG. 26 is an exploded sectional view of the optical pickup device shown in FIG. 24. FIG. 27 is a plan view of a flexible circuit board used in the optical pickup device shown in FIG. 24.

The optical pickup device shown in FIG. 24 differs from the optical pickup device shown in FIG. 1 in a position adjusting structure of a transmission type holographic optical element 24 and a position adjusting structure of a flexible circuit board 30.

Specifically, in FIGS. 24 to 27, the transmission type holographic optical element 24 is disposed movably in a Y-axis direction along an inner side surface 11a of an insulating molding member 11 at the time of assembling.

Furthermore, the flexible circuit board 30 is provided with a pair of elliptic screw through holes 34b and 35b extending in a X-axis direction. Screws 37 and 38 are respectively inserted into threaded holes 39 and 40 formed on one end surface 15 of the insulating molding member 11 through the elliptic screw through holes 34b and 35b.

The one screw 38 is inserted into the threaded hole 40 with a coil spring 41 interposed between a lead portion 31 of the flexible circuit board 30 and the one end surface 15 of the insulating molding member 11. Further, a recess 15a detecting the coil spring 41 is formed on the one end surface 15 of the insulating molding member 11. Consequently, the flexible circuit board 30 is movable in a Z-axis direction depending on the amount of tightening of the screw 38.

Furthermore, the flexible circuit board 30 is movable in the X-axis direction by the screw through holes 34b and 35b.

Consequently, a photodiode for signal detection 33 mounted on the lead portion 31 of the flexible circuit board 30 is movable in the X-axis direction and the Z-axis direction.

Figure 28:
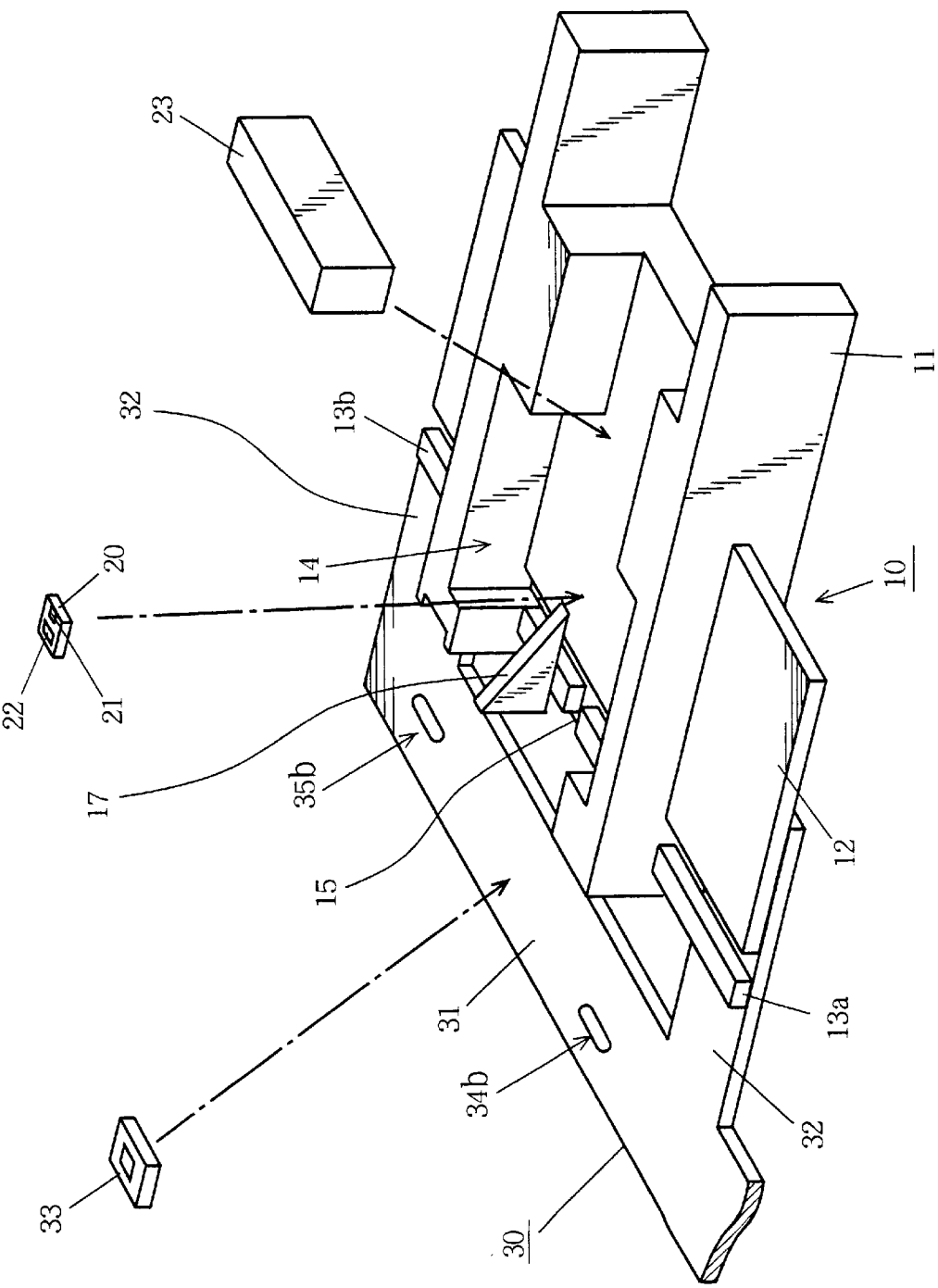
FIG. 28 is a perspective view showing the first step of fabricating the optical pickup device shown in FIG. 24.
Figure 29:
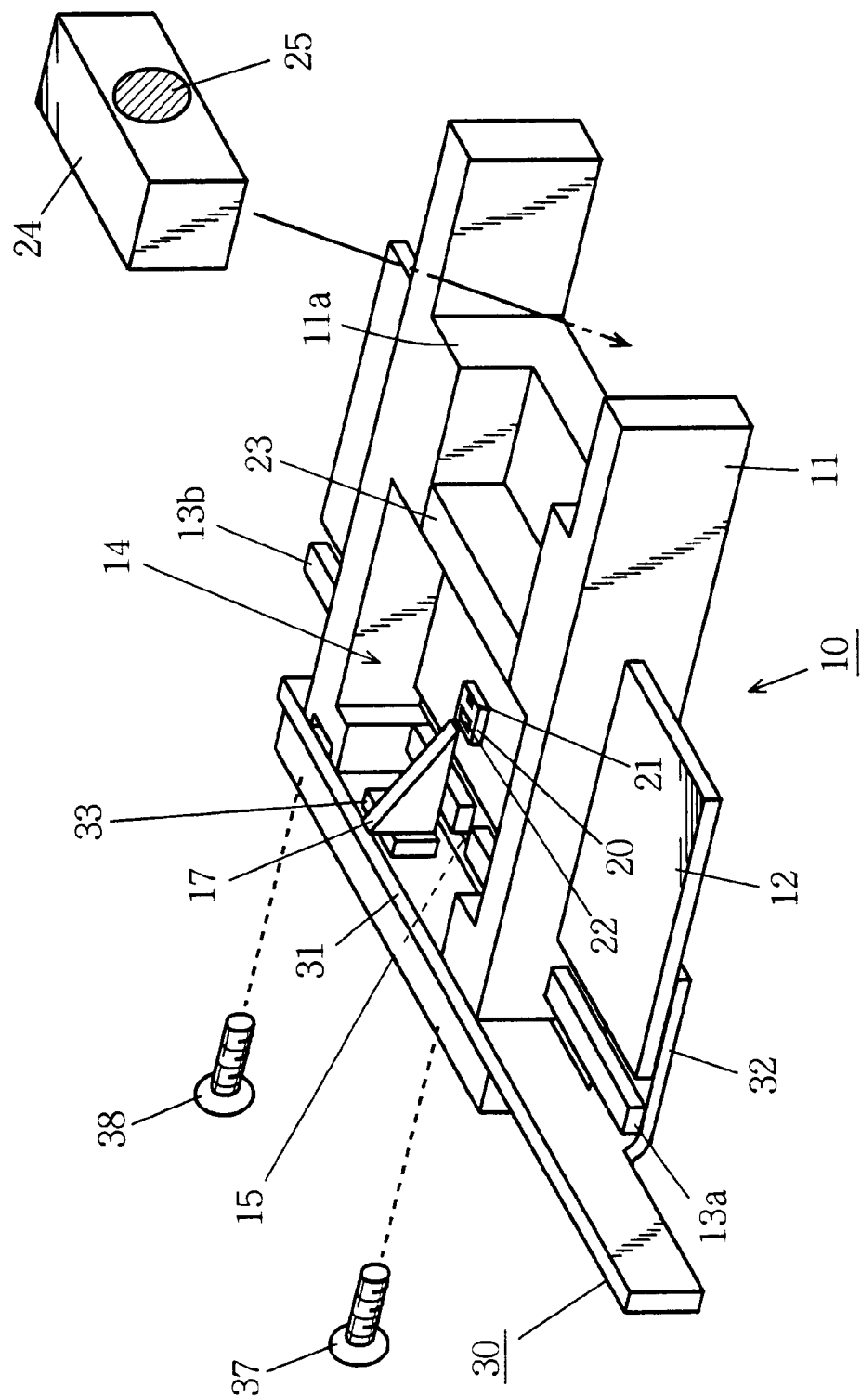
FIG. 29 is a perspective view showing the second step of fabricating the optical pickup device shown in FIG. 24.
Figure 30:
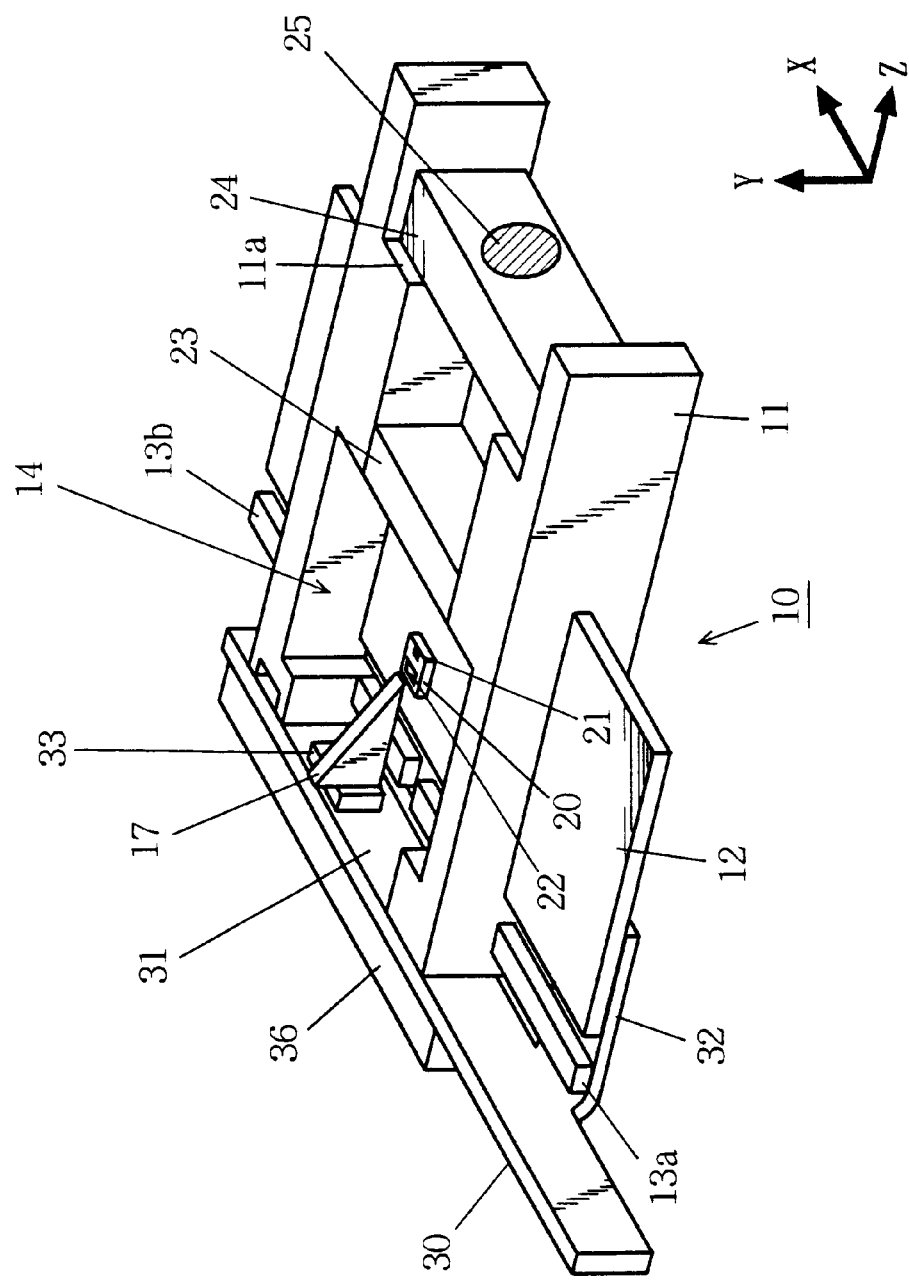
FIG. 30 is a perspective view showing the third step of fabricating the optical pickup device shown in FIG. 24.

Description is now made of a method of fabricating the optical pickup device according to the present invention. FIGS. 28, 29 and 30 are perspective views showing the steps of fabricating the optical pickup device shown in FIG. 24.

In the step shown in FIG. 28, the surface of a fixed portion 32 of the flexible circuit board 30 is first fixed to a lead frame 12 and leads 13a and 13b by soldering or the like. In this state, a sub-mount 20 and a three-beam generating diffraction grating 23 are fixed on the lead frame 12 inside a recess 14 of the insulating molding member 11. Further, the photodiode for signal detection 33 is mounted on the surface of the lead portion 31 of the flexible circuit board 30. Thereafter, a semiconductor laser device 21, a photodiode for monitoring 22 and the photodiode for signal detection 33 are wire-bonded.

As shown in FIG. 29, the transmission type holographic optical element 24 is then arranged on the side of an end surface 16 inside the recess 14 of the insulating molding member 11. Further, the lead portion 31 of the flexible circuit board 30 is folded almost perpendicularly to the fixed portion 32, and the screws 37 and 38 are respectively inserted into the threaded holes 39 and 40 on the one end surface 15 of the insulating molding member 11 through the screw through holes 34b and 35b of the flexible circuit board 30, to mount the lead portion 31 on the one end surface 15 of the insulating molding member 11.

Furthermore, as shown in FIG. 30, the transmission type holographic optical element 24 is movable in the Y-axis direction along the inner side surface 11a of the insulating molding member 11 in this state. Further, the flexible circuit board 30 is movable in the X-axis direction along the elliptic screw through holes 34b and 35b extending in the X-axis direction, and is movable in the Z-axis direction by adjusting the amount of tightening of the screw 38 to move the lead portion 31 of the flexible circuit board 30 through the coil spring 41 with respect to the one end surface 15 of the insulating molding member 11.

Consequently, the relative position between the transmission type holographic optical element 24 and the photodiode for signal detection 33 can be adjusted in a three-dimensional manner by moving the transmission type holographic optical element 24 in the Y-axis direction and moving the photodiode for signal detection 33 in the X-axis direction and the Z-axis direction.

After the positions of the transmission type holographic optical element 24 and the photodiode for signal detection 33 are adjusted, the transmission type holographic optical element 24 is fixed to a predetermined position of the insulating molding member 11 using adhesives or the like, and the screws 37 and 38 are fixed to a holding plate 36, to fix the relative position between the flexible circuit board 30 and the one end surface 15 of the insulating molding member 11.

By the foregoing steps, an optical pickup device in which the relative position between the transmission type holographic optical element 24 and the photodiode for signal detection 33 is adjusted in a three-dimensional manner is obtained.

Figure 31:
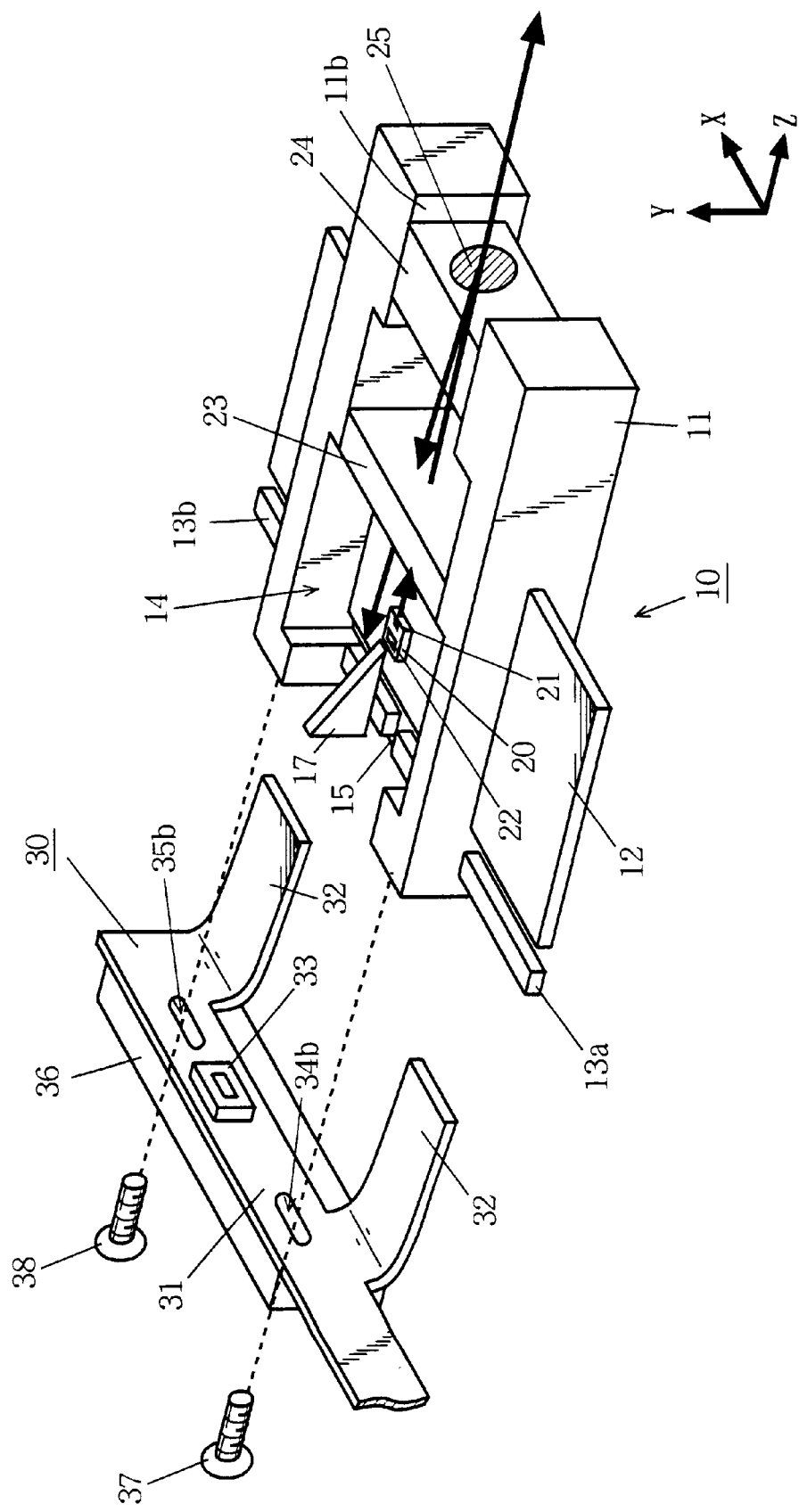
FIG. 31 is an exploded perspective view of an optical pickup device according to a sixth embodiment of the present invention.
Figure 32:
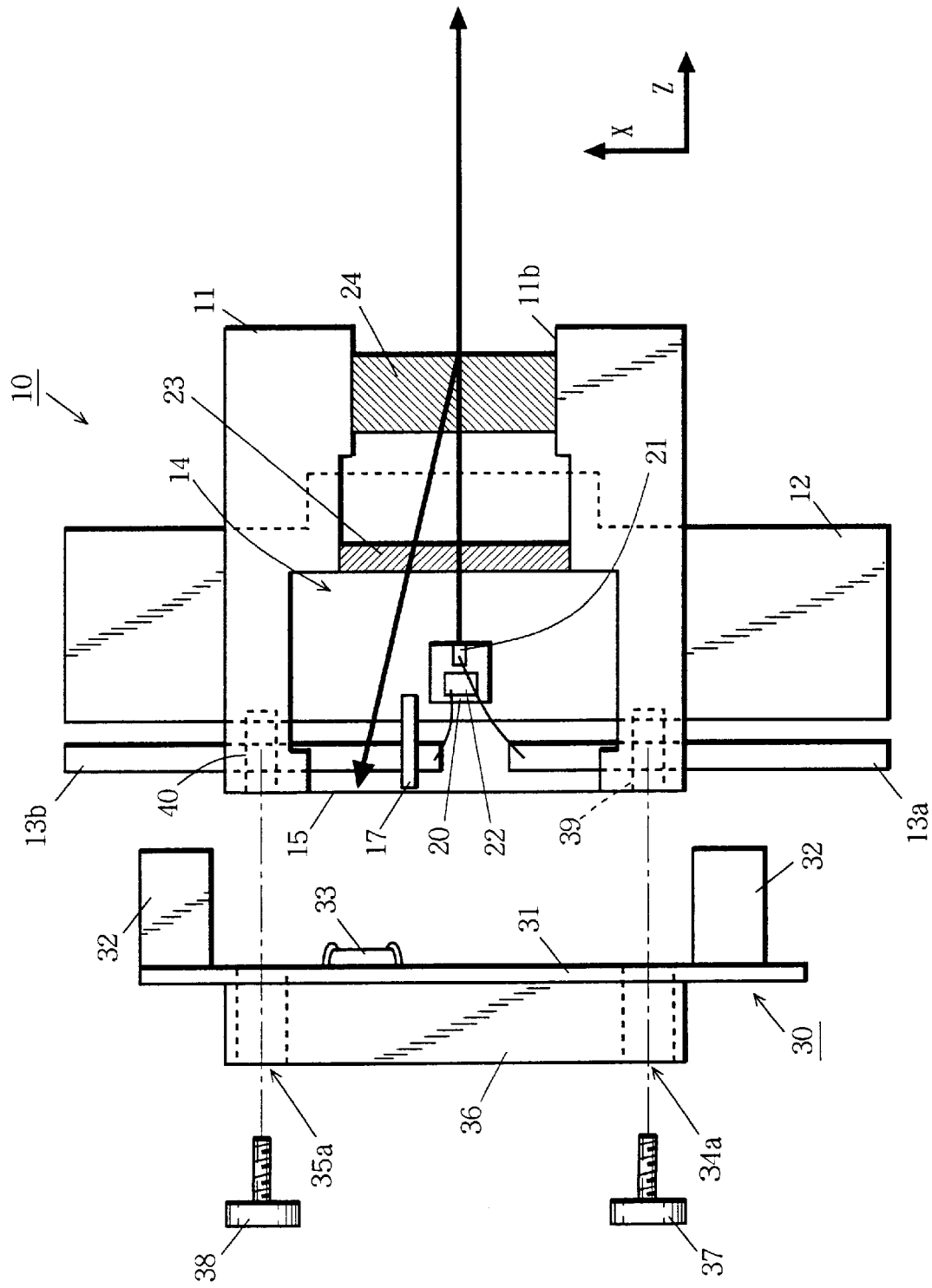
FIG. 32 is an exploded plan view of the optical pickup device shown in FIG. 31.
Figure 33:
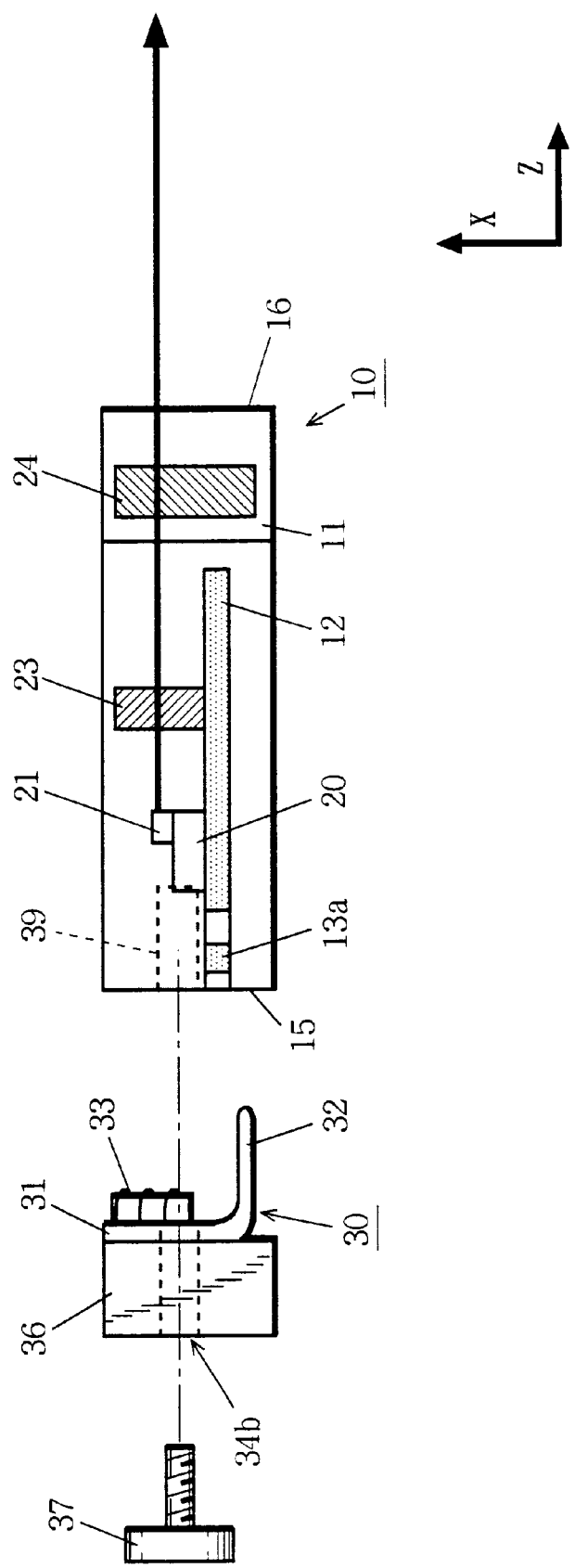
FIG. 33 is an exploded sectional view of the optical pickup device shown in FIG. 31.
Figure 34:
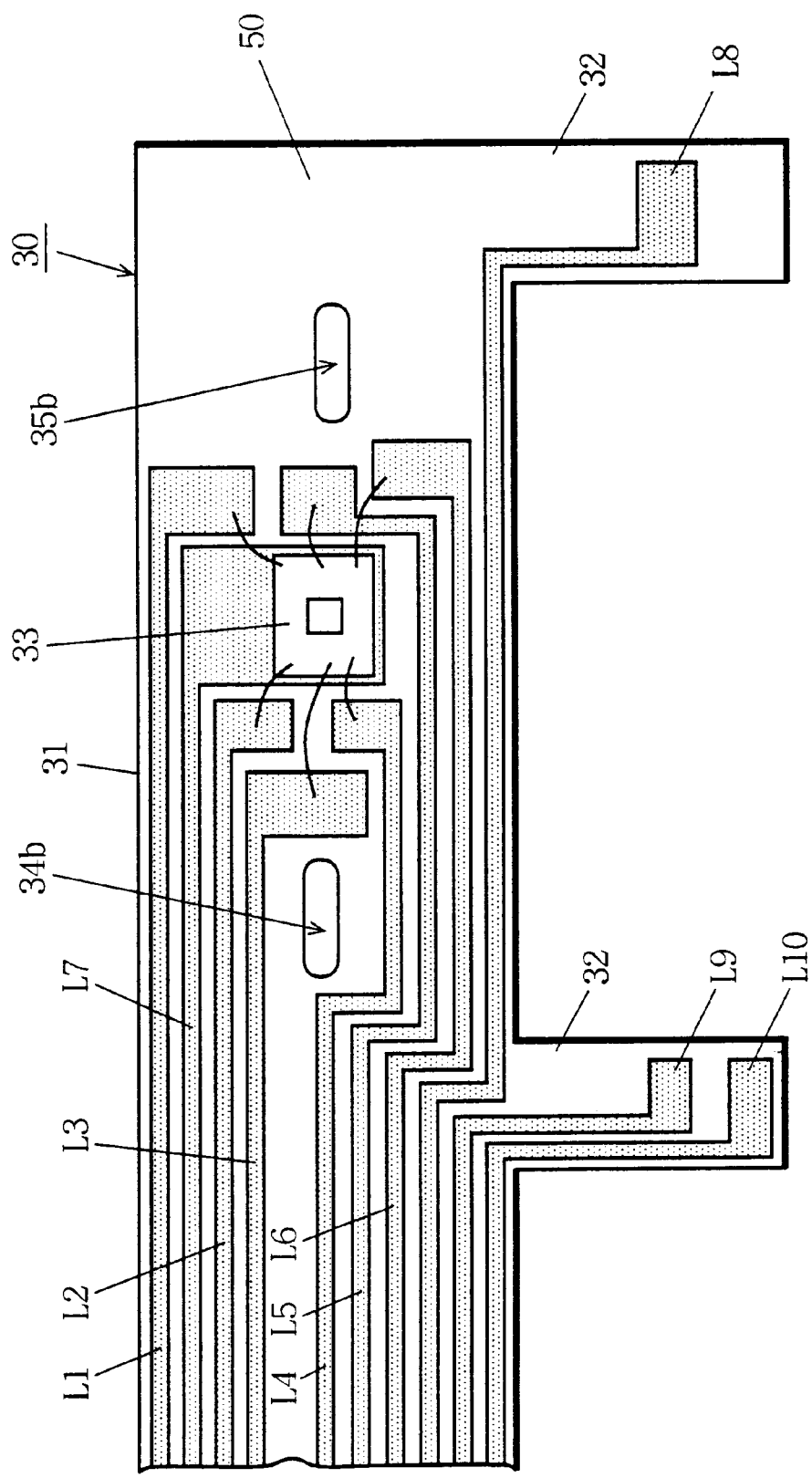
FIG. 34 is a plan view of a flexible circuit board used in the optical pickup device shown in FIG. 31.

FIG. 31 is an exploded perspective view of an optical pickup device according to a sixth embodiment of the present invention, FIG. 32 is an exploded plan view of the optical pickup device shown in FIG. 31, and FIG. 33 is an exploded sectional view of the optical pickup device shown in FIG. 31. FIG. 34 is a plan view of a flexible circuit board used in the optical pickup device shown in FIG. 31.

The optical pickup device shown in FIG. 31 differs from the optical pickup device shown in FIG. 1 in a position adjusting structure of a transmission type holographic optical element 24 and a position adjusting structure of a flexible circuit board 30.

Specifically, in FIGS. 31 to 34, the transmission type holographic optical element 24 is disposed movably in a Y-axis direction and a Z-axis direction along an inner side surface 11b of an insulating molding member 11 at the time of assembling.

Furthermore, the flexible circuit board 30 is provided with a pair of elliptic screw through holes 34b and 35b extending in an X-axis direction. Screws 37 and 38 are respectively inserted into threaded holes 39 and 40 formed on one end surface 15 of the insulating molding member 11 through the elliptic screw through holes 34b and 35b. A photodiode for signal detection 33 mounted on a lead portion 31 of the flexible circuit board 30 is movable in the X-axis direction by moving the flexible circuit board 30 along the length of the elliptic screw through holes 34b and 35b.

Figure 35:
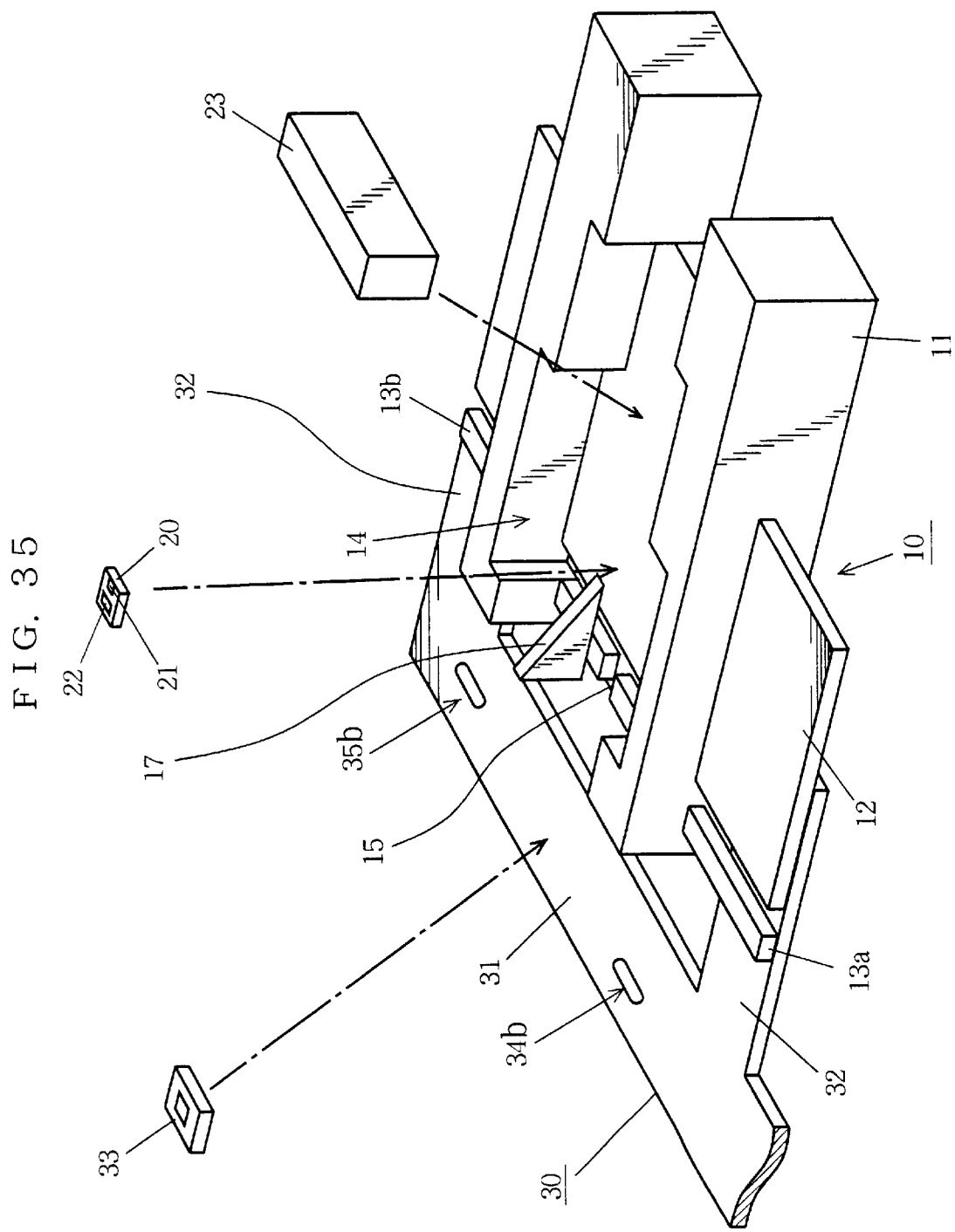
FIG. 35 is a perspective view showing the first step of fabricating the optical pickup device shown in FIG. 31.
Figure 36:
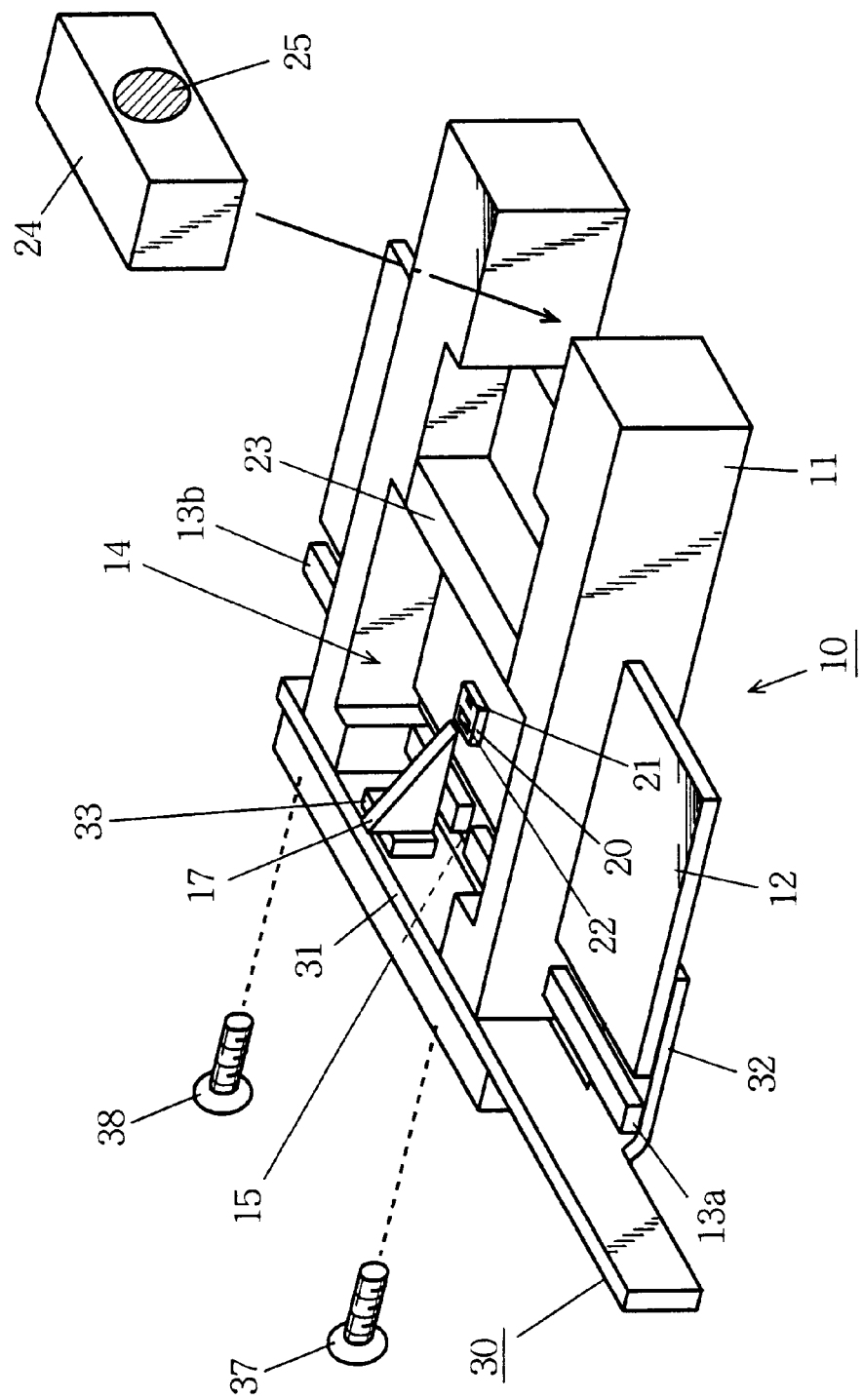
FIG. 36 is a perspective view showing the second step of fabricating the optical pickup device shown in FIG. 31.
Figure 37:
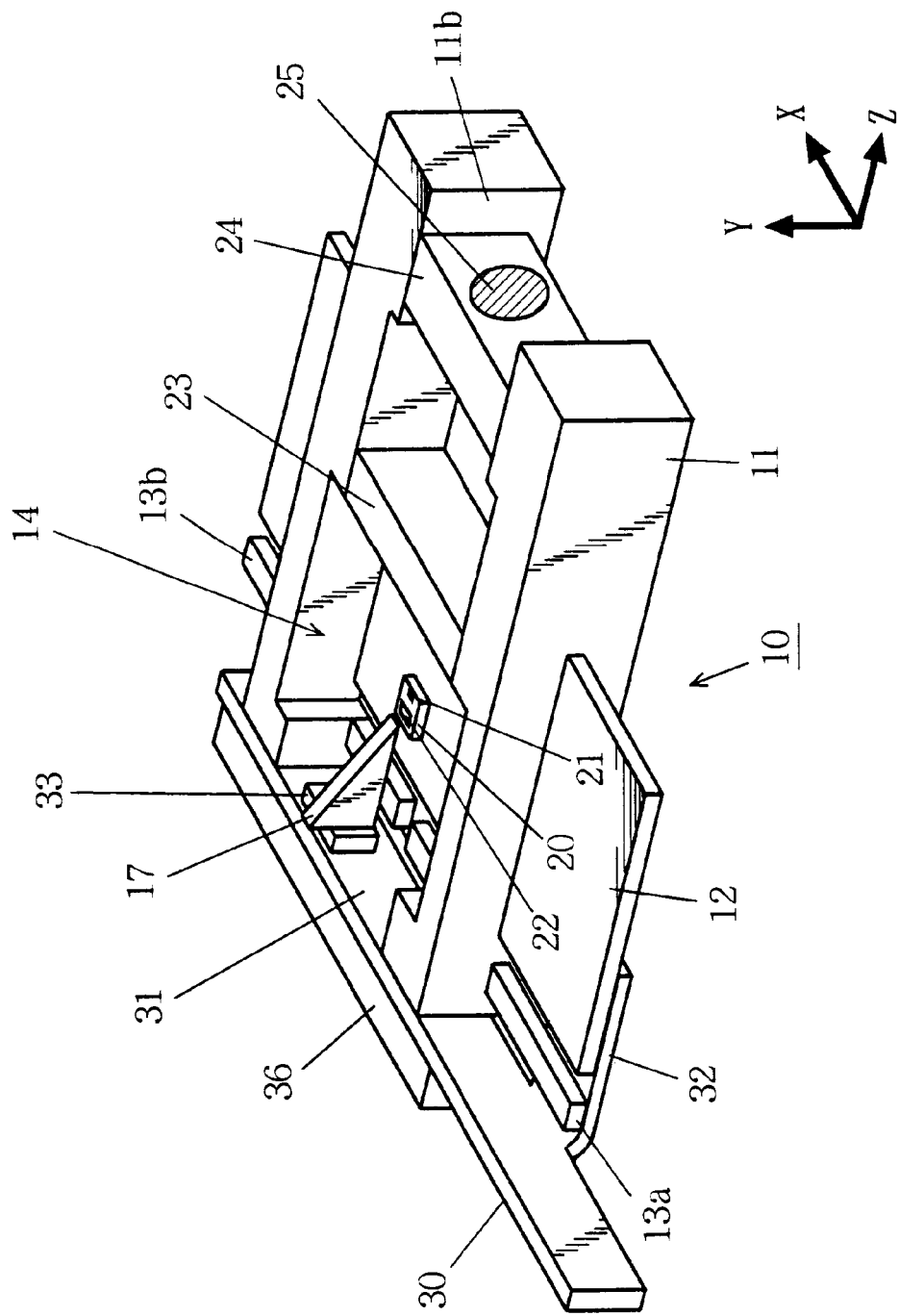
FIG. 37 is a perspective view showing the third step of fabricating the optical pickup device shown in FIG. 31.

Description is now made of a method of fabricating the optical pickup device according to the present invention. FIGS. 35, 36 and 37 are perspective views showing the steps of fabricating the optical pickup device shown in FIG. 31.

In the step shown in FIG. 35, the surface of a fixed portion 32 of the flexible circuit board 30 is first fixed to a lead frame 12 and leads 13a and 13b by soldering or the like. In this state, a sub-mount 20 on which a semiconductor laser device 21 is put and a three-beam generating diffraction grating 23 are fixed on the lead frame 12 inside a recess 14 of the insulating molding member 11. Further, the photodiode for signal detection 33 is mounted on the surface of the lead portion 31 of the flexible circuit board 30. Thereafter, the semiconductor laser device 21, a photodiode for monitoring 22 and the photodiode for signal detection 33 are wire-bonded.

As shown in FIG. 36, the transmission type holographic optical element 24 is then arranged on the side of an end surface 16 inside the recess 14 of the insulating molding member 11. Further, the lead portion 31 of the flexible circuit board 30 is folded almost perpendicularly to the fixed portion 32, and the screws 37 and 38 are respectively inserted into the threaded holes 39 and 40 on the one end surface 15 of the insulating molding member 11 through the screw through holes 34b and 35b of the flexible circuit board 30, to mount the lead portion 31 on the one end surface 15 of the insulating molding member 11.

Furthermore, as shown in FIG. 37, the transmission type holographic optical element 24 is movable in the Y-axis direction and the Z-axis direction upon being guided by the inner side surface 11b of the insulating molding member 11. Further, the flexible circuit board 30 is movable in the X-axis direction by being moved along the elliptic screw through holes 34b and 35b.

Consequently, the relative position between the transmission type holographic optical element 24 and the photodiode for signal detection 33 can be adjusted in a three-dimensional manner by moving the transmission type holographic optical element 24 in the Y-axis direction and the Z-axis direction and moving the photodiode for signal detection 33 in the X-axis direction.

After the positions of the transmission type holographic optical element 24 and the photodiode for signal detection 33 are adjusted, the transmission type holographic optical element 24 is fixed to the insulating molding member 11 using adhesives or the like, and the screws 37 and 38 are tightened, to fix the relative position between the flexible circuit board 30 and the one end surface 15 of the insulating molding member 11.

By the foregoing steps, an optical pickup device in which the relative position between the transmission type holographic optical element 24 and the photodiode for signal detection 33 is adjusted in a three-dimensional manner is obtained.

Figure 38:
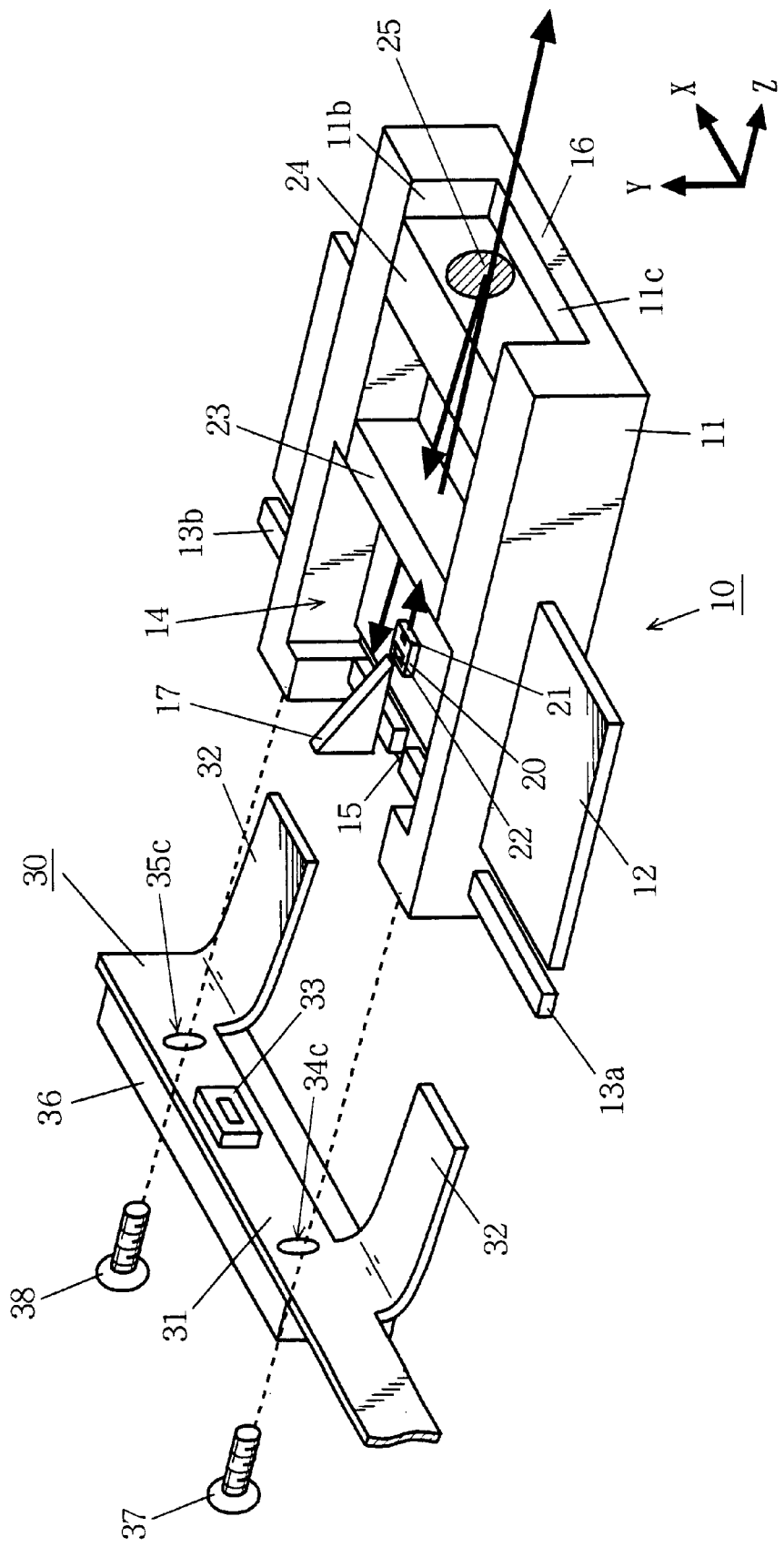
FIG. 38 is an exploded perspective view of an optical pickup device according to a seventh embodiment of the present invention.
Figure 39:
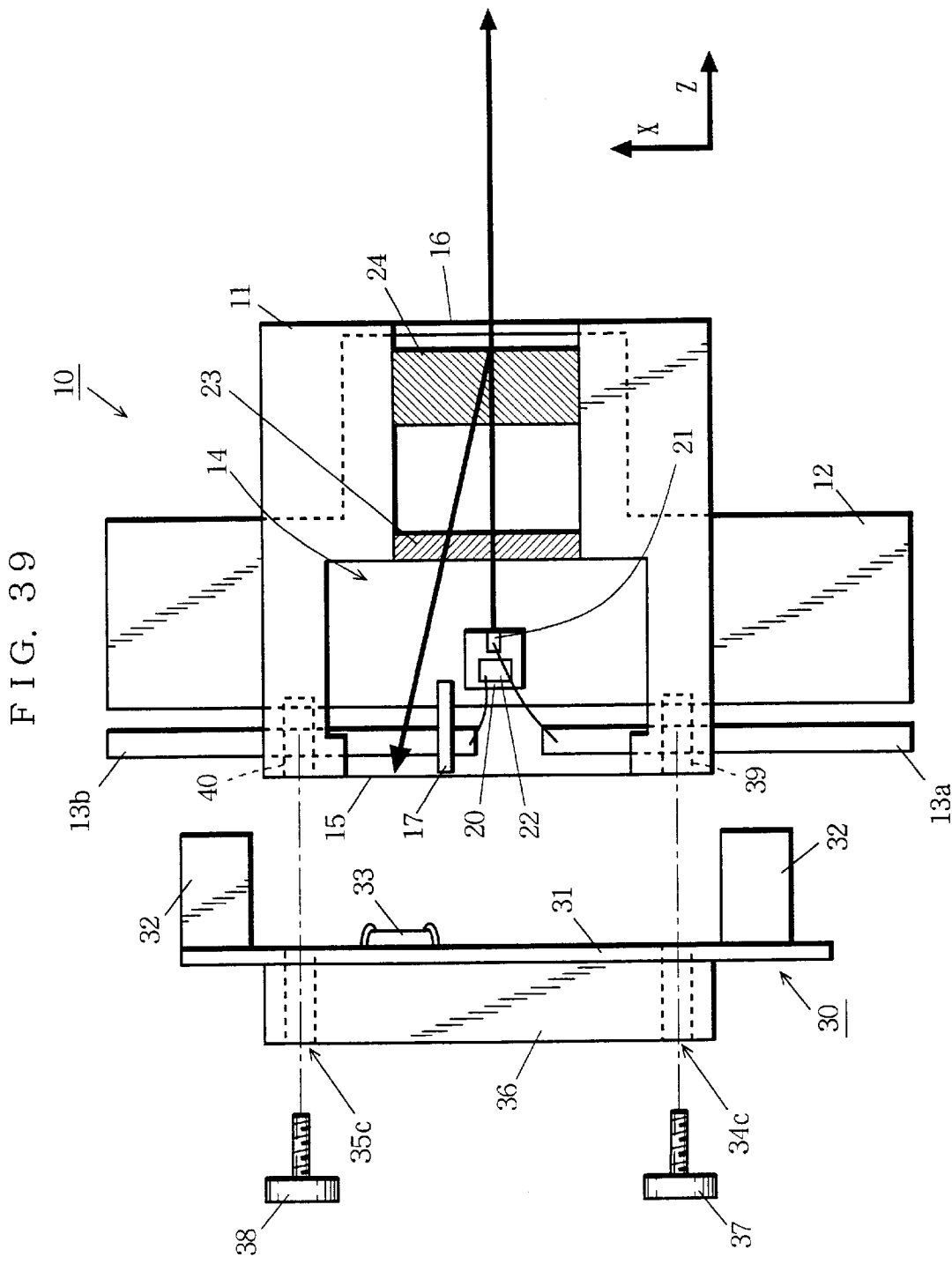
FIG. 39 is an exploded plan view of the optical pickup device shown in FIG. 38.
Figure 40:
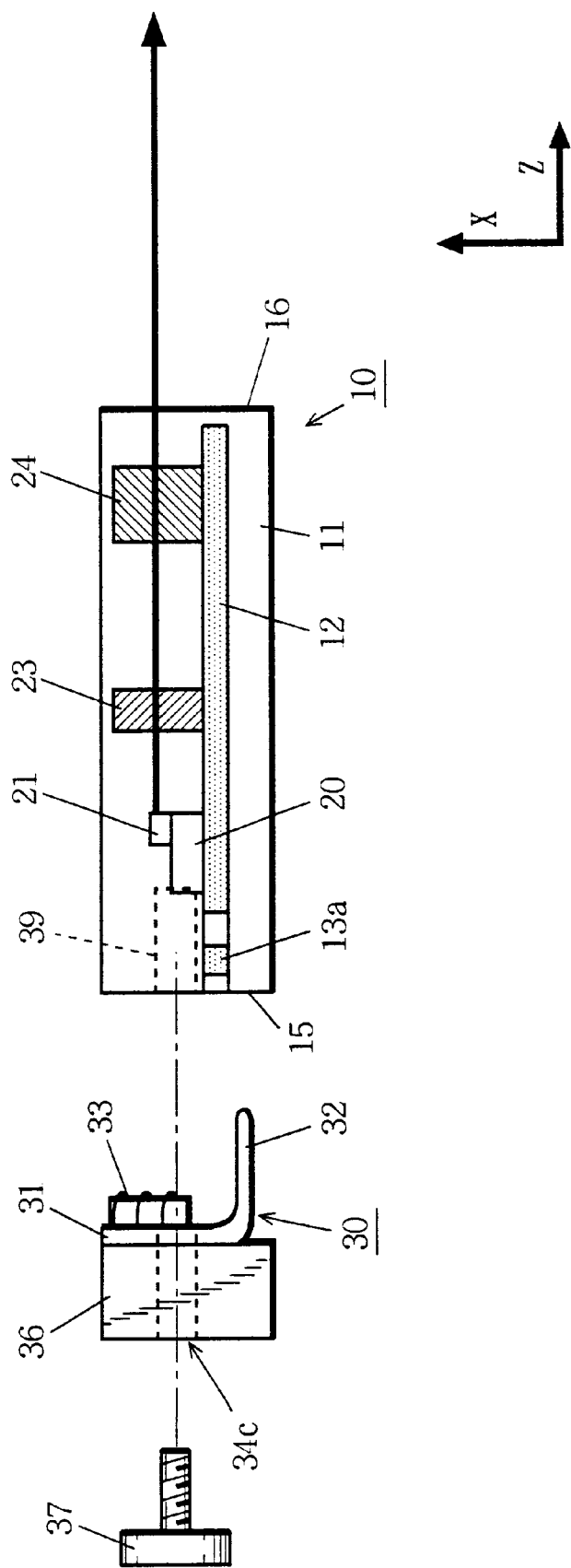
FIG. 40 is an exploded sectional view of the optical pickup device shown in FIG. 38.
Figure 41:
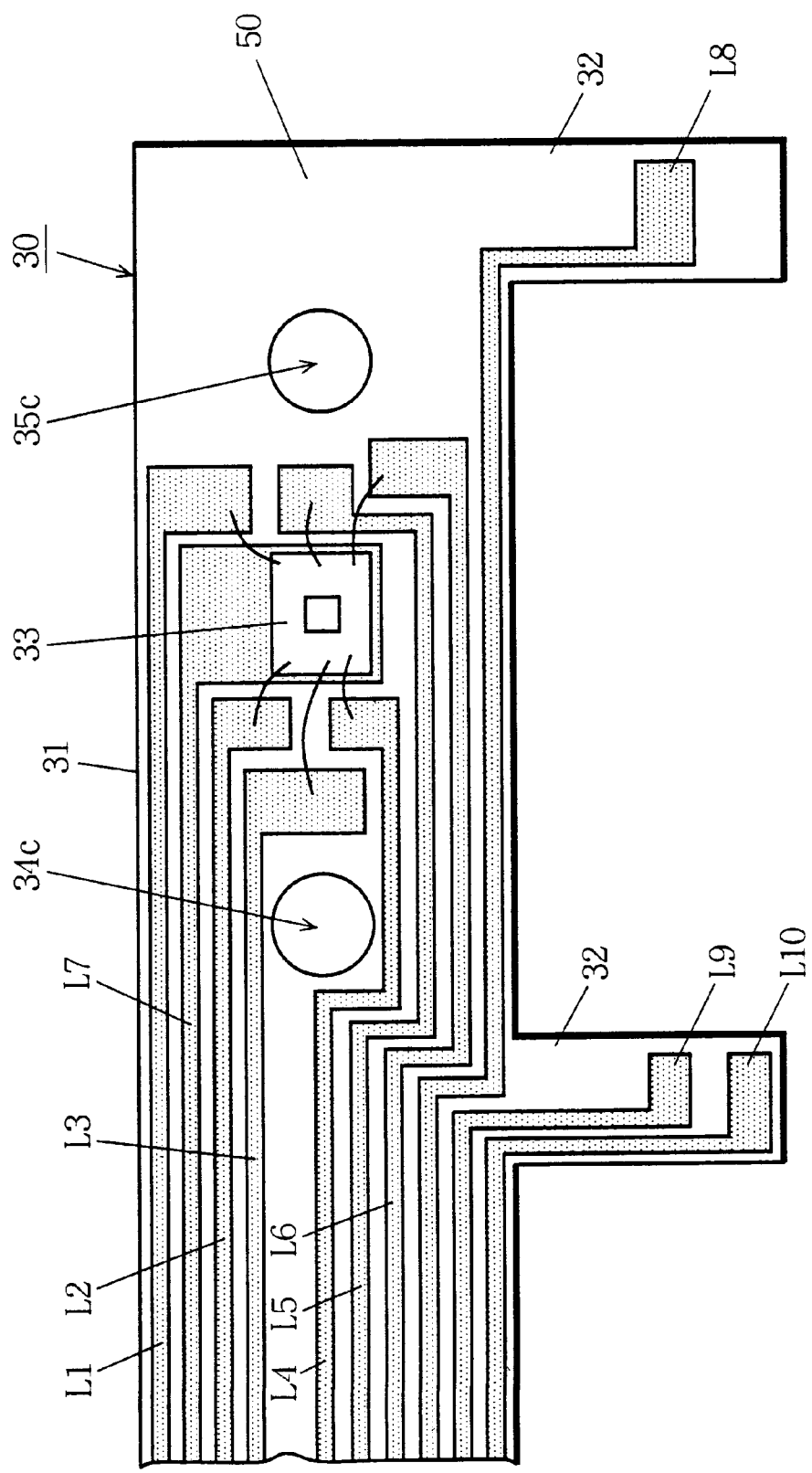
FIG. 41 is a plan view of a flexible circuit board used in the optical pickup device shown in FIG. 38.

FIG. 38 is an exploded perspective view of an optical pickup device according to a seventh embodiment of the present invention, FIG. 39 is an exploded plan view of the optical pickup device shown in FIG. 38, and FIG. 40 is an exploded sectional view of the optical pickup device shown in FIG. 38. FIG. 41 is a plan view of a flexible circuit board used in the optical pickup device shown in FIG. 38.

The optical pickup device shown in FIG. 38 differs from the optical pickup device shown in FIG. 1 in a position adjusting structure of a transmission type holographic optical element 24 and a position adjusting structure of a flexible circuit board 30.

Specifically, in FIGS. 38 to 41, the transmission type holographic optical element 24 is disposed movably in a Z-axis direction along an inner side surface 11b and a bottom surface 11c of an insulating molding member 11 at the time of assembling.

Furthermore, the flexible circuit board 30 is provided with large circular screw through holes 34c and 35c. The diameters of the screw through holes 34c and 35c are larger than the diameters of screws 37 and 38 and are set to such dimensions that the flexible circuit board 30 is movable in a plane including an X-axis and a Y-axis. The screws 37 and 38 are respectively inserted into threaded holes 39 and 40 formed on one end surface 15 of the insulating molding member 11 through the large circular screw through holes 34c and 35c of the flexible circuit board 30.

Consequently, a photodiode for signal detection 33 mounted on a lead portion 31 of the flexible circuit board 30 is movable in an X-axis direction and a Y-axis direction.

Figure 42:
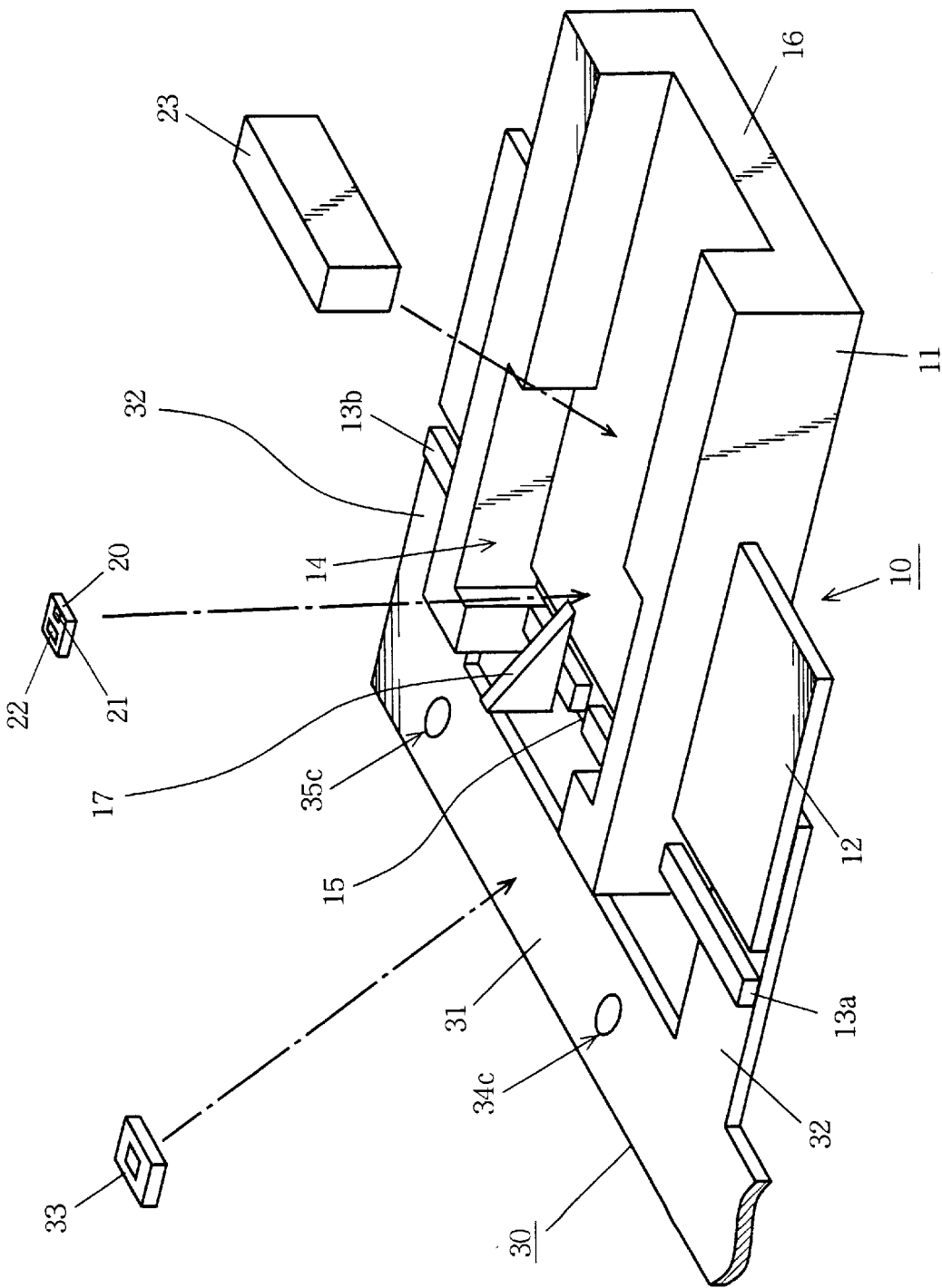
FIG. 42 is a perspective view showing the first step of fabricating the optical pickup device shown in FIG. 38.
Figure 43:
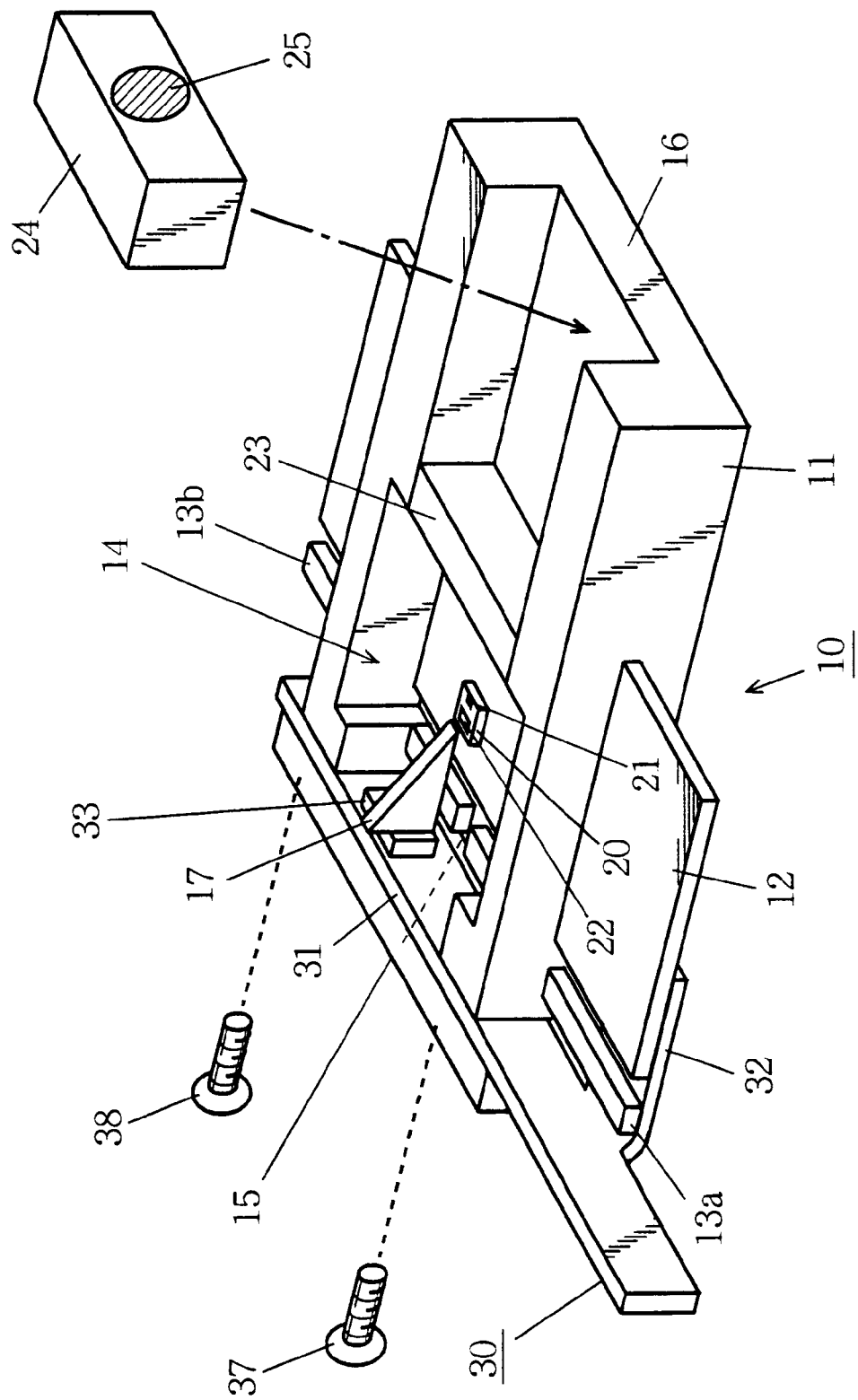
FIG. 43 is a perspective view showing the second step of fabricating the optical pickup device shown in FIG. 38.
Figure 44:
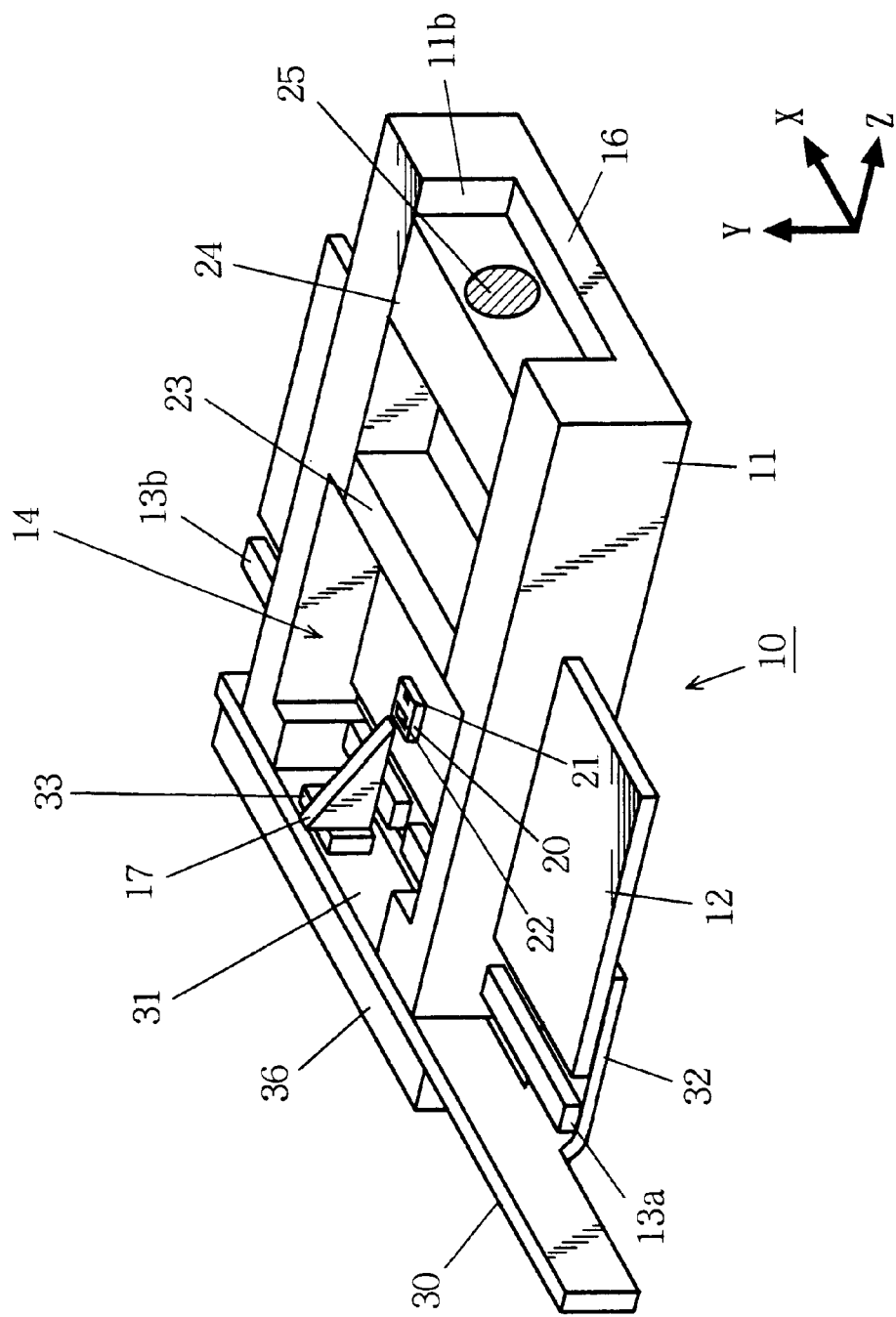
FIG. 44 is a perspective view showing the third step of fabricating the optical pickup device shown in FIG. 38.
Figure 45:
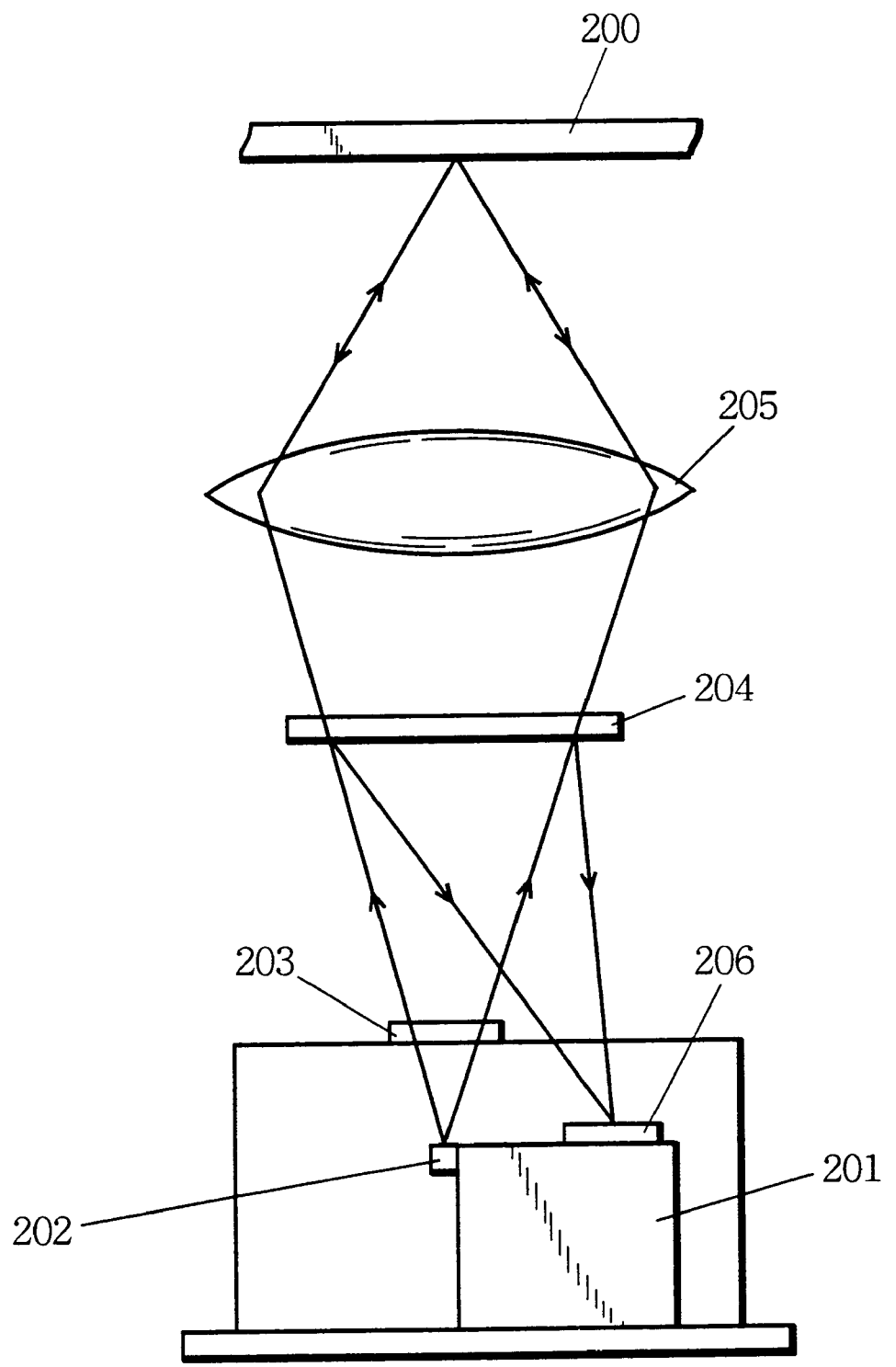
FIG. 45 is a schematic view showing one example of a conventional optical pickup device.
Figure 46:
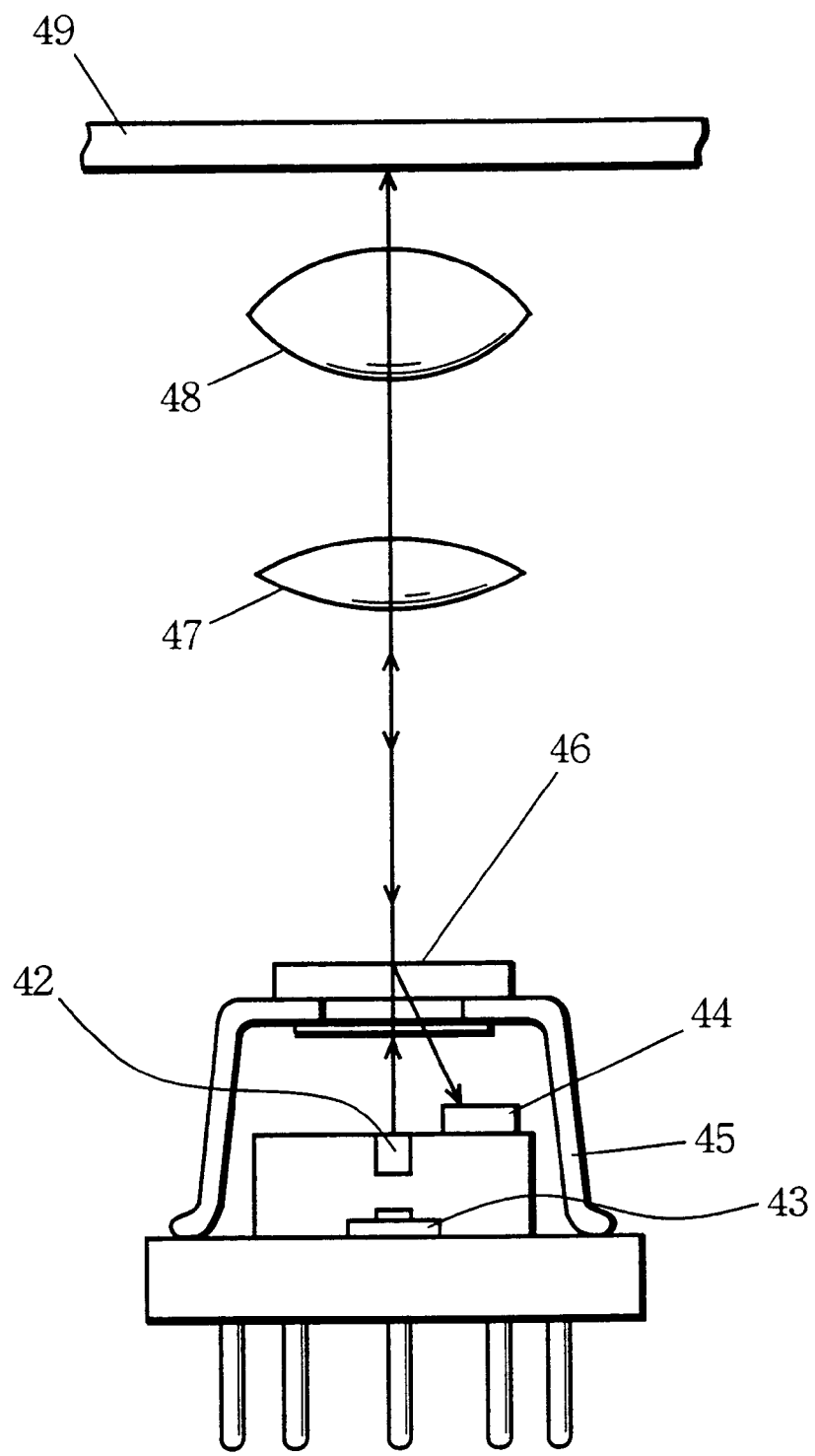
FIG. 46 is a cross-sectional view showing another example of the conventional optical pickup device.
Figure 47:
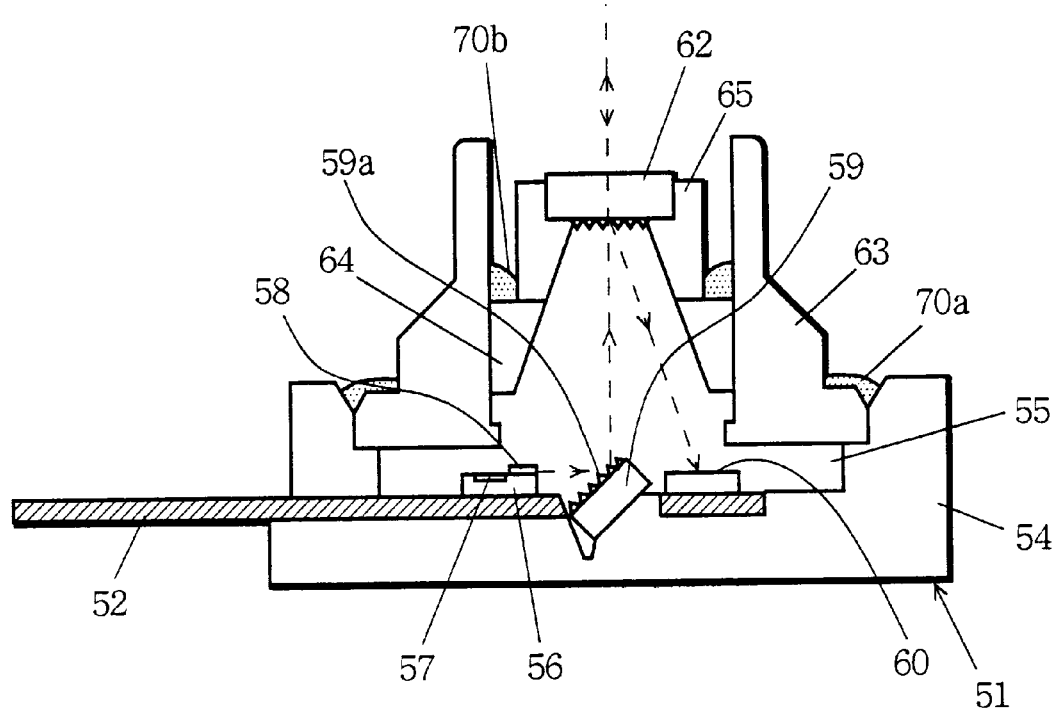
FIG. 47 is a cross-sectional view showing still another example of the conventional optical pickup device.

Description is now made of a method of fabricating the optical pickup device according to the present invention. FIGS. 42, 43 and 44 are perspective views showing the steps of fabricating the optical pickup device shown in FIG. 38.

In the step shown in FIG. 38, the surface of a fixed portion 32 of the flexible circuit board 30 is first fixed to a lead frame 12 and leads 13a and 13b by soldering or the like, as in the step shown in FIG. 6. In this state, a sub-mount 20 and a three-beam generating diffraction grating 23 are fixed on the lead frame 12 inside a recess 14 of the insulating molding member 11. Further, the photodiode for signal detection 33 is mounted on the surface of the lead portion 31 of the flexible circuit board 30. Thereafter, a semiconductor laser device 21, a photodiode for monitoring 22 and the photodiode for signal detection 33 are wire-bonded.

As shown in FIG. 43, the transmission type holographic optical element 24 is then arranged on the side of an end surface 16 inside the recess 14 of the insulating molding member 11. Further, the lead portion 31 of the flexible circuit board 30 is folded almost perpendicularly to the fixed portion 32, and the screws 37 and 38 are respectively inserted into the threaded holes 39 and 40 on the one end surface 15 of the insulating molding member 11 through the screw through holes 34c and 35c of the flexible circuit board 30, to mount the lead portion 31 on the one end surface 15 of the insulating molding member 11.

Furthermore, as shown in FIG. 44, the transmission type holographic optical element 24 is movable in the Z-axis direction along the inner side surface 11b and the bottom surface 11c of the insulating molding member 11 in this state. Further, the flexible circuit board 30 is movable in the X-axis direction and the Y-axis direction by the large circular screw through holes 34c and 35c.

Consequently, the relative position between the transmission type holographic optical element 24 and the photodiode for signal detection 33 can be adjusted in a three-dimensional manner by moving the transmission type holographic optical element 24 in the Z-axis direction and moving the photodiode for signal detection 33 in the X-axis direction and the Y-axis direction.

After the positions of the transmission type holographic optical element 24 and the photodiode for signal detection 33 are adjusted, the transmission type holographic optical element 24 is fixed to a predetermined position of the insulating molding member 11 using adhesives or the like, and the screws 37 and 38 are tightened, to fix the relative position between the flexible circuit board 30 and the one end surface 15 of the insulating molding member 11.

By the foregoing steps, an optical pickup device in which the relative position between the transmission type holographic optical element 24 and the photodiode for signal detection 33 is adjusted in a three-dimensional manner is obtained.

Although in the above-mentioned first, second, sixth and seventh embodiments, screws are used for fixing the flexible circuit board 30, the flexible circuit board 30 may be fixed with adhesives or the like.

Although in the above-mentioned embodiments, description was made of a case where the present invention is applied to an optical pickup device performing tracking servo using a three-beam method, the present invention is also applicable to an optical pickup device of the other type.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device comprising:

a supporting member having a main surface and both end surfaces;

a semiconductor laser device disposed on said main surface of said supporting, member for emitting laser light from one end surface side towards the other end surface side of said supporting member in a direction nearly parallel to the main surface;

a holographic optical element disposed on the other side of the end surface of said supporting member for transmitting the laser light emitted from said semiconductor laser device as well as diffracting returned light based on said laser light;

a light detecting element for detecting the returned light diffracted by said holographic optical element; and a flexible circuit board on which said light detecting element is mounted, said flexible circuit board being so mounted along the lower surface of said supporting member that said light detecting element is positioned outside said one end surface of said supporting member, and being so folded almost perpendicularly to the main surface of said supporting member that said light detecting element receives the returned light diffracted by said holographic optical element, wherein said holographic optical element is disposed on said supporting member movably in at least one of a plurality of directions at the time of assembling, and a folded portion of said flexible circuit board on which said light detecting element is mounted is mounted on said one end surface of said supporting member movably in a direction different from the direction in which said holographic optical element is movable at the time of assembling.

2. The optical pickup device according to claim 1, wherein said holographic optical element diffracts said returned light based on said laser light on a plane nearly parallel to said main surface of said supporting member.

3. The optical pickup device according to claim 2, wherein said plurality of directions include a first direction nearly parallel to the laser light emitted from said semiconductor laser device, a second direction nearly perpendicular to said first direction on said main surface of said supporting member, a third direction nearly perpendicular to said main surface of said supporting member, and a fourth direction rotated around an axis nearly parallel to said first direction.

4. The optical pickup device according to claim 3, wherein said supporting member comprises
a molding member in a flat shape, and
a lead member electrically connected to said semiconductor laser device and projected from both side surfaces of said molding member.

5. The optical pickup device according to claim 4, wherein said molding member has a recess so formed that the surface of said lead member is exposed, and said semiconductor laser device is disposed on said lead member exposed in said recess.

6. The optical pickup device according to claim 5, wherein said molding member further has a recess formed on said other end surface side, and said holographic optical element is arranged in said recess formed on the other end surface side of said molding member.

7. The optical pickup device according to claim 6, further comprising a diffraction element for dividing the laser light emitted from said semiconductor laser device into a plurality of light beams on said main surface between said semiconductor laser device and said holographic optical element.

8. The optical pickup device according to claim 3, wherein said holographic optical element is disposed on said main surface of said supporting member movably in said first direction and said second direction at the time of assembling, and a folded portion of said flexible circuit board on which said light detecting element is mounted is mounted on said one end surface of said supporting member movably in said third direction and rotatably in said fourth direction at the time of assembling.

9. The optical pickup device according to claim 8, wherein said flexible circuit board has a pair of holes, at least one of them extending in said third direction, further comprising a pair of screws inserted into said pair of holes of said flexible circuit board for mounting said flexible circuit board on said one end surface of said supporting member.

10. The optical pickup device according to claim 9, further comprising a diffraction element for dividing the laser light emitted from said semiconductor laser device into a plurality of light beams on said main surface between said semiconductor laser device and said holographic optical element.

11. The optical pickup device according to claim 3, wherein said holographic optical element is disposed on said supporting member movably in said second direction at the time of assembling, and a folded portion of said flexible circuit board on which said light detecting element is mounted is mounted on said one end surface of said supporting member movably in said first direction and rotatably in said fourth direction at the time of assembling.

12. The optical pickup device according to claim 11, wherein said flexible circuit board has a pair of holes extending in said third direction, further comprising a pair of screws inserted into said pair of holes of said flexible circuit board for mounting said flexible circuit board on said one end surface of said supporting member, and a spring inserted between said flexible circuit board and said one end surface of said supporting member on the side of one of said pair of screws.

13. The optical pickup device according to claim 12, wherein said supporting member has a wall surface abutted against said holographic optical element for guiding said holographic optical element in said second direction at the time of assembling.

14. The optical pickup device according to claim 13, further comprising a diffraction element for dividing the laser light emitted from said semiconductor laser device into a plurality of light beams on said main surface between said semiconductor laser device and said holographic optical element.

15. The optical pickup device according to claim 3, wherein said holographic optical element is disposed on said supporting member movably in said second direction and said third direction at the time of assembling, and a folded portion of said flexible circuit board on which said light detecting element is mounted is mounted along said one end surface of said supporting member movably in said first direction at the time of assembling.

16. The optical pickup device according to claim 15, wherein said flexible circuit board has a pair of holes, further comprising a pair of screws inserted into said pair of holes of said flexible circuit board for mounting said flexible circuit board on said one end surface of said supporting member, and a spring inserted between said flexible circuit board and said one end surface of said supporting member on the side of one of said pair of screws.

17. The optical pickup device according to claim 16, wherein said supporting member has wall surfaces abutted against said holographic optical element for guiding said holographic optical element in said second direction and said third direction at the time of assembling.

18. The optical pickup device according to claim 17, further comprising a diffraction element for dividing the laser light emitted from said semiconductor laser device into a plurality of light beams on said main surface between said semiconductor laser device and said holographic optical element.

19. The optical pickup device according to claim 3, wherein said holographic optical element is disposed on said supporting member movably in said third direction at the time of assembling, and a folded portion of said flexible circuit board on which said light detecting element is mounted is mounted on said one end surface of said supporting member movably in said first direction and said second direction at the time of assembling.

20. The optical pickup device according to claim 19, wherein said flexible circuit board has a pair of holes extending in said second direction, further comprising
    a pair of screws inserted into said pair of holes of said flexible circuit board for mounting said flexible circuit board on said one end surface of said supporting member, and
    a spring inserted between said flexible circuit board and said one end surface of said supporting member on the side of one of said pair of screws.

21. The optical pickup device according to claim 20, wherein
    said supporting member has a wall surface abutted against said holographic optical element for guiding said holographic optical element in said third direction at the time of assembling.

22. The optical pickup device according to claim 21, further comprising
    a diffraction element for dividing the laser light emitted from said semiconductor laser device into a plurality of light beams on said main surface between said semiconductor laser device and said holographic optical element.

23. The optical pickup device according to claim 3, wherein
    said holographic optical element is disposed on said supporting member movably in said first direction and said third direction at the time of assembling, and
    a folded portion of said flexible circuit board on which said light detecting element is mounted is mounted on said one end surface of said supporting member movably in said second direction at the time of assembling.

24. The optical pickup device according to claim 23, wherein said flexible circuit board has a pair of holes extending in said second direction, further comprising
    a pair of screws inserted into said pair of holes of said flexible circuit board for mounting said flexible circuit board on said one end surface of said supporting member.

25. The optical pickup device according to claim 24, wherein
    said supporting member has a wall surface abutted against said holographic optical element for guiding said holographic optical element in said first direction and said third direction at the time of assembling.

26. The optical pickup device according to claim 25, further comprising
    a diffraction element for dividing the laser light emitted from said semiconductor laser device into a plurality of light beams on said main surface between said semiconductor laser device and said holographic optical element.

27. The optical pickup device according to claim 3, wherein
    said holographic optical element is disposed on said main surface of said supporting member movably in said first direction at the time of assembling, and
    a folded portion of said flexible circuit board on which said light detecting element is mounted is mounted on said one end surface of said supporting member movably in said second direction and said third direction at the time of assembling.

28. The optical pickup device according to claim 27, wherein said flexible circuit board has a pair of holes having such dimensions as to allow said flexible circuit board to be moved in said second direction and said third direction, further comprising
    a pair of screws inserted into said pair of holes of said flexible circuit board for mounting said flexible circuit board on said one end surface of said supporting member.

29. The optical pickup device according to claim 28, wherein
    said supporting member has wall surfaces abutted against said holographic optical element for guiding said holographic optical element in the first direction at the time of assembling.

30. The optical pickup device according to claim 29, further comprising
    a diffraction element for dividing the laser light emitted from said semiconductor laser device into a plurality of light beams on said main surface between said semiconductor laser device and said holographic optical element.

31. The optical pickup device according to claim 1, wherein said flexible circuit board comprises an insulating substrate having flexibility, and a circuit layer formed on the surface of said insulating substrate.

32. The optical pickup device according to claim 31, wherein
    said insulating substrate is formed of polyimide resin.

33. A method of fabricating an optical pickup device, comprising the steps of:
    mounting a flexible circuit board along the lower surface of a supporting member so as to b projected from one end surface of said supporting member;
    mounting a semiconductor laser device on a main surface of said supporting member so as to emit laser light in a direction nearly parallel to said main surface from said one end surface said of said supporting member to the other end surface side;
    mounting a light detecting element on said flexible circuit board projected from the one end surface of said supporting member;
    folding said flexible circuit board projected from the one end surface of said supporting member almost perpendicularly to said main surface of said supporting member and directing a light receiving surface of said light detecting element almost perpendicular to said main surface;
    mounting a holographic optical element so as to transmit the laser light emitted from said semiconductor laser device and diffract returned light based on said laser light; and
    mounting said flexible circuit board folded almost perpendicularly to said main surface on said one end surface of said supporting member.

34. The method according to claim 33, wherein
    the step of mounting said holographic optical element further comprises the steps of
        moving said holographic optical element in at least one of a plurality of directions on said supporting member, and
        fixing said holographic optical element on said supporting member, and
    the step of mounting said flexible circuit board further comprises the steps of mounting said flexible circuit board folded almost perpendicularly to said main surface of said supporting member on said one end surface of said supporting member, and moving a folded portion of said flexible circuit board on which said light detecting element is mounted in a direction different from the direction in which said holographic optical element is moved, to adjust the position of said light detecting element, and fixing said flexible circuit board to said one end surface of said supporting member after adjusting the position of said light detecting element.

35. The method according to claim 34, wherein said plurality of directions include a first direction nearly parallel to the laser light emitted from said semiconductor laser device, a second direction almost perpendicular to said first direction on said main surface of said supporting member, a third direction almost perpendicular to said main surface of said supporting member, and a fourth direction rotated around an axis nearly parallel to said first direction.

36. The method according to claim 35, wherein the step of mounting said holographic optical element further comprises the steps of moving said holographic optical element in said first direction on said main surface of said supporting member, and fixing said holographic optical element on said main surface of said supporting member, and the step of mounting said flexible circuit board further comprises the steps of mounting said flexible circuit board folded almost perpendicularly to said main surface of said supporting member on said one end surface of said supporting member, and moving said flexible circuit board in said second direction or said third direction, to adjust the position of said light detecting element, and fixing said flexible circuit board to said one end surface of said supporting member after adjusting the position of said light detecting element.

37. The method according to claim 35, wherein the step of mounting said holographic optical element further comprises the steps of moving said holographic optical element in said first direction or said second direction on said main surface of said supporting member, and fixing said holographic optical element on said main surface of said supporting member, and the step of mounting said flexible circuit board further comprises the steps of mounting said flexible circuit board folded almost perpendicularly to said main surface of said supporting member on said one end surface of said supporting member, and moving said flexible circuit board in said third direction or rotating the flexible circuit board in said fourth direction, to adjust the position of said light detecting element, and fixing said flexible circuit board to said one end surface of said supporting member after adjusting the position of said light detecting element.

38. The method according to claim 35, wherein the step of mounting said holographic optical element further comprises the steps of moving said holographic optical element in said second direction on said main surface of said supporting member, and fixing said holographic optical element on said main surface of said supporting member, and the step of mounting said flexible circuit board further comprises the steps of mounting said flexible circuit board folded almost perpendicularly to the main surface of said supporting member on said one end surface of said supporting member, and moving the flexible circuit board in said first direction or rotating the flexible circuit board in said fourth direction, to adjust the position of said light detecting element, and fixing said flexible circuit board to said one end surface of said supporting member after adjusting the position of said light detecting element.

39. The method according to claim 35, wherein the step of mounting said holographic optical element further comprises the steps of moving said holographic optical element in said second direction or said third direction on said supporting member, and fixing said holographic optical element on said supporting member, and the step of mounting said flexible circuit board further comprises the steps of mounting said flexible circuit board folded almost perpendicularly to said main surface of said supporting member on said one end surface of said supporting member, and moving said flexible circuit board in said first direction, to adjust the position of said light detecting element, and fixing said flexible circuit board to said one end surface of said supporting member after adjusting the position of said light detecting element.

40. The method according to claim 35, wherein the step of mounting said holographic optical element further comprises the steps of moving said holographic optical element in said third direction on said supporting member, and fixing said holographic optical element on said supporting member, and the step of mounting said flexible circuit board further comprises the steps of mounting said flexible circuit board folded almost perpendicularly to the main surface of said supporting member on said one end surface of said supporting member, and moving said flexible circuit board in said first direction or said second direction, to adjust the position of said light detecting element, and fixing said flexible circuit board to said one end surface of said supporting member after adjusting the position of said light detecting element.

41. The method according to claim 35, wherein the step of mounting said holographic optical element further comprises the steps of moving said holographic optical element in said first direction or said third direction on said supporting member, and fixing said holographic optical element on said supporting member, and the step of mounting said flexible circuit board further comprises the steps of mounting said flexible circuit board folded almost perpendicularly to said main surface of said supporting member on said one end surface of said supporting member, and moving said flexible circuit board in said second direction, to adjust the position of said light detecting element, and fixing said flexible circuit board to said one end surface of said supporting member after adjusting the position of said light detecting element.

42. An optical pickup device comprising:

a supporting member having a main surface and both end surfaces;

a semiconductor laser device disposed on said main surface of said supporting member for emitting laser light from one end surface side towards the other end surface side of said supporting member in a direction nearly parallel to the main surface;

a holographic optical element disposed on the other side of the end surface of said supporting member for transmitting the laser light emitted from said semiconductor laser device as well as diffracting returned light based on said laser light;

a light detecting element for detecting the returned light diffracted by said holographic optical element; and a flexible circuit board on which said light detecting element is mounted, said flexible circuit board including a fixed part mounted along the lower surface of said supporting member and a wiring part folded almost perpendicularly to said fixed part outside said one end surface supporting member, said light detecting element being mounted on said wiring part to receive the returned light diffracted by said holographic optical element on a surface almost perpendicular to said main surface of said supporting member.

43. The optical pickup device according to claim 42, wherein said returned light diffracted by said holographic optical element travels in a direction nearly parallel to said main surface of said supporting member.

44. The optical device according to claim 43, wherein said holographic optical element has a holographic surface diffracting said returned light, said holographic surface being disposed in a direction nearly parallel to said main surface of said supporting member.

45. The optical pickup device according to claim 42, wherein said flexible circuit board comprises an insulating substrate having flexibility, and a circuit layer formed on the surface of said insulating substrate.

46. The optical pickup device according to claim 45, wherein said insulating substrate is formed of polyimide resin.

* * * * *